United States Patent
Youn et al.

(10) Patent No.: US 10,917,868 B2
(45) Date of Patent: Feb. 9, 2021

(54) METHOD FOR NOTIFYING OF MOBILITY EVENT IN WIRELESS COMMUNICATION SYSTEM AND DEVICE THEREFOR

(71) Applicant: LG ELECTRONICS INC., Seoul (KR)

(72) Inventors: Myungjune Youn, Seoul (KR); Jinsook Ryu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/494,240

(22) PCT Filed: Mar. 7, 2018

(86) PCT No.: PCT/KR2018/002693
§ 371 (c)(1),
(2) Date: Sep. 13, 2019

(87) PCT Pub. No.: WO2018/169244
PCT Pub. Date: Sep. 20, 2018

(65) Prior Publication Data
US 2020/0077356 A1 Mar. 5, 2020

Related U.S. Application Data

(60) Provisional application No. 62/471,966, filed on Mar. 16, 2017.

(51) Int. Cl.
*H04W 60/00* (2009.01)
*H04W 60/04* (2009.01)
(Continued)

(52) U.S. Cl.
CPC ........... *H04W 60/04* (2013.01); *H04W 8/065* (2013.01); *H04W 52/0209* (2013.01); *H04W 68/02* (2013.01); *H04W 76/27* (2018.02)

(58) Field of Classification Search
CPC ..... H04W 60/00; H04W 36/14; H04W 76/12; H04W 84/042; H04W 8/12; H04W 8/04;
(Continued)

(56) References Cited

U.S. PATENT DOCUMENTS

2002/0141361 A1 10/2002 Madour et al.
2006/0080120 A1 4/2006 Tcherevik
(Continued)

FOREIGN PATENT DOCUMENTS

KR 100912628 8/2009
KR 1020110034827 4/2011

OTHER PUBLICATIONS

PCT International Application No. PCT/KR2018/002693, International Search Report dated Jul. 2, 2018, 3 pages.
(Continued)

*Primary Examiner* — Fred A Casca
(74) *Attorney, Agent, or Firm* — Lee Hong Degerman Kang Waimey

(57) ABSTRACT

In one aspect of the present invention, there is provided an event notification method of an AMF in a wireless communication system. The event notification method includes receiving, from a requester, a subscribe message for a notification subscribe to a mobility event of a UE, wherein the subscribe message includes an identifier (ID) of the UE and an event filter for filtering the mobility event; performing a registration procedure for the UE; and when the mobility event filtered by the event filter happens in the registration procedure, completing the registration procedure of a notification message for the mobility event and then sending the notification message to a SMF, wherein if the subscribe message includes an indicator indicating a maintenance of a connected mode of the UE, the connected
(Continued)

mode of the UE is maintained for a predetermined time after the registration procedure is completed.

13 Claims, 19 Drawing Sheets

(51) Int. Cl.
*H04W 76/27* (2018.01)
*H04W 8/06* (2009.01)
*H04W 52/02* (2009.01)
*H04W 68/02* (2009.01)

(58) Field of Classification Search
CPC ... H04W 8/06; H04L 12/1407; H04L 65/1073
See application file for complete search history.

(56) References Cited

U.S. PATENT DOCUMENTS

| | | | |
|---|---|---|---|
| 2011/0201343 A1* | 8/2011 | Pinheiro | H04W 8/22 455/450 |
| 2015/0282145 A1* | 10/2015 | Kim | H04W 72/0406 455/450 |
| 2016/0183156 A1 | 6/2016 | Chin et al. | |
| 2017/0099600 A1* | 4/2017 | Jeong | H04W 48/16 |
| 2019/0166467 A1* | 5/2019 | Livanos | H04W 76/12 |
| 2020/0015137 A1* | 1/2020 | Stojanovski | H04W 76/15 |

OTHER PUBLICATIONS

ETRI, "TS 23.502: P-CR to add the procedures for TUPF relocation to support SSC", SA WG2 Meeting #119, S2-171107, Feb. 2017, 5 pages.

LG Electronics, et al., "TS 23.501: SSC mode 2 and UPF service area", SA WG2 Meeting #119, S2-171001, Feb. 2017, 5 pages.

European Patent Office Application U.S. Appl. No. 187670583, Search Report dated Nov. 19, 2020, 10 pages.

3rd Generation Partnership Project; Technical Specification Group Services and System Aspects; Procedures for the 6G Systems; Stage 2 (Release 15), 3GPP TS 23502 V03.0, Mar. 2017, 115 pages.

Huawei, "Maintaining Source eNB Connection during Handover", R3-160636, 3GPP TSG-RAN Meeting #91-bis, Apr. 2016, 4 pages.

* cited by examiner

FIG. 4
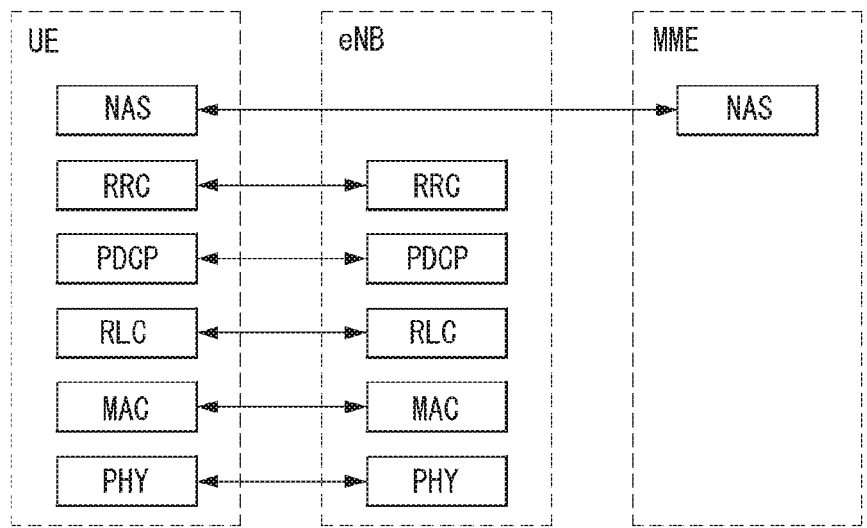
(a) Control plane protocol stack
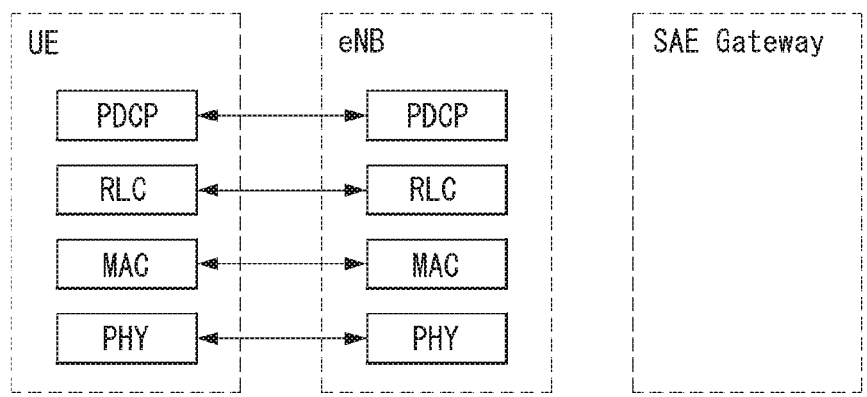
(b) User plane protocol stack FIG. 5
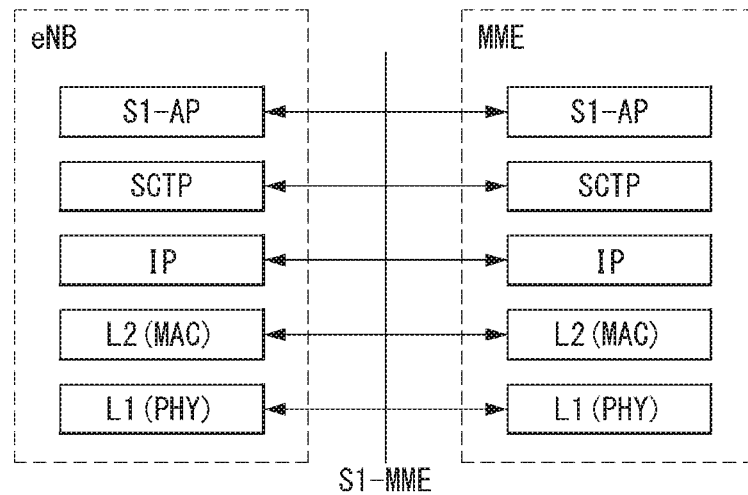
(a) Control plane protocol stack
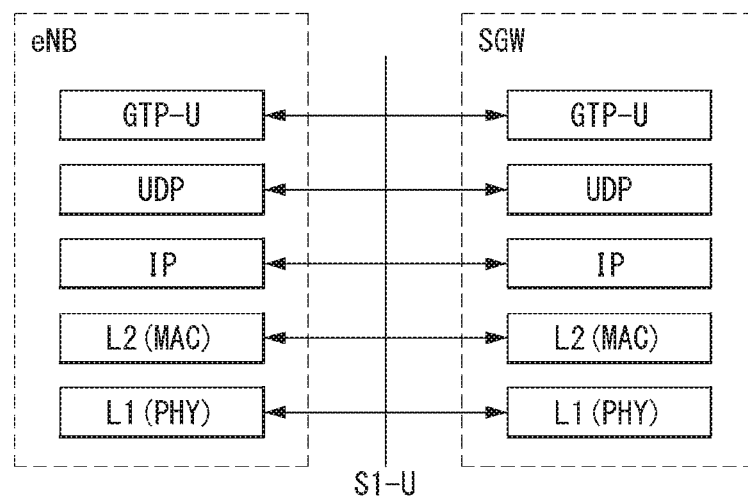
(b) User plane protocol stack FIG. 13
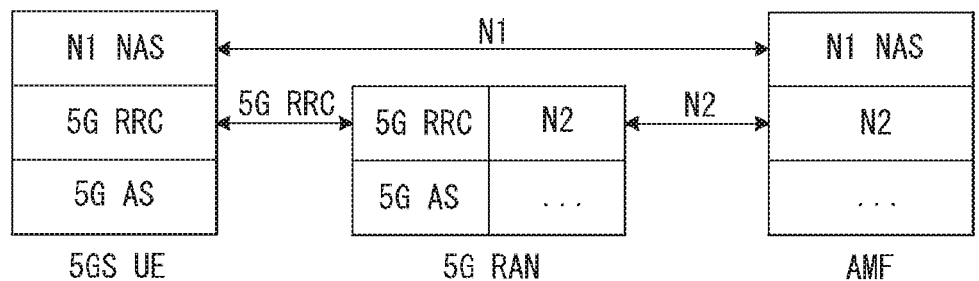
FIG. 14
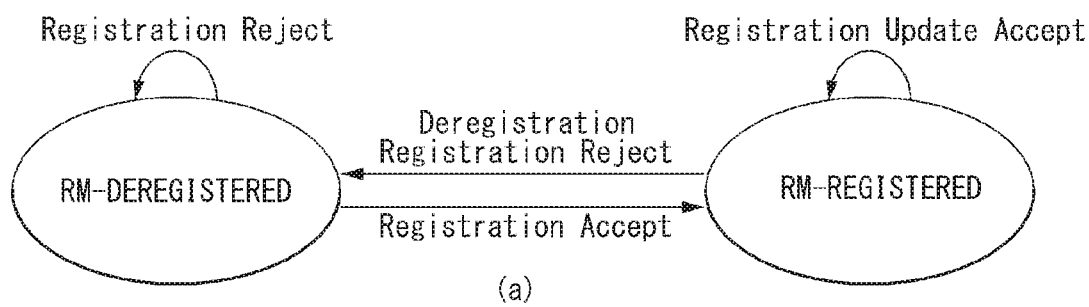
(a)
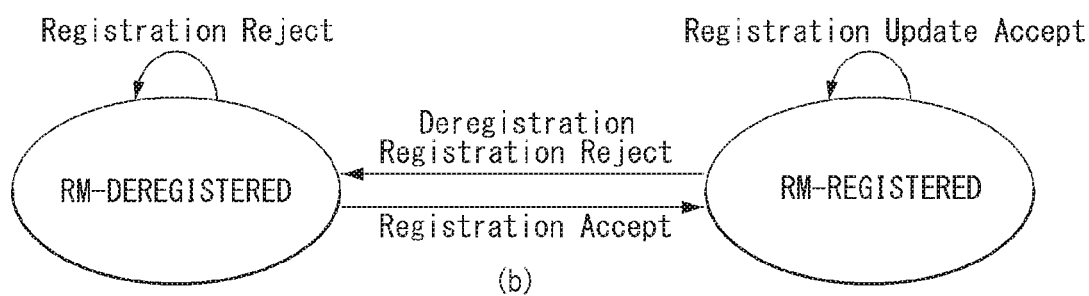
(b)

METHOD FOR NOTIFYING OF MOBILITY EVENT IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2018/002693, filed on Mar. 7, 2018, which claims the benefit of U.S. Provisional Application No. 62/471,966, filed on Mar. 16, 2017, the contents of which are all hereby incorporated by reference herein in their entirety.

TECHNICAL FIELD

The present invention relates to a wireless communication system, and more particularly to a method of subscribing/notifying a mobility event of a user equipment and a device therefor.

BACKGROUND ART

A mobile communication system has been developed to provide a voice service while guaranteeing activity of a user. However, the mobile communication system extends an area up to a data service as well as a voice and at present, a short phenomenon of a resource is caused due to an explosive increase of traffic and uses require a higher-speed service, and as a result, a more developed mobile communication system is required.

Requirements of a next-generation mobile communication system largely need to support accommodation of explosive data traffic, an epochal increase of transmission rate per user, accommodation of the significantly increased number of connection devices, very low end-to-end latency, and high energy efficiency. To this end, various technologies have been researched, which include dual connectivity, massive multiple input multiple output (MIMO), in-band full duplex, non-orthogonal multiple access (NOMA), super wideband supporting, device networking, and the like.

Particularly, for the device in which power consumption significantly influences on the life of the device, various techniques for decreasing the power consumption has been vigorously developed.

DISCLOSURE

Technical Problem

An object of the present invention is to propose a method for efficiently reducing a session signalling overhead and procedure complexity according to mobility of a UE in a new wireless communication system and a device therefor. In particular, an object of the present invention is to propose a method for efficiently reducing a session signalling overhead and procedure complexity according to mobility of a UE using a mobility event notification service procedure of the UE and a device therefor.

Embodiments are proposed to describe a method and a device for solving the above-described technical problems. Technical problems to be solved by the present invention are not limited by the above-mentioned technical problems, and other technical problems which are not mentioned above can be clearly understood from the following description by those skilled in the art to which the present invention pertains.

Technical Solution

In one aspect of the present invention, there is provided an event notification method of an access and mobility management function (AMF) in a wireless communication system, the event notification method comprising: receiving, from a requester, a subscribe message for a notification subscribe to a mobility event of a user equipment (UE), wherein the subscribe message includes an identifier (ID) of the UE and an event filter for filtering the mobility event; performing a registration procedure for the UE; and when the mobility event filtered by the event filter happens in the registration procedure, completing the registration procedure of a notification message for the mobility event and then sending the notification message to a session management function (SMF), wherein if the subscribe message includes an indicator indicating a maintenance of a connected mode of the UE, the connected mode of the UE is maintained for a predetermined time after the registration procedure is completed.

If the subscribe message does not include the indicator indicating the maintenance of the connected mode of the UE, the UE may transition to an idle mode within the predetermined time after the registration procedure is completed.

The predetermined time may be determined based on an expiration time of a timer that is started upon sending a registration accept message that the AMF sends in the registration procedure.

The SMF may be a network node that releases an existing PDU session, which has been established for the UE for the predetermined time, and establishes a new PDU session.

The mobility event may correspond to at least one of a serving cell change of the UE, a serving AMF change, a tracking area (TA) change, a connected state change, an access type change, a registration state change, and an entrance or a deviation to a specific area.

The event notification method may further comprise storing an association between the mobility event and an ID of the requester if the mobility event notification subscribe is authorized.

The notification message may include type information of the mobility event and information related to the mobility event.

The information related to the mobility event may be information on a registration area update and/or a new registration area of the UE.

The UE may be a UE to which session and service continuity (SSC) mode 2 or SSC mode 3 is configured.

The SSC mode 2 may be a SSC mode in which a network node triggers a release of an existing packet data unit (PDU) session to the UE and indicates an establishment of a new PDU session for the same data network.

The SSC mode 3 may be a SSC mode in which a network node allows an establishment of UE connectivity via a new PDU session anchor for the same data network before connectivity between the UE and a previous anchor is released.

The UE ID may include a subscriber permanent identifier (SUPI) of the UE.

The requester may be the SMF or network nodes other than the SMF.

In another aspect of the present invention, there is provided an access and mobility management function (AMF) for performing an event notification in a wireless communication system, the AMF comprising a communication module configured to transmit and receive a signal; and a processor configured to control the communication module, wherein the processor is configured to receive, from a requester, a subscribe message for a notification subscribe to a mobility event of a user equipment (UE), wherein the subscribe message includes an identifier (ID) of the UE and an event filter for filtering the mobility event, perform a registration procedure for the UE, and when the mobility event filtered by the event filter happens in the registration procedure, complete the registration procedure of a notification message for the mobility event and then send the notification message to a session management function (SMF), wherein if the subscribe message includes an indicator indicating a maintenance of a connected mode of the UE, the connected mode of the UE is maintained for a predetermined time after the registration procedure is completed.

If the subscribe message does not include the indicator indicating the maintenance of the connected mode of the UE, the UE may transition to an idle mode within the predetermined time after the registration procedure is completed.

The mobility event may correspond to at least one of a serving cell change of the UE, a serving AMF change, a tracking area (TA) change, a connected state change, an access type change, a registration state change, and an entrance or a deviation to a specific area.

Advantageous Effects

Embodiments of the present invention have effects capable of solving problems of a waste of paging resources and an increase in battery consumption of a UE for transitioning the UE to a connected state/mode since the connected state/mode of the UE is maintained after a registration procedure is completed.

Effects obtainable from the present invention are not limited by the effects mentioned above, and other effects which are not mentioned above can be clearly understood from the following description by those skilled in the art to which the present invention pertains.

DESCRIPTION OF DRAWINGS

The accompanying drawings, which are included to provide a further understanding of the invention as a part of detailed descriptions, illustrate embodiment(s) of the invention and together with the descriptions, serve to explain the technical principles of the invention.

FIG. 4 illustrates a radio interface protocol structure between a UE and an E-UTRAN in a wireless communication system to which the present invention may be applied.

FIG. 5 illustrates an S1 interface protocol structure in a wireless communication system to which the present invention may be applied.

FIG. 13 illustrates a protocol stack between a UE and a core network of 5G/NR system to which the present invention is applicable.

FIG. 14 illustrates an RM state model to which the present invention may be applied.

MODE FOR INVENTION

Figure 1:
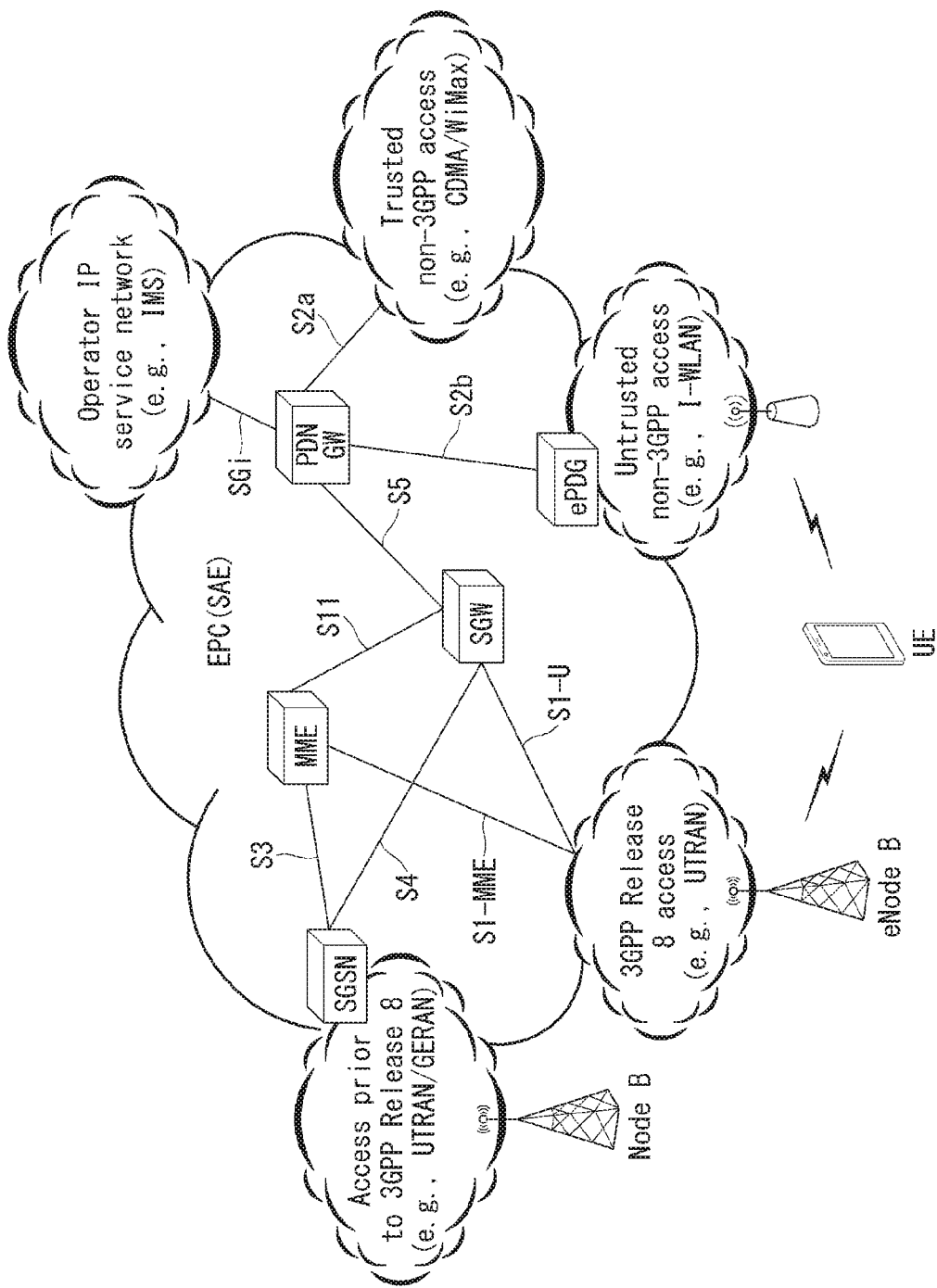
FIG. 1 illustrates an Evolved Packet System (EPS) to which the present invention can be applied.

In what follows, preferred embodiments according to the present invention will be described in detail with reference to appended drawings. The detailed descriptions provided below together with appended drawings are intended only to explain illustrative embodiments of the present invention, which should not be regarded as the sole embodiments of the present invention. The detailed descriptions below include specific information to provide complete understanding of the present invention. However, those skilled in the art will be able to comprehend that the present invention can be embodied without the specific information.

For some cases, to avoid obscuring the technical principles of the present invention, structures and devices well-known to the public can be omitted or can be illustrated in the form of block diagrams utilizing fundamental functions of the structures and the devices.

A base station in this document is regarded as a terminal node of a network, which performs communication directly with a UE. In this document, particular operations regarded to be performed by the base station may be performed by a upper node of the base station depending on situations. In other words, it is apparent that in a network consisting of a plurality of network nodes including a base station, various operations performed for communication with a UE can be performed by the base station or by network nodes other than the base station. The term Base Station (BS) can be replaced with a fixed station, Node B, evolved-NodeB (eNB), Base Transceiver System (BTS), or Access Point (AP). Also, a terminal can be fixed or mobile; and the term can be replaced with User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter can be part of the base station, and a receiver can be part of the terminal. Similarly, in uplink transmission, a transmitter can be part of the terminal, and a receiver can be part of the base station.

Specific terms used in the following descriptions are introduced to help understanding the present invention, and the specific terms can be used in different ways as long as it does not leave the technical scope of the present invention.

The technology described below can be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA can be implemented by such radio technology as Universal Terrestrial Radio Access (UTRA) or CDMA2000. TDMA can be implemented by such radio technology as Global System for Mobile communications (GSM), General Packet Radio Service (GPRS), or Enhanced Data rates for GSM Evolution (EDGE). OFDMA can be implemented by such radio technology as the IEEE 802.11 (Wi-Fi), the IEEE 802.16 (WiMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

Embodiments of the present invention can be supported by standard documents disclosed in at least one of wireless access systems including the IEEE 802, 3GPP, and 3GPP2 specifications. In other words, among the embodiments of the present invention, those steps or parts omitted for the purpose of clearly describing technical principles of the present invention can be supported by the documents above. Also, all of the terms disclosed in this document can be explained with reference to the standard documents.

To clarify the descriptions, this document is based on the 3GPP LTE/LTE-A, but the technical features of the present invention are not limited to the current descriptions.

Terms used in this document are defined as follows.

Universal Mobile Telecommunication System (UMTS): the 3rd generation mobile communication technology based on GSM, developed by the 3GPP Evolved Packet System (EPS): a network system comprising an Evolved Packet Core (EPC), a packet switched core network based on the Internet Protocol (IP) and an access network such as the LTE and UTRAN. The EPS is a network evolved from the UMTS.

NodeB: the base station of the UMTS network. NodeB is installed outside and provides coverage of a macro cell.

eNodeB: the base station of the EPS network. eNodeB is installed outside and provides coverage of a macro cell.

Home NodeB: It is installed indoors as a based station, and the coverage is a micro cell scale.

Home eNodeB: It is installed indoors as a base station of the EPS network, and the coverage is a micro cell scale.

User Equipment (UE): A UE can be called a terminal, Mobile Equipment (ME), or Mobile Station (MS). A UE can be a portable device such as a notebook computer, mobile phone, Personal Digital Assistant (PDA), smart phone, or a multimedia device; or a fixed device such as a Personal Computer (PC) or vehicle-mounted device. The term UE may refer to an MTC terminal in the description related to MTC.

IP Multimedia Subsystem (IMS): a sub-system providing multimedia services based on the IP International Mobile Subscriber Identity (IMSI): a globally unique subscriber identifier assigned in a mobile communication network Machine Type Communication (MTC): communication performed by machines without human intervention. It may be called Machine-to-Machine (M2M) communication.

MTC terminal (MTC UE or MTC device or MRT apparatus): a terminal (e.g., a vending machine, meter, and so on) equipped with a communication function (e.g., communication with an MTC server through PLMN) operating through a mobile communication network and performing the MTC functions.

MTC server: a server on a network managing MTC terminals. It can be installed inside or outside a mobile communication network. It can provide an interface through which an MTC user can access the server. Also, an MTC server can provide MTC-related services to other servers (in the form of Services Capability Server (SCS)) or the MTC server itself can be an MTC Application Server.

(MTC) application: services (to which MTC is applied) (for example, remote metering, traffic movement tracking, weather observation sensors, and so on)

(MTC) Application Server: a server on a network in which (MTC) applications are performed MTC feature: a function of a network to support MTC applications. For example, MTC monitoring is a feature intended to prepare for loss of a device in an MTC application such as remote metering, and low mobility is a feature intended for an MTC application with respect to an MTC terminal such as a vending machine.

MTC user: an MTC user uses a service provided by an MTC server.

MTC subscriber: an entity having a connection relationship with a network operator and providing services to one or more MTC terminals.

MTC group: an MTC group shares at least one or more MTC features and denotes a group of MTC terminals belonging to MTC subscribers.

Services Capability Server (SCS): an entity being connected to the 3GPP network and used for communicating with an MTC InterWorking Function (MTC-IWF) on a Home PLMN (HPLMN) and an MTC terminal. The SCS provides the capability for a use by one or more MTC applications.

External identifier: a globally unique identifier used by an external entity (for example, an SCS or an Application Server) of the 3GPP network to indicate (or identify) an MTC terminal (or a subscriber to which the MTC terminal belongs). An external identifier comprises a domain identifier and a local identifier as described below.

Domain identifier: an identifier used for identifying a domain in the control region of a mobile communication network service provider. A service provider can use a separate domain identifier for each service to provide an access to a different service.

Local identifier: an identifier used for deriving or obtaining an International Mobile Subscriber Identity (IMSI). A local identifier should be unique within an application domain and is managed by a mobile communication network service provider.

Radio Access Network (RAN): a unit including a Node B, a Radio Network Controller (RNC) controlling the Node B, and an eNodeB in the 3GPP network. The RAN is defined at the terminal level and provides a connection to a core network.

Home Location Register (HLR)/Home Subscriber Server (HSS): a database provisioning subscriber information within the 3GPP network. An HSS can perform functions of configuration storage, identity management, user state storage, and so on.

RAN Application Part (RANAP): an interface between the RAN and a node in charge of controlling a core network (in other words, a Mobility Management Entity (MME)/Serving GPRS (General Packet Radio Service) Supporting Node (SGSN)/Mobile Switching Center (MSC)).

Public Land Mobile Network (PLMN): a network formed to provide mobile communication services to individuals. The PLMN can be formed separately for each operator.

Non-Access Stratum (NAS): a functional layer for exchanging signals and traffic messages between a terminal and a core network at the UMTS and EPS protocol stack. The NAS is used primarily for supporting mobility of a terminal and a session management procedure for establishing and maintaining an IP connection between the terminal and a PDN GW.

Service Capability Exposure Function (SCEF): an entity in 3GPP architecture for the service capability exposure that provides a means for safely exposing a service and a capability provided by 3GPP network interface.

MME (Mobility Management Entity): A network node in an EPS network, which performs mobility management and session management functions PDN-GW (Packet Data Network Gateway): A network node in the EPS network, which performs UE IP address allocation, packet screening and filtering, and charging data collection functions.

Serving GW (Serving Gateway): A network node in the EPS network, which performs functions such as mobility anchor, packet routing, idle mode packet buffering, and triggering paging for the ME of MME Policy and Charging Rule Function (PCRF): A node in the EPS network, which performs policy decision to dynamically apply differentiated QoS and billing policies for each service flow Open Mobile Alliance Device Management (OMA DM): A protocol designed to manage mobile devices such as mobile phones, PDAs, and portable computers, which performs such functions as device configuration, firmware upgrade, and error report Operation Administration and Maintenance (OAM): A network management function group which provides network fault indication, performance information, and data and diagnostic functions NAS configuration MO (Management Object): A Management Object (MO) used to configure the UE with the parameters associated with the NAS functionality.

PDN (Packet Data Network): A network in which a server supporting a specific service (e.g., MMS server, WAP server, etc.) is located.

PDN connection: A connection from the UE to the PDN, that is, the association (connection) between the UE represented by the IP address and the PDN represented by the APN.

APN (Access Point Name): A string that refers to or identifies the PDN. It is a name (string) (e.g., internet.mnc012.mcc345.gprs) predefined in the network when the P-GW is accessed to access the requested service or network (PDN).

Home Location Register (HLR)/Home Subscriber Server (HSS): A database (DB) that represents subscriber information in the 3GPP network.

NAS (Non-Access-Stratum): The upper stratum of the control plane between the UE and the MME. It supports mobility management, session management and IP address maintenance between the UE and the network.

AS (Access-Stratum): It includes the protocol stack between the UE and the radio (or access) network and is responsible for transmitting data and network control signals.

In what follows, the present invention will be described based on the terms defined above.

Overview of system to which the present invention can be applied

FIG. 1 illustrates an Evolved Packet System (EPS) to which the present invention can be applied.

The network structure of FIG. 1 is a simplified diagram restructured from an Evolved Packet System (EPS) including Evolved Packet Core (EPC).

The EPC is a main component of the System Architecture Evolution (SAE) intended for improving performance of the 3GPP technologies. SAE is a research project for determining a network structure supporting mobility between multiple heterogeneous networks. For example, SAE is intended to provide an optimized packet-based system which supports various IP-based wireless access technologies, provides much more improved data transmission capability, and so on.

More specifically, the EPC is the core network of an IP-based mobile communication system for the 3GPP LTE system and capable of supporting packet-based real-time and non-real time services. In the existing mobile communication systems (namely, in the 2nd or 3rd mobile communication system), functions of the core network have been implemented through two separate sub-domains: a Circuit-Switched (CS) sub-domain for voice and a Packet-Switched (PS) sub-domain for data. However, in the 3GPP LTE system, an evolution from the 3rd mobile communication system, the CS and PS sub-domains have been unified into a single IP domain. In other words, in the 3GPP LTE system, connection between UEs having IP capabilities can be established through an IP-based base station (for example, eNodeB), EPC, and application domain (for example, IMS).

In other words, the EPC provides the architecture essential for implementing end-to-end IP services.

The EPC comprises various components, where FIG. 1 illustrates part of the EPC components, including a Serving Gateway (SGW or S-GW), Packet Data Network Gateway (PDN GW or PGW or P-GW), Mobility Management Entity (MME), Serving GPRS Supporting Node (SGSN), and enhanced Packet Data Gateway (ePDG).

The SGW operates as a boundary point between the Radio Access Network (RAN) and the core network and maintains a data path between the eNodeB and the PDN GW. Also, in case the UE moves across serving areas by the eNodeB, the SGW acts as an anchor point for local mobility. In other words, packets can be routed through the SGW to ensure mobility within the E-UTRAN (Evolved-UMTS (Universal Mobile Telecommunications System) Terrestrial Radio Access Network defined for the subsequent versions of the 3GPP release 8). Also, the SGW may act as an anchor point for mobility between the E-UTRAN and other 3GPP networks (the RAN defined before the 3GPP release 8, for example, UTRAN or GERAN (GSM (Global System for Mobile Communication)/EDGE (Enhanced Data rates for Global Evolution) Radio Access Network).

The PDN GW corresponds to a termination point of a data interface to a packet data network. The PDN GW can support policy enforcement features, packet filtering, charging support, and so on. Also, the PDN GW can act as an anchor point for mobility management between the 3GPP network and non-3GPP networks (for example, an unreliable network such as the Interworking Wireless Local Area Network (I-WLAN) or reliable networks such as the Code Division Multiple Access (CDMA) network and Wimax).

In the example of a network structure as shown in FIG. 1, the SGW and the PDN GW are treated as separate gateways; however, the two gateways can be implemented according to single gateway configuration option.

The MME performs signaling for the UE's access to the network, supporting allocation, tracking, paging, roaming, handover of network resources, and so on; and control functions. The MME controls control plane functions related to subscribers and session management. The MME manages a plurality of eNodeBs and performs signaling of the conventional gateway's selection for handover to other 2G/3G networks. Also, the MME performs such functions as security procedures, terminal-to-network session handling, idle terminal location management, and so on.

The SGSN deals with all kinds of packet data including the packet data for mobility management and authentication of the user with respect to other 3GPP networks (for example, the GPRS network).

The ePDG acts as a security node with respect to an unreliable, non-3GPP network (for example, I-WLAN, WiFi hotspot, and so on).

As described with respect to FIG. 1, a UE with the IP capability can access the IP service network (for example, the IMS) that a service provider (namely, an operator) provides, via various components within the EPC based not only on the 3GPP access but also on the non-3GPP access.

Also, FIG. 1 illustrates various reference points (for example, S1-U, S1-MME, and so on). The 3GPP system defines a reference point as a conceptual link which connects two functions defined in disparate functional entities of the E-UTAN and the EPC. Table 1 below summarizes reference points shown in FIG. 1. In addition to the examples of FIG. 1, various other reference points can be defined according to network structures.

TABLE 1

| Reference point | Description |
|---|---|
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3 GPP access network mobility in idle and/or active state. This reference point can be used intra-PLMN or inter-PLMN (e.g. in the case of Inter-PLMN HO). |
| S4 | It provides related control and mobility support between GPRS core and the 3GPP anchor function of Serving GW. In addition, if direct tunnel is not established, it provides the user plane tunneling. |
| S5 | It provides user plane tunneling and tunnel management between Serving GW and PDN GW. It is used for Serving GW relocation due to UE mobility if the Serving GW needs to connect to a non-collocated PDN GW for the required PDN connectivity. |
| S11 | Reference point for the control plane protocol between MME and SGW |
| SGi | It is the reference point between the PDN GW and the packet data network. Packet data network may be an operator external public or private packet data network or an intra-operator packet data network (e.g., for provision of IMS services). This reference point corresponds to Gi for 3GPP accesses. |

Among the reference points shown in FIG. 1, S2a and S2b corresponds to non-3GPP interfaces. S2a is a reference point which provides reliable, non-3GPP access, related control between PDN GWs, and mobility resources to the user plane. S2b is a reference point which provides related control and mobility resources to the user plane between ePDG and PDN GW.

Figure 2:
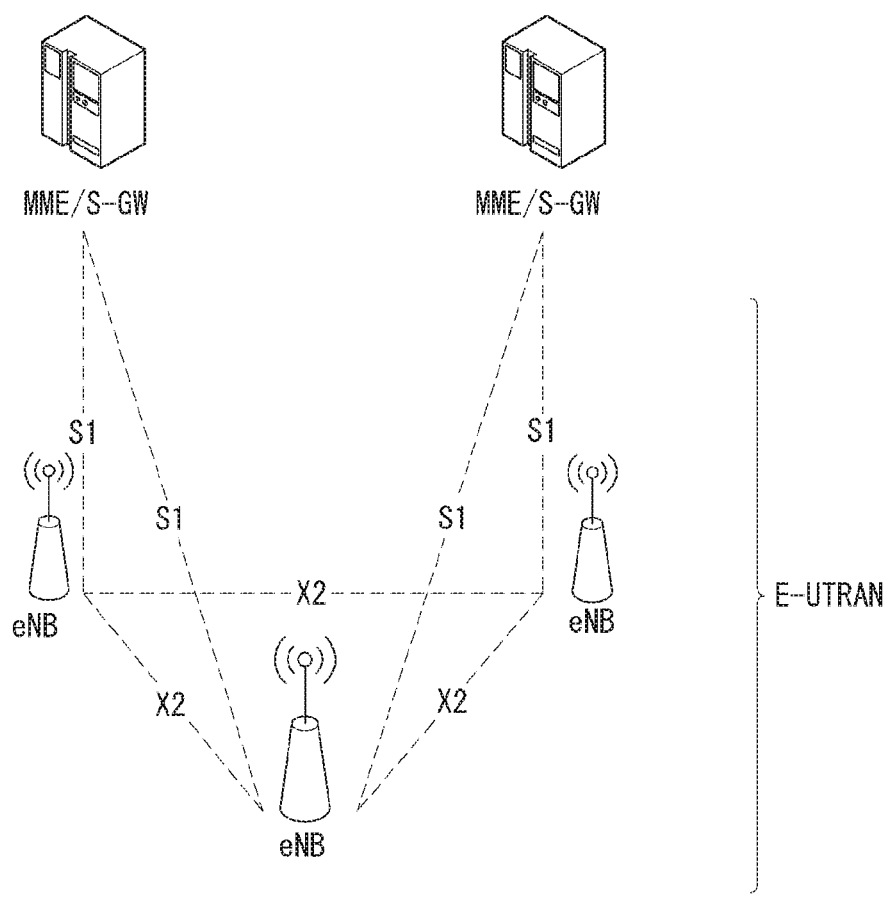
FIG. 2 illustrates one example of an Evolved Universal Terrestrial Radio Access Network (E-UTRAN) to which the present invention can be applied.

FIG. 2 illustrates one example of an Evolved Universal Terrestrial Radio Access Network (E-UTRAN) to which the present invention can be applied.

The E-UTRAN system has evolved from an existing UTRAN system and may be the 3GPP LTE/LTE-A system, for example. A communication system is disposed over a wide area to provide various communication services including voice communication through IMS and packet data (for example, VoIP (Voice over Internet Protocol)).

Referring to FIG. 2, an E-UMTS network comprises an E-UTRAN, EPC, and one or more UEs. The E-UTRAN comprises eNBs providing a UE with a control plane and user plane protocols, where the eNBs are connected to each other through X2 interface.

The X2 user plane interface (X2-U) is defined among the eNBs. The X2-U interface provides non-guaranteed delivery of the user plane Packet Data Unit (PDU). The X2 control plane interface (X2-CP) is defined between two neighboring eNBs. The X2-CP performs the functions of context delivery between eNBs, control of user plane tunnel between a source eNB and a target eNB, delivery of handover-related messages, uplink load management, and so on.

The eNB is connected to the UE through a radio interface and is connected to the Evolved Packet Core (EPC) through the S1 interface.

The S1 user plane interface (S1-U) is defined between the eNB and the Serving Gateway (S-GW). The S1 control plane interface (S1-MME) is defined between the eNB and the Mobility Management Entity (MME). The S1 interface performs the functions of EPS bearer service management, NAS signaling transport, network sharing, MME load balancing management, and so on. The S1 interface supports many-to-many-relation between the eNB and the MME/S-GW.

An MME is capable of performing various functions such as NAS signaling security, AS (Access Stratum) security control, inter-CN (Core Network) signaling for supporting mobility among 3GPP access networks, IDLE mode UE reachability (including performing and controlling retransmission of a paging message), TAI (Tracking Area Identity) management (for IDLE and active mode UEs), PDN GW and SGW selection, MME selection for handover in which MMEs are changed, SGSN selection for handover to a 2G or 3G 3GPP access network, roaming, authentication, bearer management function including dedicated bearer establishment, and support for transmission of a PWS (Public Warning System) (including Earthquake and Tsunami Warning System (ETWS) and Commercial Mobile Alert System (CMAS)) message.

Figure 3:
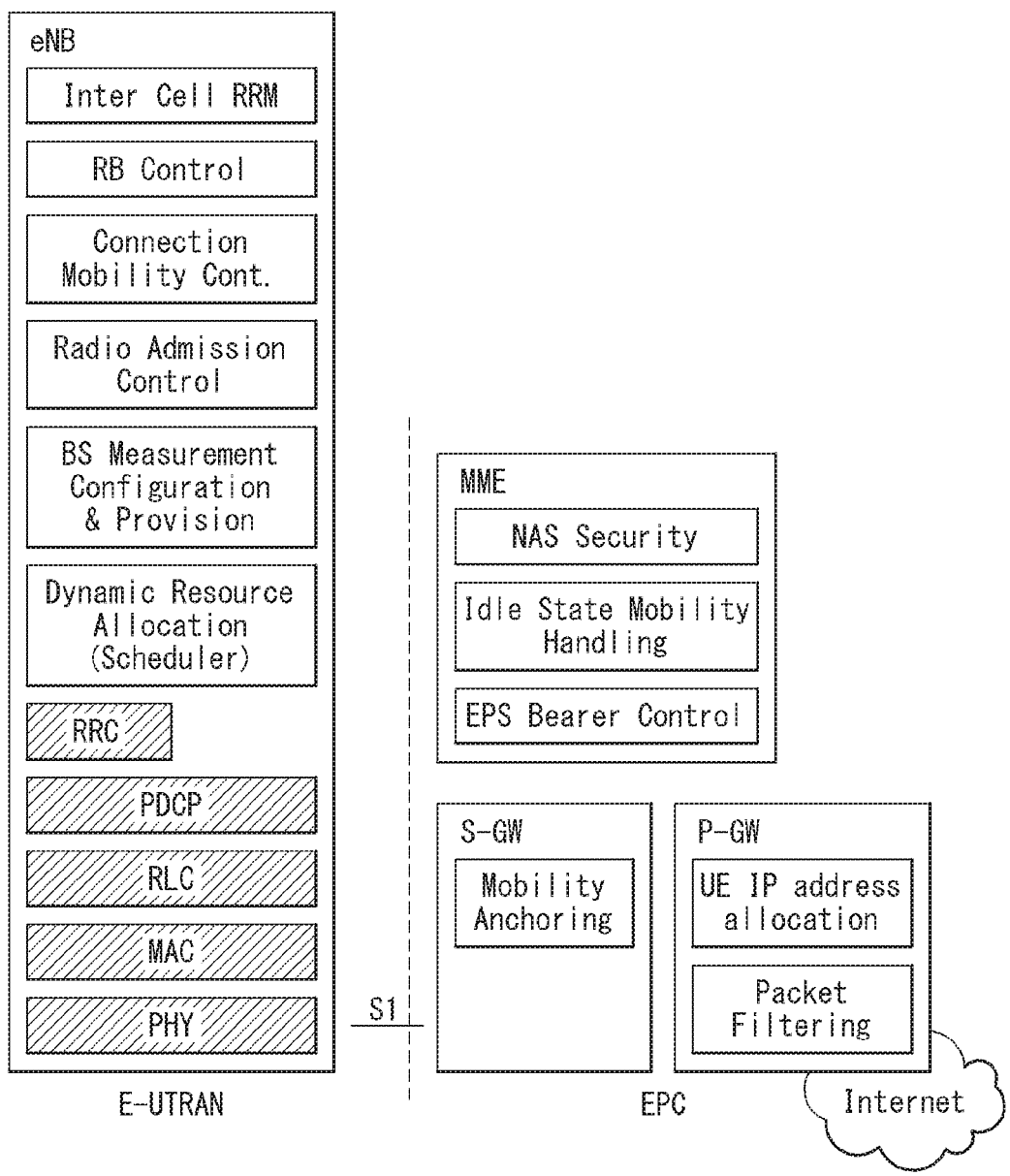
FIG. 3 illustrates structures of an E-UTRAN and an EPC in a wireless communication system to which the present invention may be applied.

FIG. 3 illustrates structures of an E-UTRAN and an EPC in a wireless communication system to which the present invention may be applied.

Referring to FIG. 3, an eNB is capable of performing functions such as selection of a gateway (for example, MME), routing to a gateway during RRC (Radio Resource Control) activation, scheduling and transmission of a BCH (Broadcast Channel), dynamic resource allocation for a UE in uplink and downlink transmission, and mobility control connection in an LTE_ACTIVE state. As described above, a gateway belonging to an EPC is capable of performing functions such as paging origination, LTE_IDLE state management, ciphering of a user plane, SAE (System Architecture Evolution) bearer control, and ciphering of NAS signaling and integrity protection.

FIG. 4 illustrates a radio interface protocol structure between a UE and an E-UTRAN in a wireless communication system to which the present invention can be applied.

FIG. 4(a) illustrates a radio protocol structure for the control plane, and FIG. 4(b) illustrates a radio protocol structure for the user plane.

With reference to FIG. 4, layers of the radio interface protocol between the UE and the E-UTRAN can be divided into a first layer (L1), a second layer (L2), and a third layer (L3) based on the lower three layers of the Open System Interconnection (OSI) model, widely known in the technical field of communication systems. The radio interface protocol between the UE and the E-UTRAN consists of the physical layer, data link layer, and network layer in the horizontal direction, while in the vertical direction, the radio interface protocol consists of the user plane, which is a protocol stack for delivery of data information, and the control plane, which is a protocol stack for delivery of control signals.

The control plane acts as a path through which control messages used for the UE and the network to manage calls are transmitted. The user plane refers to the path through which the data generated in the application layer, for example, voice data, Internet packet data, and so on are transmitted. In what follows, described will be each layer of the control and the user plane of the radio protocol.

The physical layer (PHY), which is the first layer (L1), provides information transfer service to upper layers by using a physical channel. The physical layer is connected to the Medium Access Control (MAC) layer located at the upper level through a transport channel through which data are transmitted between the MAC layer and the physical layer. Transport channels are classified according to how and with which features data are transmitted through the radio interface. And data are transmitted through the physical channel between different physical layers and between the physical layer of a transmitter and the physical layer of a receiver. The physical layer is modulated according to the Orthogonal Frequency Division Multiplexing (OFDM) scheme and employs time and frequency as radio resources.

A few physical control channels are used in the physical layer. The Physical Downlink Control Channel (PDCCH) informs the UE of resource allocation of the Paging Channel (PCH) and the Downlink Shared Channel (DL-SCH); and Hybrid Automatic Repeat reQuest (HARQ) information related to the Uplink Shared Channel (UL-SCH). Also, the PDCCH can carry a UL grant used for informing the UE of resource allocation of uplink transmission. The Physical Control Format Indicator Channel (PCFICH) informs the UE of the number of OFDM symbols used by PDCCHs and is transmitted at each subframe. The Physical HARQ Indicator Channel (PHICH) carries a HARQ ACK (ACKnowledge)/NACK (Non-ACKnowledge) signal in response to uplink transmission. The Physical Uplink Control Channel (PUCCH) carries uplink control information such as HARQ ACK/NACK with respect to downlink transmission, scheduling request, Channel Quality Indicator (CQI), and so on. The Physical Uplink Shared Channel (PUSCH) carries the UL-SCH.

The MAC layer of the second layer (L2) provides a service to the Radio Link Control (RLC) layer, which is an upper layer thereof, through a logical channel. Also, the MAC layer provides a function of mapping between a logical channel and a transport channel; and multiplexing/demultiplexing a MAC Service Data Unit (SDU) belonging to the logical channel to the transport block, which is provided to a physical channel on the transport channel.

The RLC layer of the second layer (L2) supports reliable data transmission. The function of the RLC layer includes concatenation, segmentation, reassembly of the RLC SDU, and so on. To satisfy varying Quality of Service (QoS) requested by a Radio Bearer (RB), the RLC layer provides three operation modes: Transparent Mode (TM), Unacknowledged Mode (UM), and Acknowledge Mode (AM). The AM RLC provides error correction through Automatic Repeat reQuest (ARQ). Meanwhile, in case the MAC layer performs the RLC function, the RLC layer can be incorporated into the MAC layer as a functional block.

The Packet Data Convergence Protocol (PDCP) layer of the second layer (L2) performs the function of delivering, header compression, ciphering of user data in the user plane, and so on. Header compression refers to the function of reducing the size of the Internet Protocol (IP) packet header which is relatively large and includes unnecessary control to efficiently transmit IP packets such as the IPv4 (Internet Protocol version 4) or IPv6 (Internet Protocol version 6) packets through a radio interface with narrow bandwidth. The function of the PDCP layer in the control plane includes delivering control plane data and ciphering/integrity protection.

The Radio Resource Control (RRC) layer in the lowest part of the third layer (L3) is defined only in the control plane. The RRC layer performs the role of controlling radio resources between the UE and the network. To this purpose, the UE and the network exchange RRC messages through the RRC layer. The RRC layer controls a logical channel, transport channel, and physical channel with respect to configuration, re-configuration, and release of radio bearers. A radio bearer refers to a logical path that the second layer (L2) provides for data transmission between the UE and the network. Configuring a radio bearer indicates that characteristics of a radio protocol layer and channel are defined to provide specific services; and each individual parameter and operating methods thereof are determined. Radio bearers can be divided into Signaling Radio Bearers (SRBs) and Data RBs (DRBs). An SRB is used as a path for transmitting an RRC message in the control plane, while a DRB is used as a path for transmitting user data in the user plane.

The Non-Access Stratum (NAS) layer in the upper of the RRC layer performs the function of session management, mobility management, and so on.

A cell constituting the base station is set to one of 1.25, 2.5, 5, 10, and 20 MHz bandwidth, providing downlink or uplink transmission services to a plurality of UEs. Different cells can be set to different bandwidths.

Downlink transport channels transmitting data from a network to a UE include a Broadcast Channel (BCH) transmitting system information, PCH transmitting paging messages, DL-SCH transmitting user traffic or control messages, and so on. Traffic or a control message of a downlink multi-cast or broadcast service can be transmitted through the DL-SCH or through a separate downlink Multicast Channel (MCH). Meanwhile, uplink transport channels transmitting data from a UE to a network include a Random Access Channel (RACH) transmitting the initial control message and a Uplink Shared Channel (UL-SCH) transmitting user traffic or control messages.

A logical channel lies above a transmission channel and is mapped to the transmission channel. The logical channel may be divided into a control channel for delivering control area information and a traffic channel for delivering user area information. The control channel may include a BCCH (Broadcast Control Channel), PCCH (Paging Control Channel), CCCH (Common Control Channel), DCCH (Dedicated Control Channel), and MCCH (Multicast Control Channel). The traffic channel may include a DTCH (Dedicated Traffic Channel) and MTCH (Multicast Traffic Channel). The PCCH is a downlink channel for delivering paging information and is used when a network does not know the cell to which a UE belongs. The CCCH is used by a UE that does not have an RRC connection to a network. The MCCH is a point-to-multipoint downlink channel used for delivering MBMS (Multimedia Broadcast and Multicast Service) control information from a network to a UE. The DCCH is a point-to-point bi-directional channel used by a UE with an RRC connection delivering dedicated control information between a UE and a network. The DTCH is a point-to-point channel dedicated to one UE for delivering user information that may exist in an uplink and downlink. The MTCH is a point-to-multipoint downlink channel for delivering traffic data from a network to a UE.

In the case of an uplink connection between a logical channel and a transport channel, the DCCH may be mapped to a UL-SCH, and the DTCH may be mapped to a UL-SCH, and the CCCH may be mapped to a UL-SCH. In the case of a downlink connection between a logical channel and a transport channel, the BCCH may be mapped to a BCH or DL-SCH, the PCCH may be mapped to a PCH, the DCCH may be mapped to a DL-SCH, the DTCH may be mapped to a DL-SCH, the MCCH may be mapped to an MCH, and the MTCH may be mapped to the MCH.

FIG. 5 illustrates an S1 interface protocol structure in a wireless communication system to which the present invention can be applied.

FIG. 5(a) illustrates the control plane protocol stack in the S1 interface, and FIG. 5(b) illustrates the user plane interface protocol structure in the S1 interface.

With reference to FIG. 5, the S1 control plane interface (S1-MME) is defined between the eNB and the MME. Similar to the user plane, the transport network layer is based on IP transmission. However, to ensure reliable transmission of message signaling, the transport network layer is added to the Stream Control Transmission Protocol (SCTP) layer which sits on top of the IP layer. The application layer signaling protocol is called S1 Application Protocol (S1-AP).

The SCTP layer provides guaranteed delivery of application layer messages.

The transport IP layer employs point-to-point transmission for Protocol Data Unit (PDU) signaling transmission.

For each S1-MME interface instance, single SCTP association uses a pair of stream identifiers for the S-MME common procedure. Only part of stream identifier pairs is used for the S1-MME dedicated procedure. The MME communication context identifier is allocated by the MME for the S1-MME dedicated procedure, and the eNB communication context identifier is allocated by the eNB for the S1-MME dedicated procedure. The MME communication context identifier and the eNB communication context identifier are used for identifying a UE-specific S1-MME signaling transmission bearer. The communication context identifier is delivered within each S1-AP message.

In case the S1 signaling transport layer notifies the S1AP layer of disconnection of signaling, the MME changes the state of the UE which has used the corresponding signaling connection to ECM-IDLE state. And the eNB releases RRC connection of the corresponding UE.

The S1 user plane interface (S1-U) is defined between eNB and S-GW. The S1-U interface provides non-guaranteed delivery of the user plane PDU between the eNB and the S-GW. The transport network layer is based on IP transmission, and the GPRS Tunneling Protocol User Plane (GTP-U) layer is used on top of the UDP/IP layer to deliver the user plane PDU between the eNB and the S-GW.

Figure 6:
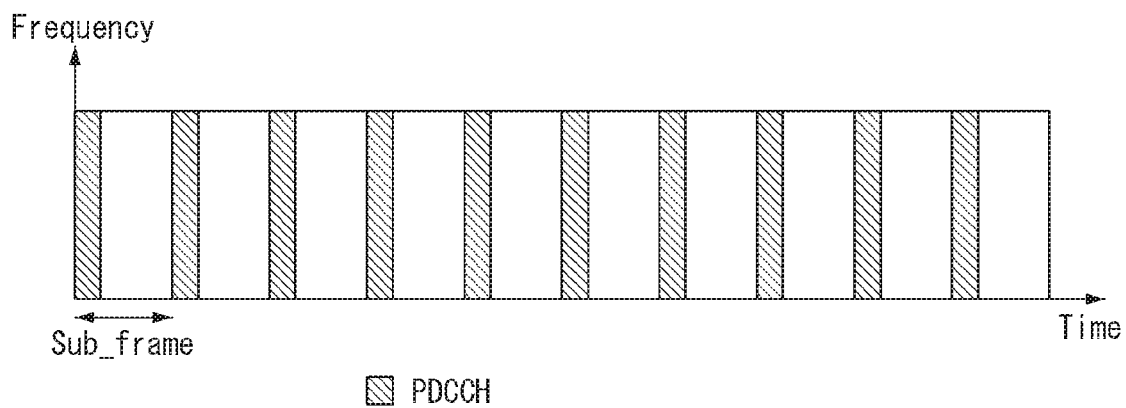
FIG. 6 illustrates a physical channel structure in a wireless communication system to which the present invention may be applied.

FIG. 6 illustrates a physical channel structure in a wireless communication system to which the present invention may be applied.

Referring to FIG. 6, a physical channel delivers signaling and data by using a radio resource comprising one or more subcarriers in the frequency domain and one or more symbols in the time domain.

One subframe having a length of 1.0 ms comprises a plurality of symbols. A specific symbol(s) of a subframe (for example, a first symbol of a subframe) may be used for a PDCCH. The PDCCH carries information about dynamically allocated resources (for example, resource block and MCS (Modulation and Coding Scheme)).

EMM and ECM state

In what follows, EPS Mobility Management (EMM) and EPS Connection Management (ECM) states will be described.

Figure 7:
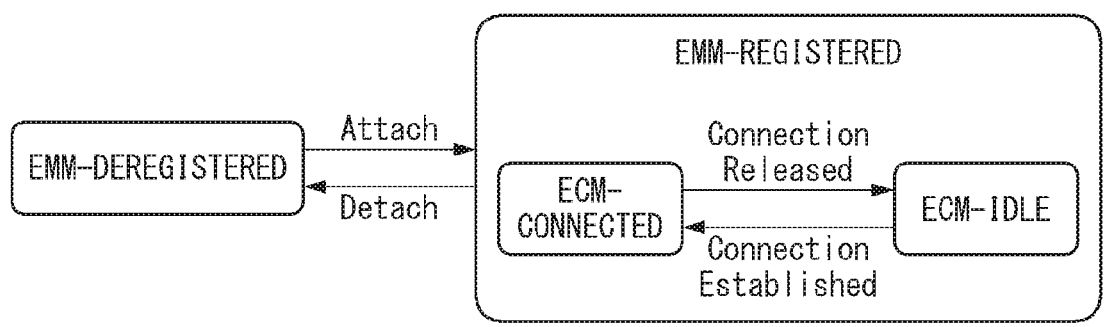
FIG. 7 illustrates an EMM and ECM states in a wireless communication system to which the present invention may be applied.

FIG. 7 illustrates an EMM and ECM states in a wireless communication system to which the present invention can be applied.

With reference to FIG. 7, to manage mobility of the UE in the NAS layer defined in the control planes of the UE and the MME, EMM-REGISTERED and EMM-DEREGISTERED states can be defined according to the UE is attached to or detached from a network. The EMM-REGISTERED and the EMM-DEREGISTERED states can be applied to the UE and the MME.

Initially, the UE stays in the EMM-DEREGISTERED state as when the UE is first powered on and performs registering to a network through an initial attach procedure to connect to the network. If the connection procedure is performed successfully, the UE and the MME makes transition to the EMM-REGISTERED state. Also, in case the UE is powered off or the UE fails to establish a radio link (namely, a packet error rate for a radio link exceeds a reference value), the UE is detached from the network and makes a transition to the EMM-DEREGISTERED state.

In addition, to manage signaling connection between the UE and the network, ECM-CONNECTED and ECM-IDLE states can be defined. The ECM-CONNECTED and ECM-IDLE states can also be applied to the UE and the MME. ECM connection consists of RRC connection formed between the UE and the eNB; and S1 signaling connection formed between the eNB and the MME. In other words, establishing/releasing an ECM connection indicates that both of the RRC connection and S1 signaling connection have been established/released.

The RRC state indicates whether the RRC layer of the UE is logically connected to the RRC layer of the eNB. In other words, in case the RRC layer of the UE is connected to the RRC layer of the eNB, the UE stays in the RRC_CONNECTED state. If the RRC layer of the UE is not connected to the RRC layer of the eNB, the UE stays in the RRC_IDLE state.

The network can identify the UE staying in the ECM-CONNECTED state at the level of cell unit and can control the UE in an effective manner.

On the other hand, the network is unable to know the existence of the UE staying in the ECM-IDLE state, and a Core Network (CN) manages the UE on the basis of a tracking area unit which is an area unit larger than the cell. While the UE stays in the ECM-IDLE state, the UE performs Discontinuous Reception (DRX) that the NAS has configured by using the ID allocated uniquely in the tracking area. In other words, the UE can receive a broadcast signal of system information and paging information by monitoring a paging signal at a specific paging occasion for each UE-specific paging DRX cycle.

When the UE is in the ECM-IDLE state, the network does not carry context information of the UE. Therefore, the UE staying in the ECM-IDLE state can perform a mobility-related procedure based on the UE such as cell selection or cell reselection without necessarily following an order of the network. In case the location of the UE differs from the location recognized by the network while the UE is in the ECM-IDLE state, the UE can inform the network of the corresponding location of the UE through a Tracking Area Update (TAU) procedure.

On the other hand, when the UE is in the ECM-CONNECTED state, mobility of the UE is managed by an order of the network. While the UE stays in the ECM-CONNECTED state, the network knows to which cell the UE currently belongs. Therefore, the network can transit and/or receiver data to or from the UE, control mobility of the UE such as handover, and perform cell measurement with respect to neighboring cells.

As described above, the UE has to make a transition to the ECM-CONNECTED state in order to receive a general mobile communication service such as a voice or data communication service. As when the UE is first powered on, the UE in its initial state stays in the ECM-IDLE state as in the EMM state, and if the UE successfully registers to the corresponding network through an initial attach procedure, the UE and the MEE make a transition to the ECM connection state. Also, in case the UE has already registered to the network but radio resources are not allocated as traffic is not activated, the UE stays in the ECM-IDLE state, and if new uplink or downlink traffic is generated for the corresponding UE, the UE and the MME make a transition to the ECM-CONNECTED state through a Service Request procedure.

Random Access Procedure

In what follows, a random access procedure provided by the LTE/LTE-A system will be described.

A UE employs the random access procedure to obtain uplink synchronization with an eNB or to have uplink radio resources. After being powered up, the UE acquires downlink synchronization with an initial cell and receives system information. From the system information, the UE obtains a set of available random access preambles and information about a radio resource used for transmission of a random access preamble. The radio resource used for transmission of a random access preamble may be specified by a combination of at least one or more subframe indices and indices on the frequency domain. The UE transmits a random access preamble selected in a random fashion from the set of random access preambles, and the eNB receiving the random access preamble transmits a TA (Timing Alignment) value for uplink synchronization through a random access response. By using the procedure above, the UE obtains uplink synchronization.

The random access procedure is common to FDD (Frequency Division Duplex) and TDD (Time Division Duplex) scheme. The random access procedure is independent of a cell size and is also independent of the number of serving cells in case CA (Carrier Aggregation) is configured.

First, a UE performs the random access procedure in the following cases.

The case in which a UE performs initial access in an RRC idle state in the absence of an RRC connection to an eNB The case in which a UE performs an RRC connection re-establishment procedure The case in which a UE connects to a target cell for the first time while performing a handover procedure The case in which a random access procedure is requested by a command from an eNB The case in which downlink data are generated while uplink synchronization is not met in the RRC connected state The case in which uplink data are generated while uplink synchronization is not met in the RRC connected state or a designated radio resource used for requesting a radio resource is not allocated The case in which positioning of a UE is performed while timing advance is needed in the RRC connected state The case in which a recovery process is performed at the time of a radio link failure or handover failure The 3GPP Rel-10 specification takes into account applying a TA (Timing Advance) value applicable to one specific cell (for example, P cell) commonly to a plurality of cells in a wireless access system. However, a UE may combine a plurality of cells belonging to different frequency bands (namely separated with a large distance in the frequency domain) or a plurality of cells having different propagation characteristics. Also, in the case of a specific cell, if the UE performs communication with the eNB (namely macro eNB) through one cell and performs communication with the SeNB through other cell while a small cell such as an RRH (Remote Radio Header) (namely repeater), femto-cell, or pico-cell or a secondary eNB (SeNB) is disposed within the cell for coverage expansion or removal of a coverage hole, a plurality of cells may have different propagation delays. In this case, when the UE performs uplink transmission so that one TA value is applied commonly to a plurality of cells, synchronization of uplink signals transmitted among the plurality of cells may be seriously influenced. Therefore, it may be preferable to have multiple TA values under the CA mode in which a plurality of cells are aggregated. The 3GPP Rel-11 specification takes into account allocating a TA value separately for each specific cell group to support multiple TA values. This is called a TA group (TAG); a TAG may have one or more cells, and the same TA value may be applied commonly to one or more cells belonging to the TAG. To support the multiple TA values, a MAC TA command control element is composed of a 2-bit TAG Identity (ID) and a 6-bit TA command field.

The UE on which a carrier aggregation is configured performs the random access procedure in case that the random access procedure previously described is required in connection with PCell. In case of TAG (that is, primary TAG (pTAG)) to which PCell belongs, the TA, which is determined based on PCell same as the existing case, or regulated through the random access procedure that accompanies PCell, can be applied to all the cells within the pTAG. Meanwhile, in case of TAG (that is, secondary TAG (sTAG)) that is configured with SCells only, the TA, which is determined based on a specific SCell within sTAG, can be applied to all the cells within the corresponding sTAG, and in this time, the TA may be acquired through the random access procedure by being initiated by the eNB. Particularly, the SCell in the sTAG is set to be a (Random Access Channel) RACH resource, and the eNB requests a RACH access in SCell for determining TA. That is, the eNB initiates the RACH transmission on the SCells by PDCCH order that is transmitted from PCell. The response message for the SCell preamble is transmitted through PCell by using RA-RNTI. The TA that is determined based on SCell that successfully completes the random access can be applied to all the cells in the corresponding sTAG by the UE. Like this, the random access procedure may be performed in SCell as well in order to acquire timing alignment of the sTAG to which the corresponding SCell belongs.

In a process of selecting a random access preamble (RACH preamble), the LTE/LTE-A system supports both of a contention based random access procedure and a non-contention based random access procedure. In the former procedure, a UE selects one arbitrary preamble from a specific set, while, in the latter procedure, the UE uses the random access preamble that an eNB has allocated only to the specific UE. It should be noted, however, that the non-contention based random access procedure may be confined to the handover process described above, a case requested by a command from the eNB, and UE positioning and/or timing advance alignment for sTAG. After the random access procedure is completed, a normal uplink/downlink transmission occurs.

Meanwhile, a relay node (RN) also support both of the contention based random access procedure and the non-contention based random access procedure. When a relay node performs the random access procedure, RN subframe configuration is suspended. That is, this means that the RN subframe configuration is temporarily discarded. Thereafter, the RN subframe structure is resumed at the time when the random access procedure is successfully completed.

Figure 8:
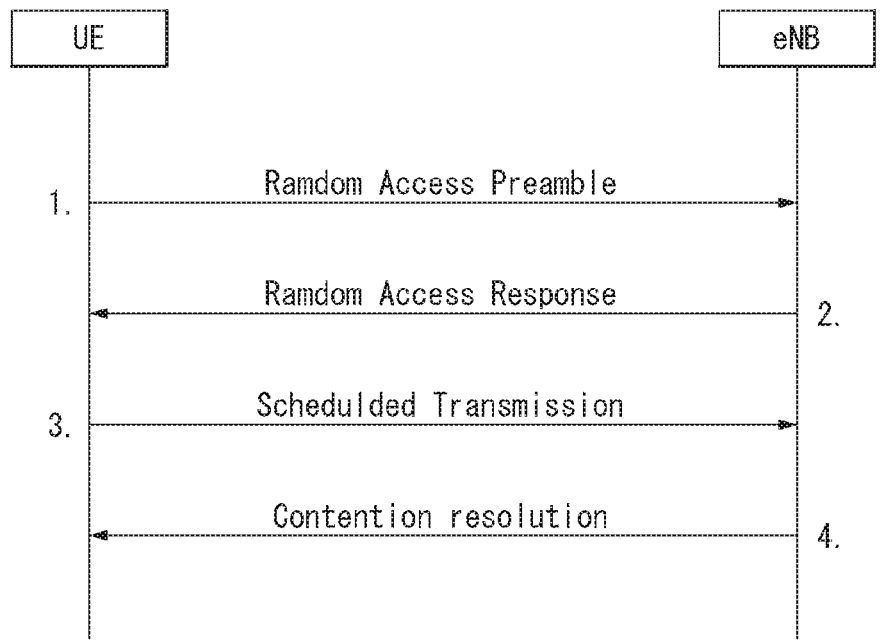
FIG. 8 illustrates a contention-based random access procedure in a wireless communication system to which the present invention may be applied.

FIG. 8 illustrates a contention-based random access procedure in a wireless communication system to which the present invention may be applied.

(1) Msg 1 (Message 1)

First, a UE selects one random access preamble (RACH preamble) randomly from a set of random access preambles indicated by system information or a handover command. The UE then selects a PRACH (Physical RACH) resource capable of transmitting the random access preamble and transmits the random access preamble by using the PRACH resource.

A random access preamble is transmitted in six bits on the RACH transmission channel, where the six bit comprises a 5-bit random identity for identifying a UE which transmits a RACH preamble and 1 bit for representing additional information (for example, indicating size of Msg 3).

An eNB which has received a random access preamble from a UE decodes the preamble and obtains RA-RNTI. A time-frequency resource of a random access preamble transmitted by the corresponding UE determines the RA-RNTI related to a PRACH to which a random access preamble is transmitted.

(2) Msg 2 (Message 2)

The eNB transmits a random access response to the UE, where the RA-RNTI obtained by using the preamble on Msg 1 addresses the random access response. A random access response may include an RA preamble index/identifier, UL grant indicating a uplink radio resource, Temporary Cell RNTI (TC-RNTI), and Time Alignment Command (TAC). A TAC indicates a time synchronization value that the eNB transmits to the UE to maintain uplink time alignment. The UE updates uplink transmission timing by using the time synchronization value. If the UE updates time synchronization, the UE initiates or restarts a time alignment timer. The UL grant includes uplink resource allocation and TPC (Transmit Power Command) used for transmitting a scheduling message (Msg 3) described later. The TPC is used to determine the transmission power for a scheduled PUSCH.

The UE attempts to receive a random access response within a random access response window indicated by the eNB through system information or a handover command, detects a PDCCH masked with an RA-RNTI corresponding to the PRACH, and receives a PDSCH indicated by the detected PDCCH. The random access response information may be transmitted in the form of a MAC PDU (MAC Packet Data Unit) and the MAC PDU may be transmit through the PDSCH. It is preferable that the PDCCH should include information of the UE that has to receive the PDSCH, frequency and time information of a radio resource of the PDSCH, and transmission format of the PDSCH. As described above, once the UE succeeds to detect the PDCCH transmitted to itself, it may properly receive a random access response transmitted to the PDSCH according to the information of the PDCCH.

The random access response window refers to a maximum time interval in which the UE transmitting a preamble waits to receive a random access response message. The random access response window has a length of 'ra-ResponseWindowSize' starting from a subframe after three subframes in the last subframe transmitting a preamble. In other words, the UE waits to receive a random access response during a random access window secured after three subframes from the subframe completed transmission of the preamble. The UE may obtain the random access window size ('ra-ResponseWindowsize') parameter through system information, and the random access window size is determined to be a value between 2 to 10.

If receiving a random access response having the same random access preamble delimiter/identity as that of the random access preamble transmitted to the eNB, the UE stops monitoring the random access response. On the other hand, if failing to receive a random access response message until a random access response window is terminated or failing to receive a valid random access response having the same random access preamble identity as that of the random access preamble transmitted to the eNB, the UE may consider reception of the random access response as having failed and then perform retransmission of the preamble.

As described above, the reason why a random access preamble identity is needed for a random access response is that one random access response may include random access response information for one or more UEs and thus it is necessary to indicate to which UE the UL grant, TC-RNTI, and TAC is valid.

(3) Msg 3 (Message 3)

Receiving a valid random access response, the UE separately processes the information included in the random access response. In other words, the UE applies the TAC and stores the TC-RNTI. Also, by using the UL grant, the UE transmits the data stored in its buffer or newly generated data to the eNB. In case the UE is connected for the first time, an RRC Connection request generated at the RRC layer and transmitted through a CCCH may be included in the Msg 3 and transmitted. And in the case of an RRC Connection Re-establishment procedure, an RRC Connection Re-establishment request generated at the RRC layer and transmitted through the CCCH may be included in the Msg 3 and transmitted. Also, a NAS connection request message may be included in the Msg 3.

The Msg 3 has to include a UE identity. In the case of a contention based random access procedure, the eNB is unable to determine which UEs perform the random access procedure. Thus, the eNB needs the UE identity for each UE to avoid potential contention.

There are two methods for including UE identities. In the first method, if the UE already has a valid cell identity (C-RNTI) allocated by the corresponding cell before performing the random access procedure, the UE transmits its cell identity though a uplink transmission signal corresponding to the UL grant. On the other hand, if the UE has not received a valid cell identity before performing the random access procedure, the UE transmits its unique identity (for example, S(SAE)-TMSI or a random number). In most cases, the unique identity is longer than the C-RNTI.

The UE uses UE-specific scrambling for transmission on UL-SCH. In case the UE has received a C-RNTI, the UE may perform scrambling by using the C-RNTI. In case the UE has not received a C-RNTI yet, the UE is unable to perform C-RNTI based scrambling but uses a TC-RNTI received from a random access response instead. If having received data corresponding to the UL grant, the UE initiates a contention resolution timer for resolving contention.

(4) Msg 4 (Message 4)

Receiving the C-RNTI of a UE through the Msg 3 from the corresponding UE, the eNB transmits aMsg 4 to the UE by using the receiving C-RNTI. On the other hand, in case the eNB receives the unique identity (namely S-TMSI or a random number) through the Msg 3, the eNB transmit the Msg 4 to the UE by using a TC-RNTI allocated to the corresponding UE from a random access response. As one example, the Msg 4 may include an RRC Connection Setup message.

After transmitting data including an identity through a UL grant included in the random access response, the UE waits for a command from the eNB to resolve contention. In other words, two methods are available for a method for receiving the PDCCH, too. As described above, in case the identity in the Msg 3 transmitted in response to the UL grant is the C-RNTI, the UE attempts to receive the PDCCH by using its C-RNTI. In case the identity is a unique identity (in other words, S-TMSI or a random number), the UE attempts to receive the PDCCH by using the TC-RNTI included in the random access response. Afterwards, in the former case, if the UE receives the PDCCH though its C-RNTI before the contention resolution timer expires, the UE determines that the random access procedure has been performed normally and terminates the random access procedure. In the latter case, if the UE receives the PDCCH through the TC-RNTI before the contention resolution timer is completed, the UE checks the data transmitted by the PDSCH indicated by the PDCCH. If the data includes a unique identity of the UE, the UE determines that the random access procedure has been performed successfully and terminates the random access procedure. The UE obtains the C-RNTI through the Msg 4, after which the UE and the network transmit and receive a UE dedicated message by using the C-RNTI.

Next, a method for resolving contention during random access will be described.

The reason why contention occurs during random access is that the number of random access preambles is, in principle, finite. In other words, since the eNB is unable to assign random access preambles unique to the respective UEs, a UE selects and transmits one from among common random access preambles. Accordingly, although there are cases where two or more UEs select and transmit the same random access preamble by using the same radio resource (PRACH resource), the eNB considers the random access preamble as the one transmitted from a single UE. Thus, the eNB transmits a random access response to the UE and expects that only one UE receive the random access response. However, as described above, because of the possibility of contention, two or more UEs receive the same random access response, and each receiving UE performs an operation due to the random access response. In other words, a problem occurs where two or more UEs transmit different data to the same radio resource by using one UL grant included in the random access response. Accordingly, transmission of the data may all fail, or the eNB may succeed to receive only the data from a specific UE depending on the positions of transmission power of UEs. In the latter case, since two or more UEs assume that they all have succeeded to transmit their data, the eNB has to inform those UEs that have failed in the contention about their failure. In other words, contention resolution refers to the operation of informing a UE about whether it has succeeded or failed.

Two methods are used for contention resolution. One of the methods employs a contention resolution timer and the other method employs transmitting an identity of a successful UE to other UEs. The former case is used when a UE already has a unique C-RNTI before performing a random access process. In other words, a UE that already has a C-RNTI transmits data including its C-RNTI to the eNB according to a random access response and operates a contention resolution timer. And if the UE receives a PDCCH indicated by its C-RNTI before the contention resolution timer expires, the UE determines that it has won the contention and finishes random access normally. On the other hand, if the UE fails to receive a PDCCH indicated by its C-RNTI before the contention resolution timer expires, the UE determines that it has lost the contention and performs the random access process again or inform a upper layer of the failure. The latter contention resolution method, namely the method for transmitting an identity of a successful UE, is used when a UE does not have a unique cell identity before performing the random access process. In other words, in case the UE has no cell identity, the UE transmits data by including an upper identity (S-TMSI or a random number) higher than a cell identity in the data according to the UL grant information included in a random access response and operates a contention resolution timer. In case the data including the upper identity of the UE is transmitted to a DL-SCH before the contention resolution timer expires, the UE determines that the random access process has been performed successfully. On the other hand, in case the data including the upper identity of the UE is not transmitted to the DL-SCH before the contention resolution data expires, the UE determines that the random access process has failed.

Figure 11:
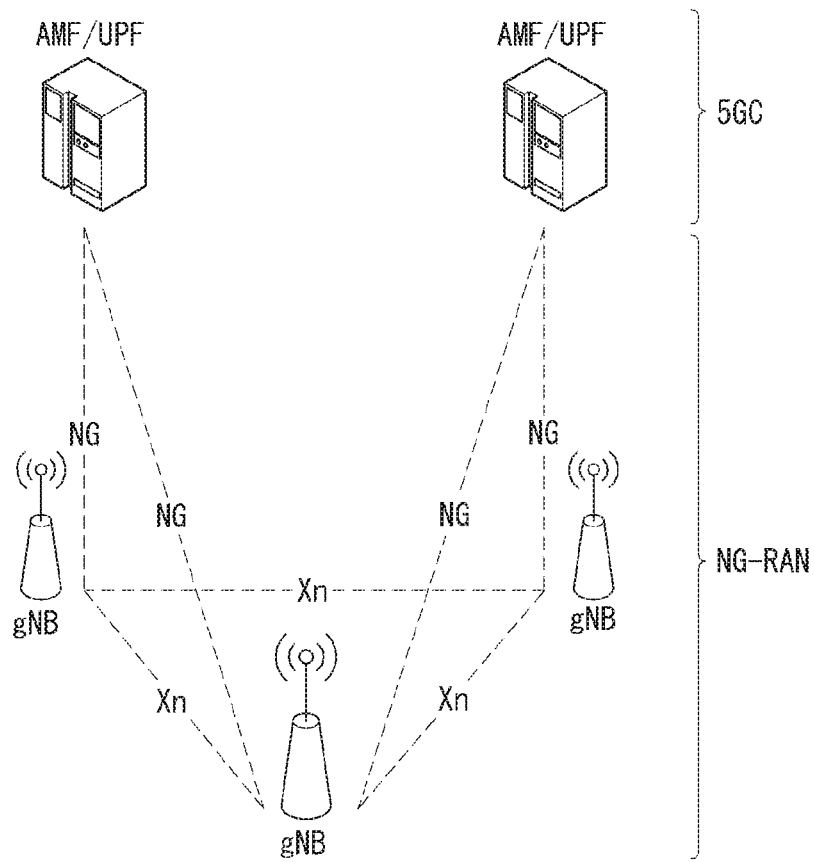
FIG. 11 illustrates an NG-RAN architecture to which the present invention may be applied.

Meanwhile, different from the contention based random access process illustrated in FIG. 11, a non-contention based random access process finishes its procedures only by transmitting the Msg 1 and 2. However, before the UE transmits a random access preamble to the eNB as the Msg 1, the eNB allocates a random access preamble to the UE. The random access procedure is terminated as the UE transmits the allocated random access preamble to the eNB as the Msg 1 and receives a random access response from the eNB.

5G system architecture to which the present invention may be applied

A 5G system is a technology advanced from the 4th generation LTE mobile communication technology and a new radio access technology (RAT) through the evolution of the existing mobile communication network structure or a clean-state structure and an extended technology of long term evolution (LTE), and it supports extended LTE (eLTE), non-3GPP (e.g., WLAN) access and so on.

A 5G system is defined based on a service, and an interaction between network functions (NFs) within architecture for a 5G system may be expressed by two methods as follows.

Reference point representation (FIG. 9): indicates an interaction between NF services within NFs described by a point-to-point reference point (e.g., N11) between two NFs (e.g., AMF and SMF).

Service-based representation (FIG. 10): network functions (e.g., AMFs) within a control plane (CP) permit other authenticated network functions to access its own service. If this representation is necessary, it also includes a point-to-point reference point.

Figure 9:
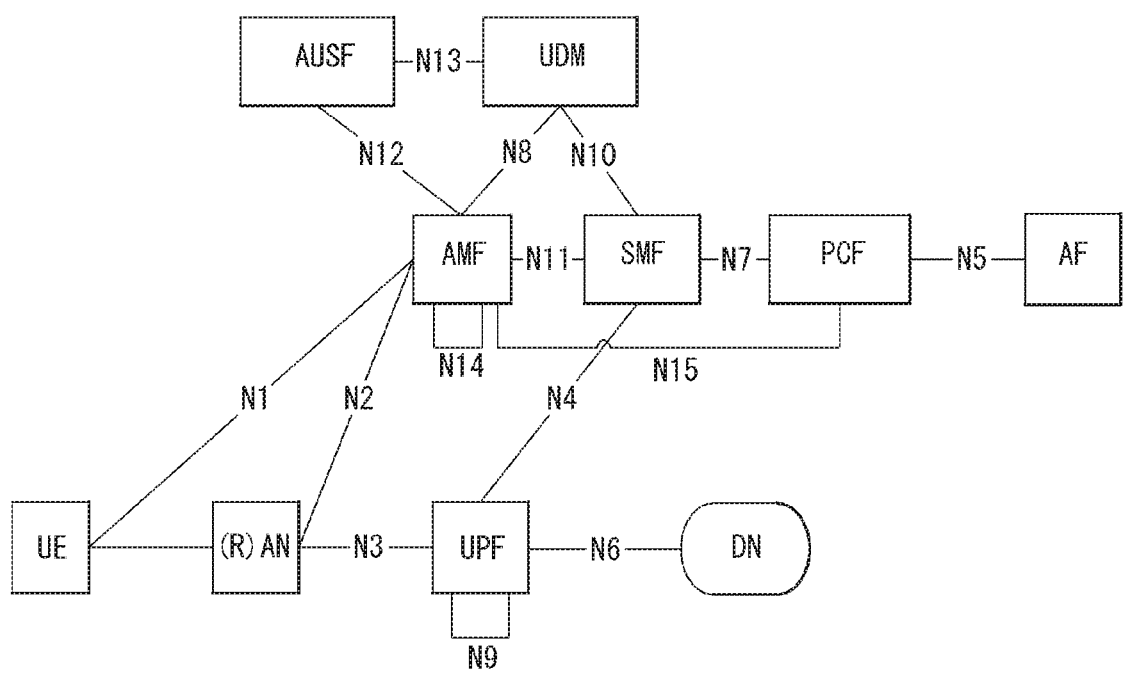
FIG. 9 illustrates a 5G system architecture using reference point representation.

FIG. 9 is a diagram illustrating 5G system architecture using a reference point representation.

Referring to FIG. 9, the 5G system architecture may include various elements (i.e., a network function (NF)). This drawing illustrates an authentication server function (AUSF), a (core) access and mobility management function (AMF), a session management function (SMF), a policy control function (PCF), an application function (AF), united data management (UDM), a data network (DN), a user plane function (UPF), a (radio) access network ((R)AN) and a user equipment (UE) corresponding to some of the various elements.

Each of the NFs supports the following functions.

AUSF stores data for the authentication of a UE.

AMF provides a function for access of a UE unit and mobility management and may be basically connected to one AMF per one UE.

Specifically, the AMF supports functions, such as signaling between CN nodes for mobility between 3GPP access networks, the termination of a radio access network (RAN) CP interface (i.e., N2 interface), the termination (N1) of NAS signaling, NAS signaling security (NAS ciphering and integrity protection), AS security control, registration area management, connection management, idle mode UE reachability (including control and execution of paging retransmission), mobility management control (subscription and policy), intra-system mobility and inter-system mobility support, the support of network slicing, SMF selection, lawful interception (for an AMF event and an interface to an LI system), the provision of transfer of a session management (SM) message between a UE and an SMF, a transparent proxy for SM message routing, access authentication, access authorization including a roaming right check, the provision of transfer of an SMS message between a UE and an SMSF(SMS(Short Message Service) function), a security anchor function (SEA) and/or security context management (SCM).

Some or all of the functions of the AMF may be supported within a single instance of one AMF.

DN means an operator service, Internet access or a 3rd party service, for example. The DN transmits a downlink protocol data unit (PDU) to an UPF or receives a PDU, transmitted by a UE, from a UPF.

PCF provides a function for receiving information about a packet flow from an application server and determining a policy, such as mobility management and session management. Specifically, the PCF supports functions, such as the support of a unified policy framework for controlling a network behavior, the provision of a policy rule so that a CP function(s) (e.g., AMF or SMF) can execute a policy rule, and the implementation of a front end for accessing related subscription information in order to determine a policy within user data repository (UDR).

SMF provides a session management function and may be managed by a different SMF for each session if a UE has a plurality of sessions.

Specifically, the SMF supports functions, such as session management (e.g., session setup, modification and release including the maintenance of a tunnel between a UPF and an AN node), UE IP address allocation and management (optionally including authentication), the selection and control of the UP function, a traffic steering configuration for routing traffic from the UPF to a proper destination, the termination of an interface toward policy control functions, the execution of the control part of a policy and QoS, lawful interception (for an SM event and an interface to an LI system), the termination of the SM part of an NAS message, downlink data notification, the initiator of AN-specific SM information (transferred to an AN through N2 via the AMF), the determination of an SSC mode of a session, and a roaming function.

Some or all of the functions of the SMF may be supported within a single instance of one SMF.

UDM stores the subscription data of a user, policy data, etc. UDM includes two parts, that is, an application front end (FE) and user data repository (UDR).

The FE includes a UDM FE responsible for the processing of location management, subscription management and credential and a PCF responsible for policy control. The UDR stores data required for functions provided by the UDM-FE and a policy profile required by the PCF. Data stored within the UDR includes user subscription data, including a subscription ID, security credential, access and mobility-related subscription data and session-related subscription data, and policy data. The UDM-FE supports functions, such as access to subscription information stored in the UDR, authentication credential processing, user identification handling, access authentication, registration/mobility management, subscription management, and SMS management.

UPF transfers a downlink PDU, received from a DN, to a UE via an (R)AN and transfers an uplink PDU, received from a UE, to a DN via an (R)AN.

Specifically, the UPF supports functions, such as an anchor point for intra/inter RAT mobility, the external PDU session point of interconnection to a data network, packet routing and forwarding, a user plane part for the execution of packet inspection and a policy rule, lawful interception, a traffic usage report, an uplink classifier for supporting the routing of traffic flow of a data network, a branching point for supporting a multi-home PDU session, QoS handling (e.g., the execution of packet filtering, gating and an uplink/downlink rate) for a user plane, uplink traffic verification (SDF mapping between a service data flow (SDF) and a QoS flow), transport level packet marking within the uplink and downlink, downlink packet buffering, and a downlink data notification triggering function. Some or all of the functions of the UPF may be supported within a single instance of one UPF.

AF interoperates with a 3GPP core network in order to provide services (e.g., support functions, such as an application influence on traffic routing, network capability exposure access, an interaction with a policy framework for policy control).

(R)AN collectively refers to a new radio access network supporting all of evolved E-UTRA (E-UTRA) and new radio (NR) access technologies (e.g., gNB), that is, an advanced version of the 4G radio access technology.

The network node in charge of transmission/reception of wireless signals with the UE is the gNB, and plays the same role as the eNB.

The gNB supports functions for radio resource management (i.e., radio bearer control and radio admission control), connection mobility control, the dynamic allocation (i.e., scheduling) of resources to a UE in the uplink/downlink, Internet protocol (IP) header compression, the encryption and integrity protection of a user data stream, the selection of an AMF upon attachment of a UE if routing to the AMF has not been determined based on information provided to the UE, the selection of an AMF upon attachment of a UE, user plane data routing to an UPF(s), control plane information routing to an AMF, connection setup and release, the scheduling and transmission of a paging message (generated from an AMF), the scheduling and transmission of system broadcast information (generated from an AMF or operation and maintenance (O&M)), a measurement and measurement report configuration for mobility and scheduling, transport level packet marking in the uplink, session management, the support of network slicing, QoS flow management and mapping to a data radio bearer, the support of a UE that is an inactive mode, the distribution function of an NAS message, an NAS node selection function, radio access network sharing, dual connectivity, and tight interworking between an NR and an E-UTRA.

UE means a user device. A user apparatus may be called a term, such as a terminal, a mobile equipment (ME) or a mobile station (MS). Furthermore, the user apparatus may be a portable device, such as a notebook, a mobile phone, a personal digital assistant (PDA), a smartphone or a multimedia device, or may be a device that cannot be carried, such as a personal computer (PC) or a vehicle-mounted device.

In the drawings, for the clarity of description, an unstructured data storage network function (UDSF), a structured data storage network function (SDSF), a network exposure function (NEF) and an NF repository function (NRF) are not shown, but all of the NFs shown in this drawing may perform mutual operations along with the UDSF, NEF and NRF, if necessary.

NEF provides means for safely exposing services and capabilities provided by 3GPP network functions, for example, for a 3rd party, internal exposure/re-exposure, an application function, and edge computing. The NEF receives information from other network function(s) (based on the exposed capability(s) of other network function(s)). The NEF may store information received as structured data using a standardized interface as a data storage network function. The stored information is re-exposed to other network function(s) and application function(s) by the NEF and may be used for other purposes, such as analysis.

NRF supports a service discovery function. It receives an NF discovery request from an NF instance and provides information of a discovered NF instance to an NF instance. Furthermore, it maintains available NF instances and services supported by the available NF instances.

SDSF is an optional function for supporting a function of storing and retrieving information as structured data by any NEF.

UDSF is an optional function for supporting a function of storing and retrieving information as unstructured data by any NF.

In the 5G system, a node which is responsible for wireless transmission/reception with the UE is gNB and plays the same role as the eNB in the EPS. When the UE is simultaneously connected to the 3GPP connection and the non-3GPP connection, the UE receives a service through one AMF as illustrated in FIG. 9. In FIG. 9, it is illustrated that a connection is made by the non-3GPP connection and a connection is made by the 3GPP connection are connected to one same UPF, but the connection is not particularly required and may be connected by a plurality of different UPFs.

However, when the UE selects N3IWK (also referred to as non-3GPP interworking function (N3IWF)) in the HPLMN in the roaming scenario and is connected to the non-3GPP connection, the AMF that manages the 3GPP connection may be located in the VPLMN and the AMF that manages the non-3GPP connection may be located in the HPLMN.

The non-3GPP access network is connected to the 5G core network via N3IWK/N3IWF. The N3IWK/N3IWF interfaces the 5G core network control plane function and user plane function via the N2 and N3 interfaces, respectively.

A representative example of the non-3GPP connection mentioned in the present specification may be a WLAN connection.

Meanwhile, this drawing illustrates a reference model if a UE accesses one DN using one PDU session, for convenience of description, but the present invention is not limited thereto.

A UE may access two (i.e., local and central) data networks at the same time using multiple PDU sessions. In this case, for different PDU sessions, two SMFs may be selected. In this case, each SMF may have the ability to control both a local UPF and central UPF within a PDU session, which can be independently activated per PDU.

Furthermore, a UE may access two (i.e., local and central) data networks provided within one PDU session at the same time.

In the 3GPP system, a conceptual link that connects NFs within the 5G system is defined as a reference point. The following illustrates reference points included in 5G system architecture represented in this drawing.

N1: a reference point between a UE and an AMF
N2: a reference point between an (R)AN and an AMF
N3: a reference point between an (R)AN and a UPF
N4: a reference point between an SMF and a UPF
N5: a reference point between a PCF and an AF
N6: a reference point between a UPF and a data network
N7: a reference point between an SMF and a PCF N24: a reference point between a PCF within a visited network and a PCF within a home network N8: a reference point between a UDM and an AMF N9: a reference point between two core UPFs N10: a reference point between a UDM and an SMF N11: a reference point between an AMF and an SMF N12: a reference point between an AMF and an AUSF N13: a reference point between a UDM and an authentication server function (AUSF)

N14: a reference point between two AMFs

N15: a reference point between a PCF and an AMF in the case of a non-roaming scenario and a reference point between a PCF within a visited network and an AMF in the case of a roaming scenario N16: a reference point between two SMFs (in the case of a roaming scenario, a reference point between an SMF within a visited network and an SMF within a home network)

N17: a reference point between an AMF and an EIR

N18: a reference point between any NF and an UDSF

N19: a reference point between an NEF and an SDSF

Figure 10:
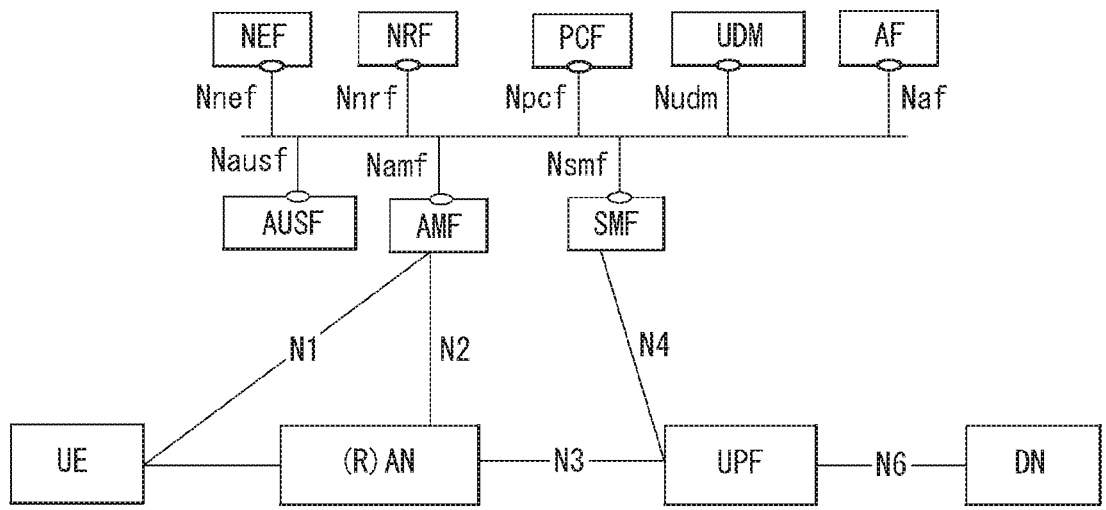
FIG. 10 illustrates a 5G system architecture using a service-based representation.

FIG. 10 is a diagram illustrating 5G system architecture using a service-based representation.

A service-based interface illustrated in this drawing shows a set of services provided/exposed by a specific NF. The service-based interface is used within a control plane. The following illustrates service-based interfaces included in the 5G system architecture represented as in this drawing.

Namf: a service-based interface exhibited by an AMF

Nsmf: a service-based interface exhibited by an SMF

Nnef: a service-based interface exhibited by an NEF

Npcf: a service-based interface exhibited by a PCF

Nudm: a service-based interface exhibited by a UDM

Naf: a service-based interface exhibited by an AF

Nnrf: a service-based interface exhibited by an NRF

Nausf: a service-based interface exhibited by an AUSF

NF service is a kind of capability exposed to another NF (i.e., NF service consumer) by an NF (i.e., NF service supplier) through a service-based interface. The NF may expose one or more NF service(s). In order to define NF service, the following criteria are applied:

NF services are derived from an information flow for describing an end-to-end function.

A complete end-to-end message flow is described by the sequence of NF service invocation.

Two operations for NF(s) to provide their services through service-based interfaces are as follows:

i) "Request-response": a control plane NF_B (i.e., NF service supplier) receives a request to provide a specific NF service (including the execution of an operation and/or the provision of information) from another control plane NF_A (i.e., NF service consumer). NF_B sends NF service results based on information provided by NF_A within a request as a response.

In order to satisfy a request, NF_B may alternately consume NF services from other NF(s). In the request-response mechanism, communication is performed in a one-to-one manner between two NFs (i.e., consumer and supplier).

ii) "subscribe-notify"

A control plane NF_A (i.e., NF service consumer) subscribes to an NF service provided by another control plane NF_B (i.e., NF service supplier). A plurality of control plane NF(s) may subscribe to the same control plane NF service. NF_B notifies interested NF(s) that have subscribed to NF services of the results of the NF services. A subscription request from a consumer may include a notification request for notification triggered through periodical update or a specific event (e.g., the change, specific threshold arrival, etc. of requested information). The mechanism also includes a case where NF(s) (e.g., NF_B) implicitly subscribe to specific notification without an explicit subscription request (e.g., due to a successful registration procedure).

FIG. 11 illustrates NG-RAN architecture to which the present invention may be applied.

Referring to FIG. 11, a new generation radio access network (NG-RAN) includes an NR NodeB (gNB)(s) and/or an eNodeB (eNB)(s) for providing the termination of a user plane and control plane protocol toward a UE.

An Xn interface is connected between gNBs and between a gNB(s) and an eNB(s) connected to 5GC. The gNB(s) and the eNB(s) are also connected to 5GC using an NG interface. More specifically, the gNB(s) and eNB(s) are also connected to an AMF using an NG-C interface (i.e., N2 reference point), that is, a control plane interface between an NG-RAN and 5GC and are connected to a UPF using an NG-U interface (i.e., N3 reference point), that is, a user plane interface between an NG-RAN and 5GC.

Radio Protocol Architecture

Figure 12:
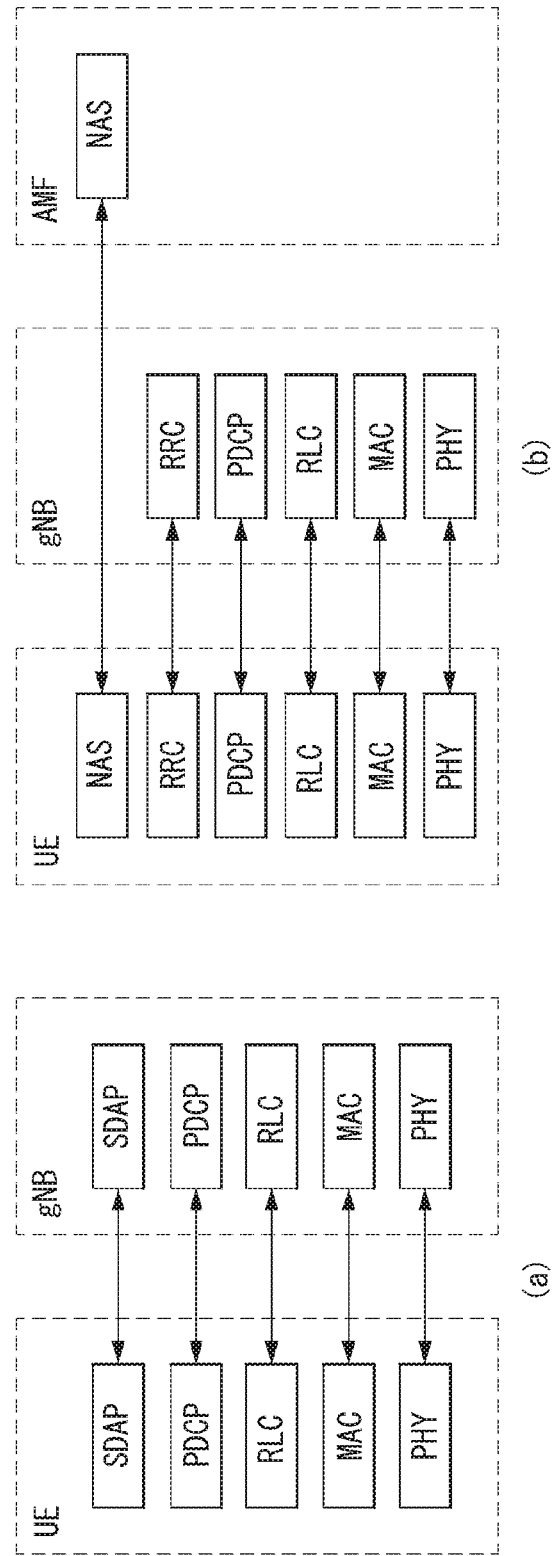
FIG. 12 illustrates a wireless protocol stack to which the present invention may be applied.

FIG. 12 is a diagram illustrating a radio protocol stack to which the present invention may be applied. Specifically, FIG. 12(a) illustrates a radio interface user plane protocol stack between a UE and a gNB, and FIG. 12(b) illustrates a radio interface control plane protocol stack between the UE and the gNB.

A control plane means a passage through which control messages are transmitted in order for a UE and a network to manage a call. A user plane means a passage through which data generated in an application layer, for example, voice data or Internet packet data is transmitted.

Referring to FIG. 12(a), the user plane protocol stack may be divided into a first layer (Layer 1) (i.e., a physical layer (PHY) layer) and a second layer (Layer 2).

Referring to FIG. 12(b), the control plane protocol stack may be divided into a first layer (i.e., a PHY layer), a second layer, a third layer (i.e., a radio resource control (RRC) layer) and a non-access stratum (NAS) layer.

The second layer is divided into a medium access control (MAC) sublayer, a radio link control (RLC) sublayer, a packet data convergence protocol (PDC) sublayer, and a service data adaptation protocol (SDAP) sublayer (in the case of a user plane).

Radio bearers are classified into two groups: a data radio bearer (DRB) for user plane data and a signaling radio bearer (SRB) for control plane data Hereinafter, the layers of the control plane and user plane of the radio protocol are described.

1) The PHY layer, that is, the first layer, provides information transfer service to a higher layer using a physical channel. The PHY layer is connected to the MAC sublayer located in a high level through a transport channel. Data is transmitted between the MAC sublayer and the PHY layer through a transport channel. The transport channel is classified depending on how data is transmitted according to which characteristics through a radio interface. Furthermore, data is transmitted between different physical layers, that is, between the PHY layer of a transmission stage and the PHY layer of a reception stage through a physical channel.

2) The MAC sublayer performs mapping between a logical channel and a transport channel; the multiplexing/demultiplexing of an MAC service data unit (SDU) belonging to one logical channel or different logical channels to/from a transport block (TB) transferred to/from the PHY layer through a transport channel; a scheduling information report; error correction through a hybrid automatic repeat request (HARQ); priority handling between UEs using dynamic scheduling; priority handling between the logical channels of one UE using logical channel priority; and padding.

Different types of data transfer service provided by the MAC sublayer. Each logical channel type defines that information of which type is transferred.

Logical channels are classified into two groups: a control channel and a traffic channel.

i) The control channel is used to transfer only control plane information and is as follows.

Broadcast control channel (BCCH): a downlink channel system for broadcasting control information.

Paging control channel (PCCH): a downlink channel transferring paging information and system information change notification.

Common control channel (CCCH): a channel for transmitting control information between a UE and a network. This channel is used for UEs not having an RRC connection with a network.

Dedicated control channel (DCCH): a point-to-point bidirectional channel for transmitting dedicated control information between a UE and a network. It is used by a UE having an RRC connection.

ii) The traffic channel is used to use only user plane information:

Dedicated traffic channel (DTCH): a point-to-point channel for transferring user information and dedicated to a single UE. The DTCH may be present in both the uplink and downlink.

In the downlink, a connection between a logical channel and a transport channel is as follows.

A BCCH may be mapped to a BCH. A BCCH may be mapped to a DL-SCH. A PCCH may be mapped to a PCH. A CCCH may be mapped to a DL-SCH. A DCCH may be mapped to a DL-SCH. A DTCH may be mapped to a DL-SCH.

In the uplink, a connection between a logical channel and a transport channel is as follows. A CCCH may be mapped to an UL-SCH. A DCCH may be mapped to an UL-SCH. A DTCH may be mapped to an UL-SCH.

3) The RLC sublayer supports three transport modes: a transparent mode (TM), an unacknowledged mode (UM) and acknowledged mode (AM).

An RLC configuration may be applied to each logical channel. In the case of an SRB, the TM or AM mode is used. In contrast, in the case of a DRB, the UM or AM mode is used.

The RLC sublayer performs the transfer a higher layer PDU; independent sequence numbering with a PDCP; error correction through an automatic repeat request (ARW); segmentation and re-segmentation; the reassembly of an SDU; RLC SDU discard; and RLC re-establishment.

4) The PDCP sublayer for a user plane performs sequence numbering; header compression and compression-decompression (corresponding to only robust header compression (RoHC)); user data transfer; reordering and duplicate detection (if there is transfer to a layer higher than the PDCP); PDCP PDU routing (in the case of a split bearer); the retransmission of a PDCP SDU; ciphering and deciphering; PDCP SDU discard; PDCP re-establishment and data recovery for RLC AM; and the duplication of a PDCP PDU.

The PDCP sublayer a control plane additionally performs sequence numbering; ciphering, deciphering and integrity protection; control plane data transfer; duplication detection; the duplication of a PDCP PDU.

When duplication for a radio bearer is configured by RRC, an additional RLC entity and an additional logical channel are added to a radio bearer in order to control a duplicated PDCP PDU(s). In the PDCP, duplication includes transmitting the same PDCP PDU(s) twice. The first one is transferred to the original RLC entity, and the second one is transferred to an additional RLC entity. In this case, the duplication corresponding to the original PDCP PDU is not transmitted to the same transport block. Different two logical channels may belong to the same MAC entity (in the case of a CA) or to different MAC entities (in the case of DC). In the former case, a logical channel mapping restriction is used to guarantee that a duplication corresponding to the original PDCP PDU is not transferred to the same transport block.

5) The SDAP sublayer performs i) mapping between a QoS flow and a data radio bearer and ii) QoS flow ID marking within a downlink and uplink packet.

One protocol entity of an SDAP is configured for each PDU session, but exceptionally in the case of dual connectivity (DC), two SDAP entities may be configured.

6) The RRC sublayer performs the broadcasting of system information related to an access stratum (AS) and a non-access stratum (NAS); paging initiated by 5GC or an NG-RAN; the establishment, maintenance and release (additionally including the modification and release of a carrier aggregation and additionally including the modification and release of dual connectivity between an E-UTRAN and an NR or within an NR) of an RRC connection between a UE and an NG-RAN; a security function including key management; the establishment, configuration, maintenance and release of an SRB(s) and a DRB(s); handover and context transfer; control of UE cell selection, re-release and cell selection/reselection; a mobility function including mobility between RATs; a QoS management function, a UE measurement report and report control; the detection of a radio link failure and recovery from a radio link failure; and the transfer of an NAS message from an NAS to a UE and the transfer of an NAS message from a UE to an NAS.

FIG. 13 illustrates a protocol stack between a UE and a core network of 5G/NR system to which the present invention is applicable.

N1 may play a role similar to a NAS protocol of EPS, and N2 may play a role similar to S1-AP of EPS. 5G RRC and 5G AS respectively correspond to existing LTE RRC and LTE AS, or NR RRC and NR AS of NR that are newly being standardized, and RRCs of all two RATs are excepted to be based on current LTE RRC.

Network Slicing

A 5G system has introduced a network slicing technology which provides network resources and network functions to an independent slice based on each service.

As network slicing is introduced, the isolation, independent management, etc. of a network function and network resources can be provided for each slice. Accordingly, services that are independent for each service or user and that are more flexible can be provided by selecting and combining network functions of the 5G system depending on a service or user.

A network slice refers to a network that logically integrates an access network and a core network.

The network slice may include one or more of the followings:

Core network control plane and user plane function

NG-RAN

Non-3GPP interworking function (N3IWF) toward a non-3GPP access network

A function supported for each network slice and network function optimization may be different. A plurality of network slice instances may provide the same function to different groups of UEs.

One UE may be connected to one or more network slice instances at the same time via a 5G-AN. One UE may be served at the same time by a maximum of 8 network slices. An AMF instance that serves a UE may belong to each network slice instance that serves the UE. That is, the AMF instance may be common to a network slice instance that serves the UE. The CN part of a network slice instance(s) that serves a UE is selected by a CN.

One PDU session belongs to only a specific one network slice instance for each PLMN. Different network slice instances do not share one PDU session.

One PDU session belongs to a specific one network slice instance for each PLMN. Different slices may have slice-specific PDU sessions using the same DNN, but different network slice instances do not share one PDU session.

Single network slice selection assistance information (S-NSSAI) identifies a network slice. Each S-NSSAI is assistant information used for a network to select a specific network slice instance. The NSSAI is a set of S-NSSAI(s). The S-NSSAI includes the followings:

Slice/service type (SST): the SST indicates the operation of a network slice expected form a viewpoint of a function and service.

Slice differentiator (SD): the SD is optional information that supplements an SST(s) for selecting a network slice instance from a plurality of potential network slice instances all of which comply with an indicated SST.

1) Upon Initial Access, Network Slice Selection

A Configured NSSAI may be configured in a UE by a home PLMN (HPLMN) for each PLMN. The Configured NSSAI becomes PLMN-specific, and the HPLMN indicates a PLMN(s) to which each Configured NSSAI has been applied.

Upon initial connection of a UE, an RAN selects an initial network slice that will transfer a message using an NSSAI. To this end, in a registration procedure, a UE provides a requested NSSAI to a network. In this case, when the UE provides the requested NSSAI to the network, a UE within a specific PLMN uses only S-NSSAIs belonging to the Configured NSSAI of the corresponding PLMN.

If a UE does not provide an NSSAI to an RAN and an RAN does not select a proper network slice based on the provided NSSAI, the RAN may select a default network slice.

Subscription data includes the S-NSSAI(s) of a network slice(s) to which a UE has subscribed. One or more S-NSSAI(s) may be marked as a default S-NSSAI. When an S-NSSAI is marked by default, although a UE does not transmit any S-NSSAI to a network within a Registration Request, the network may serve the UE through a related network slice.

When a UE is successfully registered, a CN notifies an (R)AN of all of Allowed NSSAIs (including one or more S-NSSAIs) by providing the NSSAIs. Furthermore, when the registration procedure of the UE is successfully completed, the UE may obtain an Allowed NSSAI for a PLMN from an AMF.

The Allowed NSSAI has precedence over the Configured NSSAI for the PLMN. Thereafter, the UE uses only an S-NSSAI(s) within the Allowed NSSAI corresponding to a network slice for a network slice selection-related procedure within the serving PLMN.

In each PLMN, a UE stores a Configured NSSAI and an Allowed NSSAI (if present). When the UE receives an Allowed NSSAI for a PLMN, it overrides the previously stored Allowed NSSAI for the PLMN.

2) Slice Change

A network may change an already selected network slice instance depending on a local policy and the mobility, subscription information change, etc. of a UE. That is, a set of network slices of a UE may be changed at any time while the UE is registered with a network. Furthermore, a change of a set of network slices of a UE may be initiated by a network or under specific conditions.

A network may change a set of allowed network slice(s) with which a UE has been registered based on a local policy, a subscription information change and/or the mobility of the UE. A network may perform such a change during a registration procedure or may notify a UE of a change of a supported network slice(s) using a procedure capable of triggering a registration procedure.

Upon changing the network slice, the network may provide the UE with a new Allowed NSSAI and a tracking area list. The UE includes the new NSSAI in signaling according to a mobility management procedure and transmits the signaling, thereby causing the reselection of a slice instance. An AMF supporting the slice instance may also be changed in response to a change of the slice instance.

When a UE enters an area in which a network slice is no longer available, a core network releases a PDU session for an S-NSSAI corresponding to a network slice that is no longer available through a PDU session release procedure.

When the PDU session corresponding to the slice that is no longer available is released, the UE determines whether the existing traffic can be routed through a PDU session belonging to another slice using a UE policy.

For a change of a set of used S-NSSAI(s), a UE initiates a registration procedure.

3) SMF Selection

A PCF provides a UE with a network slice selection policy (NSSP). The NSSP associates the UE with an S-NSSAI and is used by the UE in order to determine a PDU session to which traffic will be routed.

A network slice selection policy is provided for each application of a UE. This includes a rule by which an S-NSSAI can be mapped for each UE application. The AMF selects an SMF for PDU session management using subscriber information and a local operator policy along with an SM-NSSAI transferred by a UE and DNN information.

When a PDU session for a specific slice instance is established, a CN provides an (R)AN with an S-NSSAI corresponding to the slice instance to which the PDU session belongs so that an RAN can access a specific function of a slice instance.

Session Management

5GC supports a PDU connectivity service, that is, a service that provides the exchange of PDU(s) between a UE and a DN identified by a data network name (DNN) (or an access point name (APN)). The PDU connectivity service is also supported through a PDU session established upon request from the UE.

Each PDU session supports a single PDU session type. That is, when the PDU session is established, it supports the exchange of PDUs of a single type requested by a UE. The following PDU session types are defined. IP version 4 (IPv4), IP version 6 (IPv6), Ethernet, and unstructured. In this case, the type of PDUs exchanged between a UE and a DN are completely transparent in a 5G system.

A PDU session is established using NAS SM signaling exchanged between a UE and an SMF through N1 (upon UE request), modified (upon UE and 5GC request), and released (upon UE and 5GC request). Upon request from an application server, 5GC may trigger a specific application within a UE. When the UE receives a trigger message, it transfers the corresponding message to an identified application. The identified application may establish a PDU session with a specific DNN.

An SMF checks whether a UE request complies with user subscription information. To this end, the SMF obtains SMF level subscription data from UDM. Such data may indicate an accepted PDU session type for each DNN:

A UE registered through a plurality of accesses selects access for setting up a PDU session.

A UE may request to move a PDU session between 3GPP and non-3GPP access. A determination for moving the PDU session between 3GPP and non-3GPP access is made for each PDU session. That is, the UE may have a PDU session using 3GPP access while another PDU session uses non-3GPP access.

Within a PDU session setup request transmitted by a network, a UE provides a PDU session identity (ID). Furthermore, the UE may provide a PDU session type, slicing information, a DNN, service and a session continuity (SSC) mode.

A UE may establish a plurality of PDU sessions with the same DN or different DNs at the same time via 3GPP access and/or via non-3GPP access.

A UE may establish a plurality of PDU sessions with the same DN served by a different UPF end N6.

A UE having a plurality of established PDU sessions may be served by different SMFs.

The user plane path of a different PDU sessions belonging to the same UE (the same or different DNNs) may be fully separated between an UPF and AN interfacing with a DN.

5G system architecture can satisfy various continuity requirements of different application/services within a UE by supporting a session and service continuity (SCC). A 5G system supports different SSC modes. An SSC mode associated with a PDU session anchor is not changed while a PDU session is established.

In the case of a PDU session to which SSC Mode 1 is applied, a network maintains continuity service provided to a UE. In the case of a PDU session of an IP type, an IP address is maintained.

If SSC Mode 2 is used, a network may release continuity service delivered to a UE. Furthermore, the network may release a corresponding PDU session. In the case of a PDU session of an IP type, a network may release an IP address(s) allocated to a UE.

If SSC Mode 3 is used, a change of a user plane can be aware by a UE, but a network guarantees that the UE does not lose connectivity. In order to permit better service continuity, a connection through a new PDU session anchor point is established before a previous connection is terminated. In the case of a PDU session of an IP type, an IP address is not maintained while an anchor is deployed again.

An SSC mode selection policy is used to determine the type of SSC mode associated with an application (or application group) of a UE. An operator may previously configure an SSC mode selection policy in a UE. The policy includes one or more SSC mode selection policy rules which may be used for a UE to determine the type of SSC mode associated with an application (or a group of applications). Furthermore, the policy may include a default SSC mode selection policy rule which may be applied to all of applications of a UE.

If a UE provides an SSC mode when it requests a new PDU session, an SMF selects whether it will accept the requested SSC mode or whether it will modify the requested SSC mode based on subscription information and/or a local configuration. If a UE does not provide an SSC mode when it requests a new PDU session, an SMF selects a default SSC mode for data networks listed within subscription information or applies a local configuration for selecting an SSC mode.

An SMF notifies a UE of an SSC mode selected for a PDU session.

Mobility Management

Registration management (RM) is used to register or deregister a UE/user with/from a network and to establish user context within a network.

1) Registration Management

A UE/user needs to register a network in order to receive service that requests registration. Once the UE/user is registered, the UE may update its own registration with the network in order to periodically maintain reachability (periodical registration update) if applicable, upon moving (mobility registration update), or in order to update its own capability or negotiate a protocol parameter again.

An initial registration procedure includes the execution of a network access control function (i.e., user authentication and access authentication based on a subscription profile within UDM). As the results of the registration procedure, the ID of a serving AMF within the UDM is registered.

FIG. 13 illustrates RM state models to which the present invention may be applied. Specifically, FIG. 13(a) shows an RM state model within a UE, and FIG. 13(b) shows an RM state model within an AMF.

Referring to FIG. 13, in order to reflect the registration state of a UE within a selected PLMN, two RM states of RM-DEREGISTERED and RM-REGISTERED are used within the UE and the AMF.

In the RM-DEREGISTERED state, the UE is not registered with a network. The valid location or routing information of UE context within the AMF is not maintained. Accordingly, the UE is not reachable by the AMF. However, for example, in order to prevent an authentication procedure from being executed for each registration procedure, some UE context may be still stored in the UE and the AMF.

In the RM-DEREGISTERED state, if the UE needs to receive service that requests registration, the UE attempts registration with a selected PLMN using the initial registration procedure. Alternatively, upon initial registration, when the UE receives a Registration Reject, the UE remains in the RM-DEREGISTERED state. In contrast, when the UE receives the Registration Accept, it enters the RM-REGISTERED state.

In the RM-DEREGISTERED state, if applicable, the AMF accepts the initial registration of the UE by transmitting a Registration Accept to the UE, and enters the RM-REGISTERED state. Alternatively, if applicable, the AMF rejects the initial registration of the UE by transmitting a Registration Reject to the UE.

In the RM-REGISTERED state, the UE is registered with the network. In the RM-REGISTERED state, the UE may receive service that requests registration with the network.

In the RM-REGISTERED state, if the tracking area identity (TAI) of a current serving cell is not present within a list of TAIs that has been received by the UE from a network, the registration of the UE is maintained. The UE performs a mobility registration update procedure so that the AMF can page the UE. Alternatively, in order to notify a network that the UE is still in the active state, the UE performs a periodic registration update procedure when a periodical update timer expires. Alternatively, in order to update its own capability information or negotiate a protocol parameter with a network again, the UE performs a registration update procedure. Alternatively, if the UE does no longer require registration with a PLMN, the UE performs a deregistration procedure and enters the RM-DEREGISTERED state. The UE may determine deregistration from the network at any time. Alternatively, when the UE receives a Registration Reject message, a Deregistration message or performs a local deregistration procedure without the initiation of any signaling, it enters the RM-DEREGISTERED state.

In the RM-REGISTERED state, when the UE does no longer need to be registered with the PLMN, the AMF performs a deregistration procedure and enters the RM-DEREGISTERED state. The AMF may determine the deregistration of the UE at any time. Alternatively, after an implicit deregistration timer expires, the AMF performs implicit deregistration at any time. The AMF enters the RM-DEREGISTERED state after the implicit deregistration. Alternatively, the AMF performs local deregistration for the UE that has negotiated deregistration at the end of communication. The AMF enters the RM-DEREGISTERED state after local deregistration. Alternatively, if applicable, the AMF accepts or rejects registration update from the UE. The AMF may reject UE registration when it rejects the registration update from the UE.

Registration area management includes a function for allocating or re-allocating a registration area to the UE. The registration area is managed for each access type (i.e., 3GPP access or non-3GPP access).

When the UE is registered with a network through 3GPP access, the AMF allocates a set of tracking area (TA)(s) within a TAI list to the UE. When the AMF allocates a registration area (i.e., a set of TAs within the TAI list), the AMF may consider various types of information (e.g., a mobility pattern and an accepted/non-accepted area). The AMP having the whole PLMN or all of PLMNs as a serving area may allocate the whole PLMN, that is, a registration area, to the UE in the MICO mode.

A 5G system supports the allocation of a TAI list including different 5G-RAT(s) within a single TAI list.

When the UE is registered with a network through non-3GPP access, a registration area for the non-3GPP access corresponds to a unique reserved TAI value (i.e., dedicated to the non-3GPP access). Accordingly, there is a unique TA for the non-3GPP access to SGC, which is called an N3GPP TAI.

When the TAI list is generated, the AMF includes only a TAI(s) applicable to access through which the TAI list has been transmitted.

2) Connection Management

Connection management (CM) is used to establish and release a signaling connection between the UE and the AMF. CM includes a function of establishing and releasing a signaling connection between the UE and the AMF through N1. The signaling connection is used to enable an NAS signaling exchange between the UE and a core network. The signaling connection includes both an AN signaling connection for the UE between the UE and the AN and an N2 connection for the UE between the AN and the AMF.

FIG. 14 illustrates CM state models to which the present invention may be applied. Specifically, FIG. 14(a) illustrates a CM state shift within a UE, and FIG. 14(b) shows a CM state shift within an AMF.

Referring to FIG. 14, in order to reflect the NAS signaling connection of the UE with the AMF, two CM states of CM-IDLE and CM-CONNECTED are used.

The UE in the CM-IDLE state is the RM-REGISTERED state and does not have an NAS signaling connection established with the AMF through N1. The UE performs cell selection, cell reselection and PLMN selection.

An AN signaling connection, an N2 connection and an N3 connection for the UE in the CM-IDLE state are not present.

In the CM-IDLE state, if the UE is not in the MICO mode, it responds to paging by performing a Service Request procedure (if it has received it). Alternatively, when the UE has uplink signaling or user data to be transmitted, it performs a Service Request procedure. Alternatively, whenever an AN signaling connection is established between the UE and the AN, the UE enters the CM-CONNECTED state. Alternatively, the transmission of an initial NAS message (Registration Request, Service Request or Deregistration Request) starts to shift from the CM-IDLE state to the CM-CONNECTED state.

In the CM-IDLE state, if the UE is not in the MICO mode, when the AMF has signaling or the mobile-terminated data to be transmitted to the UE, it performs a network-triggered service request procedure by transmitting a paging request to the corresponding UE. Whenever an N2 connection for a corresponding UE between the AN and the AMF is established, the AMF enters the CM-CONNECTED state.

The UE in the CM-CONNECTED state has an NAS signaling connection with the AMF through N1.

In the CM-CONNECTED state, whenever the AN signaling connection is released, the UE enters the CM-IDLE state.

In the CM-CONNECTED state, whenever an N2 signaling connection and N3 connection for the UE are released, the AMF enters the CM-IDLE state.

When an NAS signaling procedure is completed, the AMF may determine to release the NAS signaling connection of the UE. When the AN signaling connection release is completed, the CM state within the UE changes to the CM-IDLE. When an N2 context release procedure is completed, the CM state for the UE within the AMF changes to the CM-IDLE.

The AMF may maintain the UE in the CM-CONNECTED state until the UE is deregistered from a core network.

The UE in the CM-CONNECTED state may be an RRC Inactive state. When the UE is in the RRC Inactive state, UE reachability is managed by an RAN using assistant information from a core network. Furthermore, when the UE is in the RRC Inactive state, UE paging is managed by the RAN. Furthermore, when the UE is in the RRC Inactive state, the UE monitors paging using the CN and RAN ID of the UE.

The RRC Inactive state is applied to an NG-RAN (i.e., applied to an NR and E-UTRA connected to 5G CN).

The AMF provides assistant information to the NG-RAN in order to assist the determination of the NG-RAN regarding whether the UE will be changed to the RRC Inactive state based on a network configuration.

The RRC Inactive assistant information includes a UE-specific discontinuous reception (DRX) value for RAN paging during the RRC Inactive state and a registration area provided to the UE.

CN assistant information is provided to a serving NG RAN node during N2 activation (i.e., registration, a service request or path switch).

The state of an N2 and the N3 reference point is not changed by the UE that enters the CM-CONNECTED state accompanied by RRC Inactive. The UE in the RRC Inactive state is aware of an RAN notification area.

When the UE is the CM-CONNECTED state accompanied by RRC Inactive, the UE may resume an RRC connection due to uplink data pending, a mobile-initiated signaling procedure (i.e., periodical registration update), a response to RAN paging, or when the UE notifies a network that it has deviated from the RAN notification area.

When the connection of the UE in a different NG-RAN node within the same PLMN resumes, UE AS context is recovered from an old NG RAN node, and the procedure is triggered toward a CN.

When the UE is in the CM-CONNECTED state accompanied by RRC Inactive, the UE performs cell selection on a GERAN/UTRAN/EPS and complies with an idle mode procedure.

Furthermore, the UE in the CM-CONNECTED state accompanied by RRC Inactive enters the CM-IDLE mode and complies with an NAS procedure related to the following cases.

If an RRC resumption procedure fails,

If a movement to the CM-IDLE mode of the UE is required within a failure scenario that cannot be solved in the RRC Inactive mode.

The NAS signaling connection management includes a function for establishing and releasing an NAS signaling connection.

The NAS signaling connection establishment function is provided by the UE and the AMF in order to establish the NAS signaling connection of the UE in the CM-IDLE state.

When the UE in the CM-IDLE state needs to transmit an NAS message, the UE initiates a service request or registration procedure in order to establish a signaling connection to the AMF.

The AMF may maintain the NAS signaling connection until the UE is deregistered from a network based on the preference of the UE, UE subscription information, a UE mobility pattern and a network configuration.

The procedure of releasing the NAS signaling connection is initiated by a 5G (R)AN node or the AMF.

When the UE detects the release of an AN signaling connection, the UE determines that the NAS signaling connection has been released. When the AMF detects that N2 context has been released, the AMF determines that the NAS signaling connection has been released.

3) UE mobility restriction

A mobility restriction restricts the service access or mobility control of a UE within a 5G system. A mobility restriction function is provided by a UE, an RAN and a core network.

The mobility restriction is applied to only 3GPP access, but is not applied to non-3GPP access.

In the CM-IDLE state and the CM-CONNECTED state accompanied by RRC Inactive, a mobility restriction is performed by a UE based on information received from a core network. In the CM-CONNECTED state, a mobility restriction is performed by an RAN and a core network.

In the CM-CONNECTED state, a core network provides a handover restriction list for a mobility restriction to an RAN.

The mobility restriction includes an RAT restriction, a forbidden area and a service area restriction as follows:

RAT restriction: the RAT restriction is defined as a 3GPP RAT(s) whose access of a UE is not permitted. A UE within a restricted RAT is not allowed to initiate any communication with a network based on subscription information.

Forbidden area: a UE is not allowed to initiate any communication with a network based on subscription information within a forbidden area under a specific RAT.

Service area restriction: it defines an area in which a UE can initiate cannot initiate communication with a network as follows:

Allowed area: if a UE is allowed by subscription information within an allowed area under a specific RAT, the UE is allowed to initiate communication with a network.

Non-allowed area: a service area for a UE is restricted based on subscription information within a non-allowed area under a specific RAT. The UE and the network are not allowed to initiate session management signaling for obtaining a service request or user service (both the CM-IDLE state and the CM-CONNECTED state). The RM procedure of the UE is the same as that in the allowed area. A UE within a non-allowed area responds to the paging of a core network as a service request.

In a specific UE, a core network determines a service area restriction based on UE subscription information. Optionally, an allowed area may be fine-tuned by a PCF (e.g., based on a UE location, a permanent equipment identifier (PEI) or a network policy). The service area restriction may be changed due to subscription information, a location, a PEI and/or a policy change, for example. The service area restriction may be updated during a registration procedure.

If a UE has an RAT restriction, a forbidden area, an allowed area, a non-allowed area or an area overlapping between them, the UE performs an operation according to the following priority:

The evaluation of the RAT restriction has precedence over the evaluation of any other mobility restriction;

The evaluation of the forbidden area has precedence over the evaluation of the allowed area and the non-allowed area; and The evaluation of the non-allowed area has precedence over the evaluation of the allowed area.

4) Mobile Initiated Connection only (MICO) Mode

A UE may indicate the preference of the MICO mode during initial registration or registration update. The AMF determines whether the MICO mode is permitted for the UE based on a local configuration, the preference indicated by the UE, UE subscription information and a network policy or a combination of them, and notifies the UE of the results during a registration procedure.

A UE and a core network re-initiates or exits from the MICO mode in the following registration signaling. If the MICO mode is not clearly indicated within a registration procedure and a registration procedure is successfully completed, the UE and the AMF do not use the MICO mode. That is, the UE operates as a general UE, and the network also treats a corresponding UE as a general UE.

The AMF allocates a registration area to a UE during a registration procedure. When the AMF indicates the MICO mode for the UE, the registration area is not restricted as a paging area size. If the AMF serving area is the whole PLMN, the AMF may provide the UE with the "whole PLMN" registration area. In this case, re-registration with the same PLMN attributable to mobility is not applied. If a mobility restriction is applied to a UE in the MICO mode, the AMF allocates an allowed area/non-allowed area to the UE.

When the AMF indicates the MICO mode for the UE, the AMF considers that the UE is always unreachable during the CM-IDLE state. The AMF rejects any request for downlink data transfer for a corresponding UE that is in the MICO mode and the CM-IDLE state. The AMF also delays downlink transport, such as SMS or location service through the NAS. A UE in the MICO mode may be reachable for mobile-terminated data or signaling only when the UE is in the CM-CONNECTED mode.

The AMF may provide an RAN node with pending data indication when a UE in the MICO mode can immediately transport mobile-terminated data and/or signaling when the UE switches to the CM-CONNECTED mode. When the RAN node receives the indication, the RAN node considers the information when it determines user inactivity.

A UE in the MICO mode does not need to listen to paging during the CM-IDLE state. The UE in the MICO mode may stop any AS procedure within the CM-IDLE state until it starts switching from the CM-IDLE to the CM-CONNECTED mode due to one of the following reasons.

If a change (e.g., configuration change) within the UE requires registration update to a network If a periodic registration timer expires If MO data is pending If MO(Mobile Originating) signaling is pending Quality of Service (QoS) Model QoS is a technology for the smooth transfer service of various traffic (mail, data transmission, audio and video) to a user depending on each character.

A 5G QoS model supports a framework-based QoS flow. The 5G QoS model supports both a QoS flow that requires a guaranteed flow bit rate (GFBR) and a QoS flow that does not require the GFBR.

The QoS flow is the finest granularity for QoS classification in a PDU session.

A QoS flow ID (QFI) is used to identify a QoS flow within a 5G system. The QFI is unique within a PDU session. User plane traffic having the same QFI within a PDU session receives the same traffic transfer processing (e.g., scheduling and an admission threshold). The QFI is transferred within an encapsulation header on N3 (and N9). The QFI may be applied to a different payload type of a PDU (i.e., an IP packet, unstructured packet and Ethernet frame).

In this specification, for convenience of description, "QoS" and a "QoS flow" are interchangeably used. Accordingly, in this specification, "QoS" may be construed as meaning a "QoS flow", and "QoS" may be construed as meaning a "QoS flow."

Within a 5G system, QoS flows may be controlled by an SMF upon PDU session setup or QoS flow establishment/modification.

If applicable, all of QoS flows have the following characteristics:

QoS profile previously configured in the AN or provided from the SMF to the AN via the AMF through the N2 reference point;

One or more networks provided from the SMF to the UE via the AMF through the N1 reference point—provided QoS rule(s) and/or one or more UE-derived QoS rule(s)

SDF classification provided from the SMF to the UPF through the N4 reference point and QoS-related information (e.g., session-aggregate maximum bit rate (AMBR)).

The QoS flow may become a "guaranteed bit rate (GBR)" or a "non-guaranteed bit rate (non-GBR)" depending on the QoS profile. The QoS profile of the QoS flow includes the following QoS parameters:

i) With respect to each of QoS flows, QoS parameters may include the followings:

5G QoS indicator (5QI): the 5QI is a scalar for referring to 5G QoS characteristics (i.e., control QoS transfer handling access node-specific parameters for a QoS flow, for example, scheduling weight, an admission threshold, a queue management threshold and a link layer protocol configuration).

Allocation and retention priority (APR): the ARP includes a priority level, a pre-emption capability and pre-emption vulnerability. The priority level defines the relative importance of a resource request. This is used to determine whether a new QoS flow will be accepted or rejected if resources are restricted and to used to determine whether the existing QoS flow will pre-empt resources while the resources are restricted.

ii) Furthermore, only in the case of each GBR QoS flow, QoS parameters may further include the followings:

GFBR—the uplink and downlink;

Maximum flow bit rate (MFBR)—the uplink and downlink; and

Notification control.

iii) Only in the case of a non-GBR QoS flow, QoS parameters may further include the following: Reflective QoS attribute (RQA)

There are supported methods of controlling the following QoS flows:

1) In the case of the non-GBR QoS flow: if a standardized 5QI or a previously configured 5QI is used, a 5QI value is used as the QFI of the QoS flow and a default ARP is previously configured in the AN;

2) In the case of the GBR QoS flow: if a standardized 5QI or a previously configured 5QI is used, a 5QI value is used as the QFI of the QoS flow. A default ARP is transmitted to the RAN when a PDU session is established. Whenever the NG-RAN is used, the user plane (UP) of the PDU session is activated;

3) In the case of the GBR and non-GBR QoS flow: an allocated QFI is used. A 5QI value may be standardized, previously configured or not standardized. The QoS profile and QFI of the QoS flow may be provided to the (R)AN through N2 when a PDU session is established or when a QoS flow is established/changed. Whenever the NG-RAN is used, the user plane (UP) of the PDU session is activated.

A UE may perform the marking and classification (i.e., the association of UL traffic for a QoS flow) of UL user plane traffic based on a QoS rule. Such rules may be explicitly provided to the UE (when a PDU session is established or a QoS flow is established) or may have been previously configured in the UE or may be implicitly derived by the UE by applying reflective QoS.

The QoS rule may include a unique QoS rule ID within a PDU session, the QFI of an associated QoS flow, and one or more packet filters and precedence value. Additionally, with respect to an allocated QFI, the QoS rule may include QoS parameters related to a UE. One or more QoS rules associated with the same QoS flow (i.e., having the same QFI) may be present.

The default QoS rule may be necessary for all of PDU sessions. The default QoS rule may be a unique QoS rule of a PDU session that may not include a packet filter (In this case, the highest precedence value (i.e., the lowest priority) should be used). If the default QoS rule does not include a packet filter, the default QoS rule defines the processing of packets not matched with another QoS rule in a PDU session.

The SMF performs binding between SDFs for a QoS flow depending on the QoS of an SDF and service requirements. The SMF allocates a QFI to a new QoS flow, and derives the QoS parameter of the new QoS flow from information provided by the PCF. If applicable, the SMF may provide an (R)AN with a QFI along with a QoS profile. The SMF provides an SDF template (i.e., a set of packet filters associated with the SDF received from the PCF) along with SDF priority, QoS-related information and corresponding packet marking information (i.e., a QFI, a differentiated services code point (DSCP) value and optionally enables the classification, bandwidth application and marking of user plane traffic using reflective QoS indication for a UPF). If applicable, the SMF generates QoS rule(s) for a PDU session by allocating unique QoS rule IDs within a PDU session to which the QFI of a QoS flow has been added, configuring packet filter(s) for the UL part of the SDF template, and setting QoS rule priority in the SDF priority. The QoS rule is provided to a UE that enables the classification and marking of UL user plane traffic.

Figure 15:
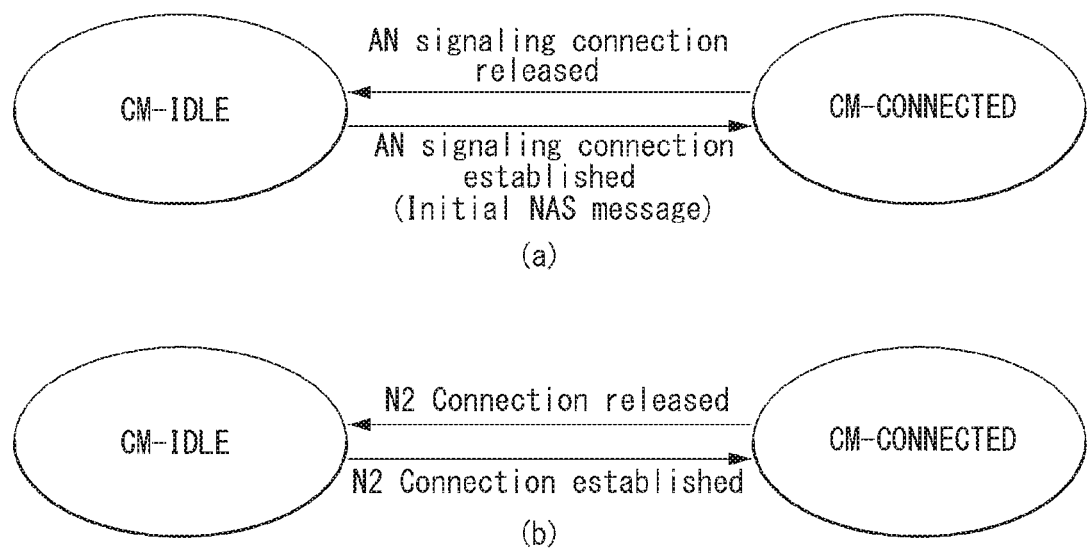
FIG. 15 illustrates a CM state model to which the present invention may be applied.
Figure 16:
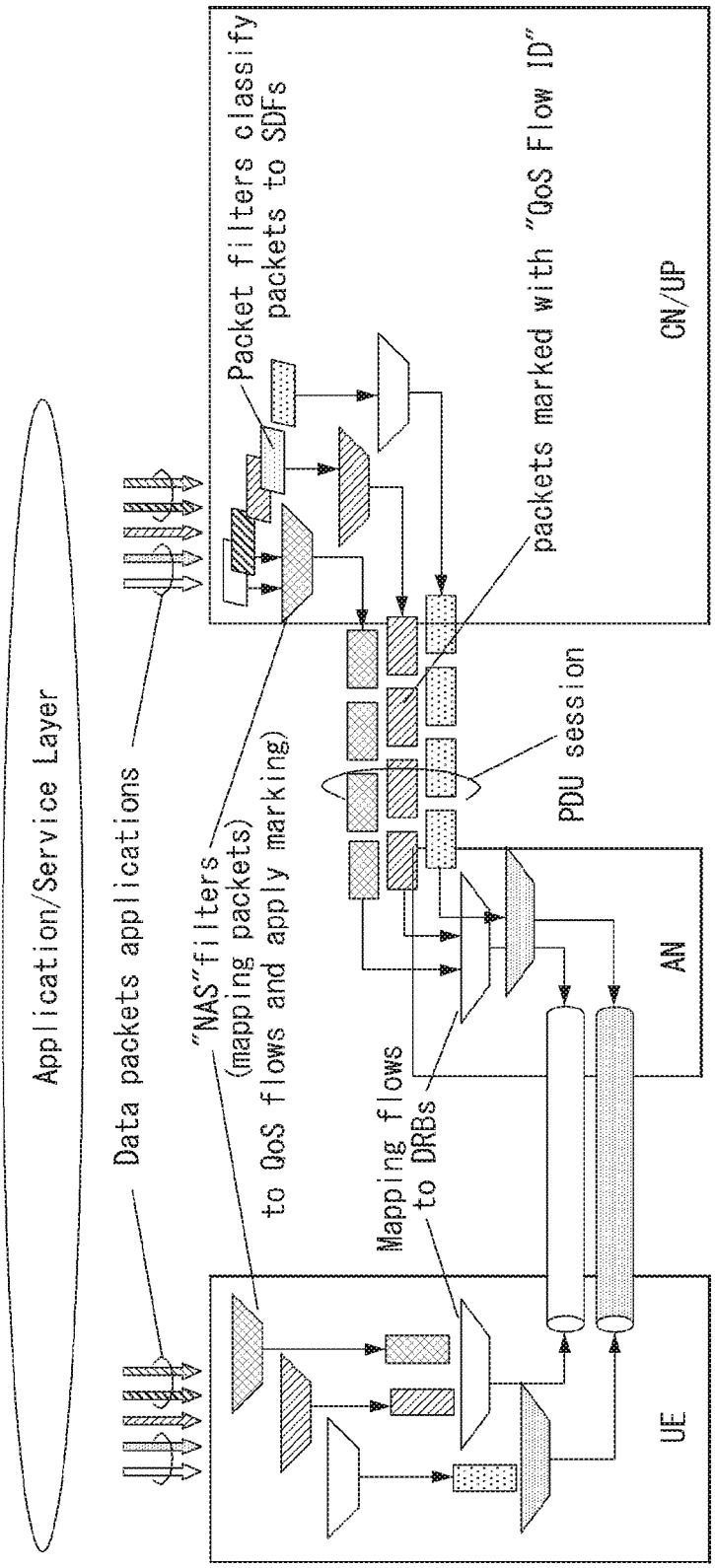
FIG. 16 illustrates a classification and user plane marking for a QoS flow and a mapping of QoS flows to AN resources according to an embodiment of the present invention.

FIG. 15 illustrates classification and user plane marking for a QoS flow and the mapping of a QoS flow to AN resources according to an embodiment of the present invention.

1) Downlink

An SMF allocates a QFI for each QoS flow. Furthermore, the SMF derives QoS parameters from information provided by a PCF.

The SMF provides an (R)AN with the QFI along with a QoS profile including the QoS parameters of a QoS flow. Furthermore, when a PDU session or QoS flow is established, the QoS parameters of the QoS flow is provided to the (R)AN as the QoS profile through N2. Furthermore, whenever an NG-RAN is used, a user plane is activated. Furthermore, QoS parameters may be previously configured in the (R)AN for a non-GBR QoS flow.

Furthermore, the SMF provides an UPF with an SDF template (i.e., a set of packet filters associated with the SDF received from the PCF) along with SDF preference and a corresponding QFI so that the UPF can perform the classification and marking of a downlink user plane packet.

Downlink inflow data packets are classified based on the SDF template according to the SDF preference (without the initiation of additional N4 signaling). A CN classifies user plane traffic belonging to a QoS flow through N3 (and N9) user plane marking using the QFI. The AN binds the QoS flow with AN resources (i.e., a DRB in the case of the 3GPP RAN). In this case, a relation between the QoS flow and the AN resources is not restricted to 1:1. The AN may configure the AN resources necessary to map a QoS flow to a DRB so that a UE may receive the QFI (and reflective QoS may be applied).

If matching is not discovered, when all of QoS flows are related to one or more DL packet filters, the UPF may discard a DL data packet.

Characteristics applied to process downlink traffic are as follows:

The UPF maps user plane traffic to the QoS flow based on the SDF template.

The UPF performs session-AMBR execution and performs PDU counting for charging support.

The UPF may transmit the PDUs of a PDU session in a single tunnel between 5GC and the (A)AN, and the UPF may include the QFI in an encapsulation header.

The UPF performs transmission level packet marking in the downlink (e.g., sets DiffServ code in an outer IP header). Transmission level packet marking is based on 5QI and the ARP of an associated QoS flow.

The (R)AN maps PDUs from a QoS flow to access-specific resources based on a QFI, related 5G QoS characteristics and parameters by considering an N3 tunnel associated with a downlink packet.

If reflective QoS is applied, a UE may generate a new derived QoS rule (or may be called a "UE-derived QoS rule"). A packet filter within the derived QoS rule may be derived from a DL packet (i.e., the header of the DL packet). The QFI of the derived QoS rule may be configured depending on the QFI of the DL packet.

2) Uplink

The SMF generates QoS rule(s) for a PDU session by allocating a QoS rule ID, adding the QFI of a QoS flow, setting packet filter(s) in the uplink part of an SDF template, and setting QoS rule precedence in SDF precedence. The SMF may provide a UE with the QoS rules in order for the UE to perform classification and marking.

The QoS rule includes a QoS rule ID, the QFI of a QoS flow, one or more packet filters and preference values. The same QFI (i.e., the same QoS flow) and one or more QoS rules may be associated.

A default QoS rule is required for each PDU session. The default QoS rule is the QoS rule of a PDU session not including a packet filter (In this case, the highest precedence value (i.e., the lowest priority) is used). If the default QoS rule does not include a packet filter, the default QoS rule defines the processing of a packet not matched with any another QoS rule within the PDU session.

The UE performs the classification and marking of uplink user plane traffic. That is, the UE associates uplink traffic with the QoS flow based on the QoS rule. The rule may be explicitly signaled through N1 (when a PDU session is established or when a QoS flow is established or may be previously configured in the UE or may be implicitly derived by the UE from reflected QoS.

In the UL, the UE evaluates an UL packet with respect to the packet filter of the QoS rule based on the precedence value of the QoS rule (i.e., in order of increasing precedence value) until a matching QoS rule (i.e., the packet filter is matched with the UL packet) is discovered. The UE binds the UL packet to the QoS flow using a QFI in the corresponding matching QoS rule. The UE binds the QoS flow and the AN resources.

If matching is not discovered and a default QoS rule includes one or more UL packet filters, the UE may discard an UL data packet.

Characteristics applied to process uplink traffic are as follows:

A UE may use stored QoS rules in order to determine mapping between UL user plane traffic and a QoS flow. The UE may mark an UL PDU with the QFI of a QoS rule including a matching packet filter, and may transmit the UL PDU using corresponding access-specific resources for a QoS flow based on mapping provided by an RAN.

The (R)AN transmits the PDU through an N3 tunnel with respect to an UPF. When an UL packet passes through a CN from the (R)AN, the (R)AN includes a QFI in the encapsulation header of the UL PDU and selects the N3 tunnel.

The (R)AN may perform transmission level packet marking in the uplink. The transmission level packet marking may be based on the ARP of a QoS flow associated with a 5 QI.

A UPF checks whether the QFIs of UL PDUs are provided to the UE or are aligned (e.g., in the case of reflective QoS) with QoS rules implicitly derived by the UE.

The UPF performs session-AMBF execution and counts a packet for charging.

In the case of an UL classifier PDU session, UL and DL session-AMBRs need to be performed on an UPF that supports an UL classifier function. Furthermore, the DL session-AMBR needs to be separately performed in all of UPFs that terminate an N6 interface (i.e., an interaction between UPFs is not required).

In the case of a multi-home PDU session, UL and DL session-AMBRs are applied to an UPF that supports a branch point function. Furthermore, the DL session-AMBR needs to be separately performed in all of UPFs that terminate the N6 interface (i.e., an interaction between UPFs is not required).

The (R)AN needs to perform a maximum bit rate (UE-AMBR) restriction in the UL and DL for each non-GBR QoS flow. When the UE receives a session-AMBR, it needs to perform a PDU session-based UL rate restriction for non-GBR traffic using the session-AMBR. The rate restriction execution for each PDU session is applied to a flow that does not require a guaranteed flow bit rate. The MBR per SDF is mandatory to a GBR QoS flow, but is optional for a non-GBR QoS flow. The MBR is performed in the UPF.

QoS control for an unstructured PDU is performed in a PDU session level. When the PDU session is established for the transmission of the unstructured PDU, the SMF provides the UPF and the UE with a QFI to be applied to any packet of the PDU session.

MM/SM Separation

In a core network of 5th generation system (5GS), a network node (AMF) managing a mobility and a network node (SMF) managing a session have been divided as separate functions. If MME has played a main role of a control plane in the existing EPC, etc., entity/node has been modularized and divided per main function in 5GC. That is, in the 5GS, it may be considered that the existing MME has been divided into an AMF responsible for a mobility management function and a SMF responsible for a session management function.

The SMF managing each session is responsible for SM related NAS layer message and procedure, and the AMF is responsible for an overall mobility management (MM) including a registration management (RM) and a connection management (CM) of the UE itself. The roles of the AMF and the SMF currently defined in TS23.501 are as follows.

1. AMF

The AMF includes the following functionality. Some or all of the AMF functionalities may be supported in a single instance of the AMF:

Termination of RAN CP interface (N2)
Termination of NAS (N1), NAS ciphering and integrity protection
Registration management
Connection management
Reachability management
Mobility management
Lawful intercept (for AMF events and interface to LI System)
Transparent proxy for routing SM messages
Access authentication
Access authorization
Security Anchor Function (SEA): The SEA interacts with the AUSF and the UE and receives an intermediate key that is established as a result of the UE authentication process. In case of USIM based authentication, the AMF retrieves the security material from the AUSF.

Security Context Management (SCM): The SCM receives a key from the SEA that it uses to derive access-network specific keys.

Regardless of the number of network functions, there is only one NAS interface instance per access network between the UE and the CN, and terminated at one of the Network functions that implements at least NAS security and mobility management.

In addition to the functionalities of the AMF described above, the AMF may include the following functionality to support non-3GPP access networks:

Support of N2 interface with N3IWF. Over this interface, some information (e.g., 3GPP cell identification) and procedures (e.g., hand-over related) defined over 3GPP access may not apply, and non-3GPP access specific information may be applied that do not apply to 3GPP accesses.

Support of NAS signaling with a UE over N3IWF. Some procedures supported by NAS signaling over 3GPP access may be not applicable to untrusted non-3GPP (e.g., paging) access.

Support of authentication of UEs connected over N3IWF.

Management of mobility and authentication/security context state(s) of a UE connected via non-3GPP access or connected via 3GPP and non-3GPP accesses simultaneously.

Support of a co-ordinated RM management context valid over 3GPP and non-3GPP accesses.

Support of dedicated CM management contexts for the UE for connectivity over non-3GPP access.

Not all of the functionalities are required to be supported in an instance of a network slice.

2. SMF

The session management function (SMF) includes the following functionality. Some or all of the SMF functionalities may be supported in a single instance of a SMF:

Session management (e.g., session establishment, modification, and release, including tunnel maintenance between the UPF and an AN node.

UE IP address allocation and management (including optional authorization).

Selection and control of UP function.

Configuring traffic steering at UPF to route traffic to proper destination.

Termination of interfaces towards policy control functions.

Controlling part of policy enforcement and QoS.

Lawful intercept (for SM events and interface to LI System).

Termination of SM parts of NAS messages.

Downlink data notification.

Initiator of AN specific SM information, sent via AMF over N2 to AN.

Determining SSC mode of a session (for IP type PDU session)

Roaming functionality:

Handling local enforcement to apply QoS SLAs (VPLMN).

Charging data collection and charging interface (VPLMN).

Lawful intercept (in VPLMN for SM events and interface to LI System).

Support for interaction with external DN for transport of signaling for PDU session authorization/authentication by external DN.

Not all of the functionalities are required to be supported in an instance of a network slice.

In order to start a SM procedure, in the same manner as the existing procedure, a CM-CONNECTED state, i.e., secure signaling connection between the UE and the CN should be necessarily established. A SM NAS message shall go through the AMF, but the SM NAS message is transparent to the AMF. That is, the AMF cannot decrypt or recognize the contents of the SM NAS message itself passing through the AMF. Thus, if there are several SMFs, the AMF needs to be separately instructed as to which SMF forwards/routes the NAS message. To this end, information for separate forwarding/routing may be added to the outside of the SM NAS message.

If a PDU session has been already created, a PDU session ID of the corresponding PDU session may be represented in a part (particularly, outside the SM NAS message) that the AMF can decrypt, and the AMF can find/recognize the SMF to forward/route the message based on this. In this instance, a mapping table scheme, etc. may be used. If a PDU session is not created, the AMF may perform a SMF selection function in consideration of information such as DNN and S-NSSAI, in order to select an appropriate SMF. Information that is used for the AMF to select the appropriate SMF may be represented, by the UE, in the part that the AMF can decrypt/recognize and may be provided to the AMF.

Data Storage Architecture

Figure 17:
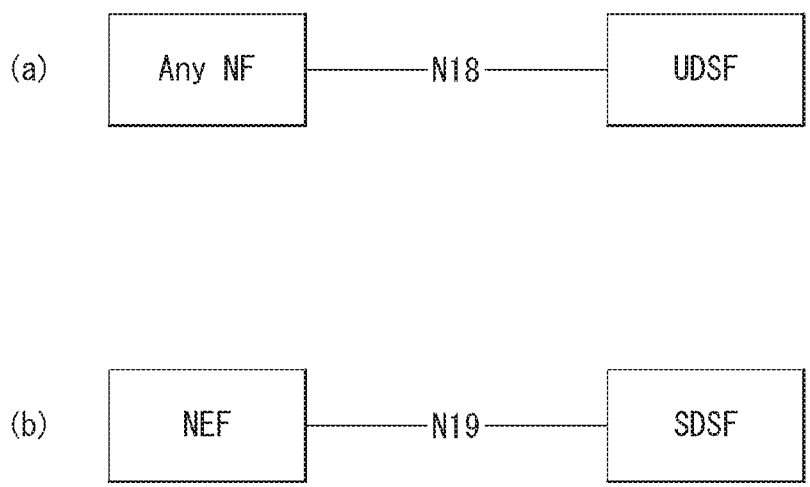
FIG. 17 illustrates a data storage architecture applicable to the present invention.

FIG. 17 illustrates a data storage architecture applicable to the present invention.

More specifically, FIG. 17(a) illustrates a data storage architecture for unstructured data of a NF, and FIG. 17(b) illustrates a data storage architecture for structured data of a NEF.

As illustrated in FIG. 17(a), a 5G system architecture may allow any NF to store or retrieve its unstructured data into or from a UDSF. The UDSF belongs to the same PLMN where a network function is located. CP NFs may share a UDSF for storing their respective unstructured data or may each have their own UDSF (e.g., the UDSF may be located close to each NF).

As illustrated in FIG. 17(b), a 5G system architecture may allow the NEF to store structured data in the SDSF intended for network external and network internal exposure by the NEF. The SDSF belongs to the same PLMN where the NEF is located.

TAU Procedure

Figure 18:
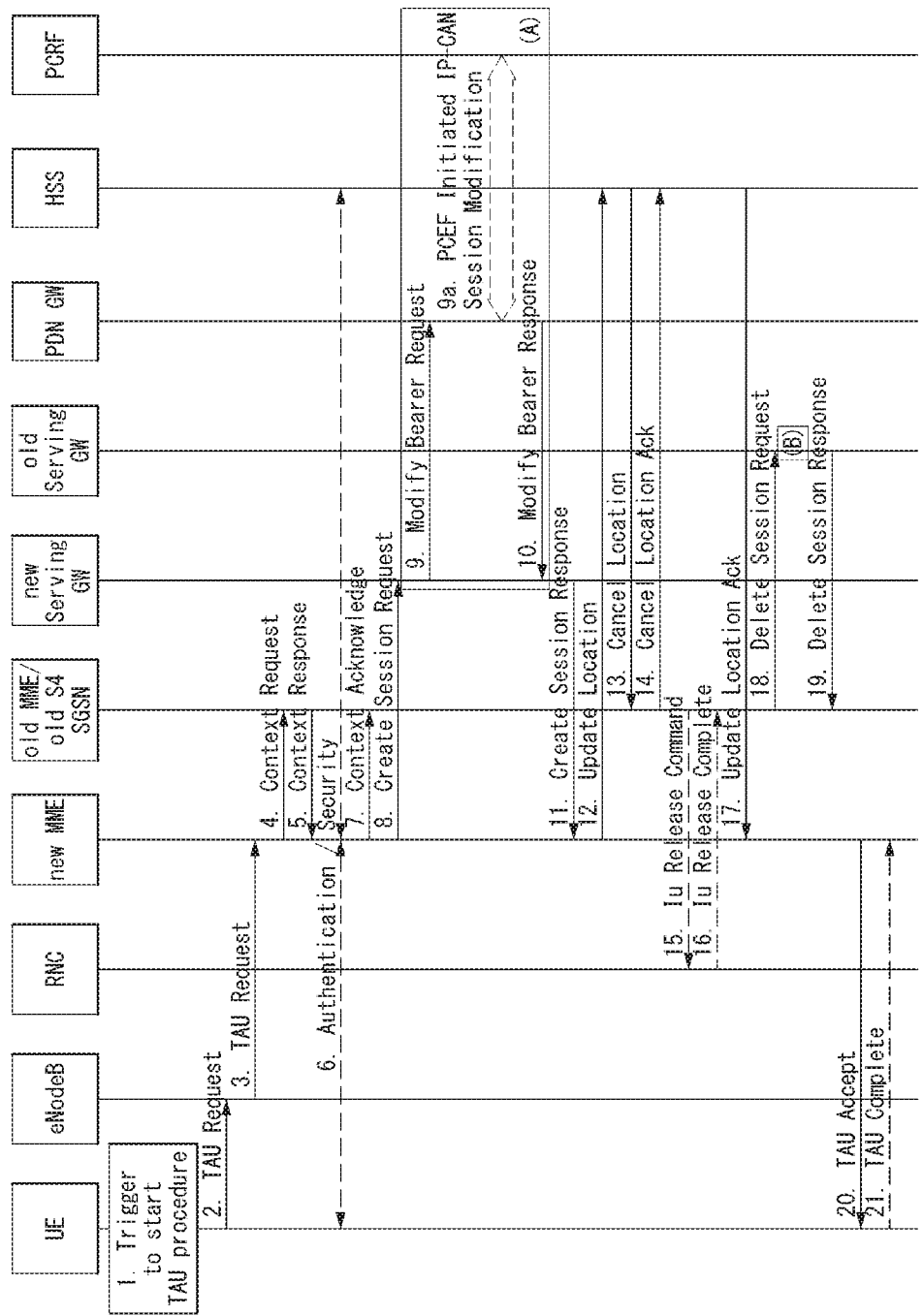
FIG. 18 is a flow chart illustrating a TAU procedure with a serving GW change applicable to the present invention.

FIG. 18 is a flow chart illustrating a TAU procedure with a serving GW change applicable to the present invention.

In the flow chart, for proxy mobile IP (PMIP)-based S5/S8, procedure steps (A) and (B) are defined in TS23.402 [2], and steps 9 and 10 concern GTP-based S5/S8. Further, in case of TAU without MME change, signalling in steps 4, 5, 7 and steps 12 to 17 may be skipped.

1. One of TAU triggers for starting a TAU procedure may occur.

2. The UE initiates the TAU procedure by sending, to the eNodeB, a TAU Request message (UE core network capability, MS network capability, preferred network behaviour, support for restriction of use of enhanced coverage, old GUTI, old GUTI type, last visited TAI, active flag, signalling active flag, EPS bearer status, P-TMSI signature, additional GUTI, eKSI, NAS sequence number, NAS-MAC, key set identifier (KSI), Voice domain preference, and UE's usage setting) together with RRC parameters indicating the selected network and the old globally unique MME identifier (GUMMEI). An exception is that, if the TAU is triggered for load re-balancing purposes (see clause 4.3.7.3), the old GUMMEI is not included in the RRC parameters. The UE shall set the old GUTI type to indicate whether the old GUTI is a native GUTI or is mapped from a P-TMSI and routing area identity (RAI).

If the UE's TIN (Temporary Identifier used in Next update) indicates "GUTI" or "RAT-related TMSI" and the UE holds a valid GUTI, the old GUTI indicates this valid GUTI. If the UE's TIN indicates "P-TMSI" and the UE holds a valid P-TMSI and related RAI, these two elements are indicated as the old GUTI. When the UE is in a connected mode (e.g., in URA_PCH) and reselects E-UTRAN, the UE sets its TIN to "P-TMSI".

If the UE holds a valid GUTI and the old GUTI indicates a GUTI mapped from a P-TMSI and RAI, the UE indicates the GUTI as additional GUTI. If the old GUTI indicates a GUTI mapped from a P-TMSI and RAI and the UE has a valid P-TMSI signature, the P-TMSI signature shall be included.

The additional GUTI in the TAU Request message allows the new MME to find any already existing UE context stored in the new MME when the old GUTI indicates a value mapped from a P-TMSI and RAI.

Alternatively, when a UE only supports E-UTRAN, the UE identifies itself with the old GUTI and sets the old GUTI Type to 'native'.

The RRC parameter "old GUMMEI" takes its value from the identifier that is signalled as the old GUTI according to the rules above. For a combined MME/SGSN, the eNodeB is configured to route the MME-code(s) of this combined node to the same combined node. This eNodeB is also configured to route MME-code(s) of GUTIs that are generated by the UE's mapping of the P-TMSIs allocated by the combined node. Such an eNodeB configuration may also be used for separate nodes to avoid changing nodes in the pool caused by inter RAT mobility.

The last visited TAI is included in order to help the MME produce a list of TAIs for any subsequent TAU Accept message. Active flag is a request by UE to activate the radio bearer and S1 bearer for all the active EPS bearers by the TAU procedure when the UE is in an ECM-IDLE state. Signalling active flag is a request by UE using control plane CIoT EPS optimization to maintain the NAS signalling connection after TAU procedure is completed, in order to transmit pending data using the data transport in control plane CIoT EPS optimization or NAS signalling. The EPS bearer status indicates each EPS bearer that is active in the UE. The TAU Request message shall be integrity protected by the NAS-MAC as described in TS33.401 [41]. If the UE has valid EPS security parameters, eKSI, NAS sequence number and NAS-MAC are included. The NAS sequence number indicates the sequential number of the NAS message. KSI is included if the UE indicates a GUTI mapped from a P-TMSI in the information element "old GUTI".

For the UE using CIoT EPS optimization without any activated PDN connection, there is no active flag or EPS bearer status included in the TAU Request message.

If the UE has PDN connection of PDN Type "non-IP", the UE shall indicate EPS bearer status included in the TAU Request message.

The UE sets the voice domain preference and UE's usage setting according to its configuration.

The UE includes extended idle mode DRX parameters information element if it needs to enable extended idle mode DRX, even if extended idle mode DRX parameters were already negotiated before.

If the UE includes a preferred network behaviour, this defines the network behaviour the UE is expecting to be available in the network.

3. The eNodeB derives the MME address from the RRC parameters carrying the old GUMMEI, the indicated selected network, and the RAT (NB-IoT or WB-E-UTRAN).

If the MME is not associated with the eNodeB or the GUMMEI is not available or the UE indicates that the TAU procedure was triggered by load re-balancing, the eNodeB selects an MME as "MME Selection Function".

The eNodeB forwards the TAU Request message together with the closed subscriber group (CSG) access mode, CSG ID, TAI+ECGI of the cell from where it received the message and with the selected network to the new MME. The CSG ID is provided by RAN if the UE sends the TAU Request message via a CSG cell or a hybrid cell. The CSG access mode is provided if the UE sends the TAU Request message via a hybrid cell. If the CSG access mode is not provided but the CSG ID is provided, the MME considers the cell as a CSG cell. For selected IP traffic offload (SIPTO) at the Local Network with stand-alone GW architecture, the eNodeB includes the local home network ID in the initial UE message and in uplink NAS Transport message if the target cell is in a local home network.

To assist location services, the eNB indicates the UE's coverage level to the MME.

4. The new MME differentiates the type of the old node (i.e., MME or SGSN), uses the GUTI received from the UE to derive the old MME/S4 SGSN address, and sends a Context Request (old GUTI, complete TAU Request message, P-TMSI signature, MME address, UE validated, CIET EPS optimization support indication) message to the old MME/old S4 SGSN to retrieve user information. UE validated indicates that the new MME has validated the integrity protection of the TAU message (e.g., based on native EPS security context for the UE. To validate the Context Request, the old MME uses the complete TAU Request message, and the old S4 SGSN uses the P-TMSI signature and responds with an appropriate error if the integrity check fails in old MME/S4 SGSN. This initiates the security functions in the new MME. If the security functions authenticate the UE correctly, the new MME shall send a Context Request (IMSI, complete TAU Request message, MME address, UE validated) message to the old MME/S4 SGSN with the UE Validated set. If the new MME indicates that it has authenticated the UE or if the old MME/old S4 SGSN correctly validates the UE, the old MME/old S4 SGSN starts a timer.

If the UE with emergency bearers is not authenticated in the old MME/old S4 SGSN (in a network supporting unauthenticated UEs), the old MME/old S4 SGSN continues the procedure with sending a Context Response and starting the timer also when it cannot validate the Context Request.

If the new MME supports CIoT EPS optimization, CIoT EPS optimization support indication is included in the Context Request indicating support for various CIoT EPS optimizations (e.g., support for header compression for CP optimization, etc.).

5. If the Context Request is sent to an old MME, the old MME responds with a Context Response (IMSI, ME identity (IMEISV), MM Context, EPS bearer context(s), serving GW signalling address and TEID(s), ISR supported, MS information change reporting action (if available), CSG information reporting action (if available), UE time zone, UE core network capability, UE specific DRX parameters) message. If the new MME supports CIoT EPS optimization and the use of header compression has been negotiated between the UE and the old MME, the Context Response also includes the header compression configuration which includes information necessary for the ROHC channel setup but does not include information necessary for the RoHC context itself.

If the Context Request is sent to an old S4 SGSN, the old S4 SGSN may respond with a Context Response (MM context, EPS bearer context(s), serving GW signalling address and TEID(s), ISR supported, MS information change reporting action (if available), CSG information reporting action (if available), UE time zone, UE core network capability, UE specific DRX parameters). If the source MME has not yet reported a non-zero MO exception data counter to the PGW, the Context Response also includes the MO exception data counter as described in TS29.274 [43].

The MM context includes security related information as well as other parameters (including IMSI and ME identity (if available)). The unused authentication Quintets in the MM context are also maintained in the SGSN. TS33.401 [41] gives further details on the transfer of security related information.

If the MM context received with the Context Response message did not include IMEISV and the MME does not already store the IMEISV of the UE, the MME shall retrieve the ME ID (IMEISV) from the UE.

The PDN GW address and TEID(s) (for GTP (GPRS tunneling protocol)-based S5/S8) or generic routing encapsulation (GRE) keys (PMIP-based S5/S8 at the PDN GW(s) for uplink traffic) and the TI(s) may be part of the EPS bearer context. If the UE is not known in the old MME/old S4 SGSN or if the integrity check for the TAU Request message fails, the old MME/old S4 SGSN responds with an appropriate error cause. ISR supported is indicated if the old MME/old S4 SGSN and associated serving GW are capable to activate ISR for the UE.

If the UE receives emergency bearer services from the old MME/old S4 SGSN and the UE is UICCless, IMSI cannot be included in the Context Response. For emergency attached UEs, if the IMSI cannot be authenticated, the IMSI shall be marked as unauthenticated. Further, in this case, security parameters are included only if available.

If SIPTO at the local network is active for a PDN connection in the architecture with stand-alone GW, the old MME/old S4 SGSN may include the local home network ID of the old cell in the EPS bearer context corresponding to the SIPTO at the local network PDN connection.

For the UE using CIoT EPS optimization without any activated PDN connection, there is no EPS bearer context(s) included in the Context Response message.

Based on the CIoT EPS optimization support indication, old MME transfers only the EPS bearer context(s) that the new MME supports. If the new MME does not support CIoT EPS optimization, EPS bearer context(s) of non-IP PDN connection are not transferred to the new MME. If the EPS bearer context(s) of a PDN connection has not been transferred, the old MME considers all bearers of the corresponding PDN connection as failed and releases the corresponding PDN connection by triggering the MME requested PDN disconnection procedure. The buffered data in the old MME is discarded after receipt of Context Acknowledgement.

6. If the integrity check of TAU Request message (sent in step 2) failed, authentication is mandatory. If GUTI allocation is completed and the network supports ciphering, the NAS messages are ciphered.

If the TAU request is received for a UE which is already in an ECM_CONNECTED state and the PLMN-ID of the TAI sent by the eNodeB in step 3 is different from the PLMN-ID of the GUTI, included in the TAU Request message, the MME delays authenticating the UE until after step 21 (TAU Complete message).

The MME delays the authentication such that the UE first updates its registered PLMN-ID to the new PLMN-ID selected by the RAN during handover. The new PLMN-ID is provided by the MME to the UE as part of the GUTI in the TAU Accept message in step 20. Doing this ensures that the same PLMN-ID is used in the derivation of the Kasme by both the network and the UE.

If the new MME is configured to allow emergency bearer services for unauthenticated UE, the new MME behave as follows:

where a UE has only emergency bearer services, the MME either skips the authentication and security procedure or accepts that the authentication fails and continues the TAU procedure; or where a UE has both emergency and non emergency bearer services and authentication fails, the MME continues the TAU procedure and deactivates all the non-emergency PDN connections.

7. The MME (if the MME has changed, it is the new MME) determines to relocate the serving GW. The serving GW is relocated when the old serving GW cannot continue to serve the UE. If a new serving GW is expected to serve the UE for a longer time and/or with a more optimal UE to PDN GW path, or if a new serving GW can be co-located with the PDN GW, the MME (if the MME has changed, it is the new MME) may also decide to relocate the serving GW.

If the MME has changed, the new MME sends a Context Acknowledge (serving GW change indication) message to the old MME/old S4 SGSN. The serving GW change indication indicates that a new serving GW has been selected. The old MME/old S4 SGSN marks in its UE context that the information in the GWs is invalid. And, if the old node is an MME, the old MME marks in its UE context that the information in the HSS is invalid. This ensures that the old MME/old S4 SGSN updates the GWs, and the old MME updates the HSS, if the UE initiates a TAU or a routing area update (RAU) procedure back to the old MME/old S4 SGSN before completing the ongoing TAU procedure.

Updating the GWs refers to deletion of session on the serving GW followed by re-creation of session on the serving GW. The re-creation of session on the serving GW results in successful re-establishment of the S5/S8 tunnel between the selected serving GW and the PDN GW.

If the security functions do not authenticate the UE correctly, the TAU shall be rejected, and the new MME shall send a reject indication to the old MME/old S4 SGSN. The old MME/old S4 SGSN shall continue as if the identification and context request was not received.

ISR is not indicated in the Context Acknowledge as the ISR is not activated due to the S-GW change.

For the UE using CIoT EPS optimization without any activated PDN connection, the steps 8, 9, 10, 11, 18 and 19 may be skipped.

8. If the MME has changed, the old MME verifies the EPS bearer status received from the UE with the bearer contexts received from the old MME/old S4 SGSN. If the MME has not changed, the MME verifies EPS bearer status from the UE with the bearer contexts available in the MM context. The MME releases any network resources related to EPS bearers that are not active in the UE. If there is no bearer context at all, the MME rejects the TAU Request.

If the MME selects a new serving GW, the MME may send a Create Session Request (IMSI, bearer contexts, MME address and TEID, protocol type over S5/S8, RAT type, serving network, UE time zone, MO exception data counter) message per PDN connection to the selected new serving GW. The PDN GW address and TFT (for PMIP-based S5/S8) are indicated in the bearer contexts. Type indicates to the serving GW to send the Modify Bearer Request to the PDN GW. The protocol type over S5/S8 is provided to serving GW, and protocol should be used over S5/S8 interface. RAT type indicates a change in radio access. If it is a mobility from a SGSN to a MME and the MME supports location information change reporting, the MME shall include user location information (according to the supported granularity) in the Create Session Request, regardless of whether the location information change reporting had been requested in the previous RAT by the PGW. If it is an inter MME mobility and the PDN GW requests location information change reporting, the MME includes the user location information IE in this message if it is different from the previously sent information. If the PDN GW requests user CSG information, the MME also includes the user CSG information IE in this message. If control plane CIET EPS optimization is applied, the MME may also indicate S11-U tunnelling of NAS user data and send its own S11-U IP address and MME DL TEID for DL data forwarding by the SGW. If the MME receives the counter for RRC cause "MO exception data", the MME shall include the MO exception data counter in the Context Response message.

If only the control plane CIoT EPS optimization is used, the MME shall include a control plane only PDN connection indicator in Create Session Request.

If the new MME receives the EPS bearer context with SCEF, the new MME updates the SCEF as defined in TS23.682 [74].

9. The serving GW informs the PDN GW(s) about the change of, for example, the RAT type (e.g., can be used for charging) by sending the Modify Bearer Request (serving GW address and TEID, RAT type, serving network, PDN charging pause support indication) message per PDN connection to the PDN GW(s). User location information IE and/or UE time zone IE and/or user CSG information IE and/or MO exception data counter are also included if they are present in step 8. The serving GW and PDN GW indicate each use of the RRC establishment cause "MO Exception Data" by the related counter on its CDR.

If the serving GW has received the control plane only PDN connection indicator in step 8, the serving GW indicates the use of CP only on its CDR.

9a. If dynamic PCC is deployed and RAT type information needs to be conveyed from the PDN GW to the PCRF, the PDN GW shall send RAT type information to the PCRF by means of an IP-CAN session modification procedure as defined in TS23.203.

The PDN GW does not need to wait for the PCRF response, but continues in the next step. If the PCRF response leads to an EPS bearer modification, the PDN GW should initiate a bearer update procedure.

10. The PDN GW updates its bearer contexts and returns a Modify Bearer Response (MSISDN, charging Id, PDN charging pause enabled indication (if PDN GW has chosen to enable the function)) message. The MSISDN is included if the PDN GW has stored it in its UE context. If there has been a RAT change towards E-UTRAN and location information change reporting is required and supported in the target MME, the PGW shall provide MS information change reporting action in the Modify Bearer Response.

If the serving GW is relocated, the PDN GW shall send one or more "end marker" packets on the old path immediately after switching the path in order to assist the reordering function in the target eNodeB. If the serving GW has no downlink user plane established, the serving GW shall discard the "end marker" received from the PDN GW and shall not send downlink data notification. Otherwise, the serving GW shall forward the "end marker" packets to the source eNodeB or source S4 SGSN.

11. The serving GW updates its bearer context. This allows the serving GW to route bearer PDUs to the PDN GW when received from eNodeB.

The serving GW may return a Create Session Response (serving GW address, TEID for user plane and control plane, and PDN GW TEIDs (for GTP-based S5/S8) or GRE keys (for PMIP-based S5/S8) for uplink traffic and control plane, MW information change reporting action) message to the new MME. If control plane CIoT EPS optimization is applied, the serving GW address for S11-U user plane and serving GW TEID are used by the MME to forward UL data to the SGW.

When the MME receives the Create Session Response message, the MME may check if there is an "Availability after DDN Failure" monitoring event or a "UE Reachability" monitoring event configured for the UE in the MME, and in such a case, may send an event notification.

12. The new MME verifies whether it holds subscription data for the UE identified by the GUTI, the additional GUTI, or the IMSI received with the context data from the old CN node.

If there are no subscription data in the new MME for this UE, or for a specific network sharing scenario (e.g., gateway core network (GWCN)) if the PLMN-ID of the TAI supplied by the eNodeB is different from the PLMN-ID of the GUTI in the UE's context, the new MME sends an Update Location Request (MME identity, IMSI, ULR (update-location-request)-flags, MME capabilities, homogeneous support of IMS voice over PS sessions, UE single radio voice call continuity (SRVCC) capability, equivalent PLMN list, ME identity (IMEISV)) message to the HSS. The ULR-flags indicates that an update location is sent from an MME and the MME registration is updated in HSS. The HSS does not cancel any SGSN registration. The MME capabilities indicate the MME's support for regional access restrictions functionality. The inclusion of the equivalent PLMN list indicates that the MME supports the inter-PLMN handover to a CSG cell in an equivalent PLMN using the subscription information of the target PLMN. The "Homogenous Support of IMS Voice over PS Sessions" indication is not included unless the MME has completed its evaluation of the support of "IMS Voice over PS Session". The ME identity is included if step 5 has caused the MME to retrieve the IMEISV from the UE.

At this step, the MME may not have all the information needed to determine the setting of the IMS voice over PS session supported indication for this UE. Hence the MME may send the "Homogenous Support of IMS Voice over PS Sessions" later on in this procedure.

If the UE initiates the TAU procedure in a VPLMN supporting autonomous CSG roaming, the HPLMN has enabled autonomous CSG roaming in the VPLMN (via service level agreement), and the MME needs to retrieve the CSG subscription information of the UE from the CSS (CSG Subscriber Server), the MME may initiate the CSG location update procedure using the CSS.

If the MME determines that only the UE SRVCC capability has changed, the MME sends a Notify Request to the HSS to inform about the changed UE SRVCC capability.

If all the EPS bearers of the UE have an emergency ARP value, the new MME may skip the location update procedure or proceed even if the update location fails.

13. The HSS sends a Cancel Location (IMSI, cancellation type) message to the old MME with the cancellation type set to the update procedure.

14. If the timer started in step 4 is not running, the old MME removes the MM context. Otherwise, the contexts are removed when the timer expires. It also ensures that the MM context is kept in the old MME for the case where the UE initiates another TAU procedure before completing the ongoing TAU procedure to the new MME. The old MME acknowledges with a Cancel Location Ack (IMSI) message.

15. If old S4 SGSN receives the Context Acknowledge message and the UE is in Iu Connected, the old S4 SGSN sends an Iu Release Command message to the RNC after the timer started in step 4 has expired.

16. The RNC responds with an Iu Release Complete message.

17. The HSS acknowledges the Update Location Request message by sending an Update Location Ack (IMSI, subscription data) message to the new MME. The subscription data may contain the CSG subscription data for the registered PLMN and for the equivalent PLMN list requested by MME in step 12.

The subscription data may contain enhanced coverage restricted parameter. If received from the HSS, MME stores this enhanced coverage restricted parameter in the MME MM context.

If the update location is rejected by the HSS, the new MME rejects the TAU Request from the UE with an appropriate cause. In such cases, the new MME releases any local MME EPS bearer contexts for the particular UE, and additionally deletes the EPS bearer resources in the new serving GW by sending a Delete Session Request (cause, operation indication) messages to the new serving GW. The operation indication flag shall not be set. Therefore, the new serving GW receiving this request shall not initiate a delete procedure towards the PDN GW.

If the UE initiates the TAU procedure at a CSG cell, the new MME shall check whether the CSG ID and the associated PLMN are contained in the CSG subscription and are not expired. If the CSG ID and the associated PLMN are not present or expired, the MME shall send a TAU Reject message to the UE with an appropriate cause value. The UE shall remove the CSG ID and the associated PLMN from its allowed CSG list if present. If the UE has ongoing emergency bearer services, no CSG access control shall be performed.

If all checks are successful, the new MME constructs a context for the UE.

18. If the MME has changed, when the timer started in step 4 expires, the old MME/old S4 SGSN releases any local MME or SGSN bearer resources, and additionally the old MME/old S4 SGSN deletes the EPS bearer resources by sending the Delete Session Request (cause, operation indication) messages to the old serving GW if it received the serving GW change indication in the Context Acknowledge message in step 7. When the operation indication flag is not set, this indicates to the old serving GW that the old serving GW shall not initiate a delete procedure towards the PDN GW. If ISR is activated, the cause indicates to the old S-GW that the old S-GW shall delete the bearer resources on the other old CN node by sending Delete Bearer Request message to the corresponding CN node.

If the MME has not changed, the step 11 triggers the release of the EPS bearer resources at the old serving GW.

19. The serving GW acknowledges with Delete Session Response (cause) messages. The serving GW discards any packets buffered for the UE.

20. If due to regional subscription restrictions or access restrictions (e.g., CSG restrictions), the UE is not allowed to access the TA:

The MME rejects the TAU Request with an appropriate cause to the UE.

For UEs with emergency EPS bearers, i.e., if at least one EPS bearer has an ARP value reserved for emergency services, the new MME accepts the TAU Request and deactivates all non-emergency PDN connections. If the TAU procedure is initiated in an ECM-IDLE state, all non-emergency EPS bearers are deactivated by the TAU procedure without bearer deactivation signalling between the UE and the MME.

The MME sends a TAU Accept (GUTI, TAI list, EPS bearer status, NAS sequence number, NAS-MAC, IMS voice over PS session supported, emergency service support indicator, location service (LCS) support indication, supported network behaviour) message to the UE. If the active flag is set, the MME may provide the eNodeB with handover restriction list. GUTI is included if the MME allocates a new GUTI. If the active flag is set in the TAU Request message, the user plane setup procedure can be activated in conjunction with the TAU Accept message. If the DL data buffer expiration time for the UE in the MME has not expired, the user plane setup procedure is activated even if the MME did not receive the active flag in the TAU Request message. If the new MME receives the downlink data notification message or any downlink signalling message while the UE is still connected, the user plane setup procedure may be activated even if the new MME did not receive the active flag in the TAU Request message. The procedure is described in detail in TS36.300 [5]. The message sequence should be the same as for the UE triggered service request procedure from the step when MME establishes the bearer. The MME indicates the EPS bearer status IE to the UE. The UE removes any internal resources related to bearers that are not marked active in the received EPS bearer status. If the EPS bearer status information was in the TAU Request, the MME shall indicate the EPS bearer status to the UE. The MME sets the IMS voice over PS session supported.

For the UE using CIoT EPS optimization without any activated PDN connection, there is no EPS bearer status included in the TAU Accept message.

The MME indicates the CIoT optimization it supports and prefers in the supported network behaviour information.

If the UE includes support for restriction of use of extended coverage, the MME sends enhanced coverage restricted parameter to the eNB in S1-AP message. The MME also sends extended coverage restricted parameter to the UE in the TAU Accept message. The UE shall store extended coverage restricted parameter and shall use the value of extended coverage restricted parameter to determine if extended coverage feature should be used or not.

If the MME successfully obtains header compression configuration parameters in step 5, it indicates the continued use of previously negotiated configuration to the UE in the header compression context status for each EPS bearer of the UE. When the header compression context status indicates that the previously negotiated configuration can no longer be used for some EPS bearers, the UE shall stop performing header compression and decompression, when transmitting or receiving data using control plane CIoT EPS optimization on the EPS bearers.

If the MME did not receive the voice support match indicator in the MM context, the MME may send a UE radio capability match request to the eNB. If the MME has not received voice support match indicator from the eNB, based on implementation, the MME may set IMS voice over PS session supported indication and update it at a later stage. After step 12 and in parallel to any of the preceding steps, the MME shall send a Notify Request (homogeneous support of IMS voice over PS sessions) message to the HSS.

The emergency service support indicator informs the UE that emergency bearer services are supported. LCS support indication indicates whether the network supports the EPC-MO-LR and/or CS-MO-LR as described in TS23.271 [57].

If the UE includes extended idle mode DRX parameter information element, the MME includes the extended idle mode DRX parameter information element if it decides to enable extended idle mode DRX.

When receiving the TAU Accept message and there is no ISR activated indication, the UE shall set its TIN to "GUTI".

For a S-GW change, ISR activation is not indicated by the MME as it needs a RAU with the same S-GW first to activate ISR. For the MME change, ISR is not activated by the new MME to avoid context transfer procedures with two old CN nodes.

If the TAU procedure is initiated by manual CSG selection and occurs via a CSG cell, the UE upon receiving the TAU Accept message shall add the CSG ID and associated PLMN to its Allowed CSG list (if it is not already present). The manual CSG selection is not supported if the UE has established emergency bearers.

If the user plane setup is performed in conjunction with the TAU Accept message and the TAU is performed via a hybrid cell, the MME shall send an indication whether the UE is a CSG member to the RAN along with the S1-MME control message. Based on this information, the RAN may perform differentiated treatment for CSG and non-CSG members.

If the UE receives a TAU Accept message via a hybrid cell, the UE does not add the corresponding CSG ID and associated PLMN to its allowed CSG list. Adding a CSG ID and associated PLMN to the UE's local allowed CSG list for a hybrid cell is performed only by OTA (over the air) or open mobile alliance (OMA) device management (DM) procedures.

21. If GUTI is included in the TAU Accept, the UE acknowledges the received message by returning a TAU Complete message to the MME.

When the "Active Flag" is not set in the TAU Request message and the TAU is not initiated in an ECM-CONNECTED state, the new MME releases the signalling connection with UE. For a UE using control plane CIoT EPS optimization, when the "Signalling Active Flag" is set, the new MME shall not release the NAS signalling connection with the UE immediately after the TAU procedure is completed.

The new MME may initiate E-RAB establishment (see TS36.413 [36]) after execution of the security functions, or wait until completion of the TAU procedure. For the UE, E-RAB establishment may occur anytime after the TAU request is sent.

In the case of a rejected TAU operation, due to regional subscription, roaming restrictions or access restrictions (see TS23.221 [27] and TS23.008 [28]), the new MME should not construct an MM context for the UE. In the case of receiving the subscriber data from HSS, the new MME may construct an MM context and store the subscriber data for the UE to optimize signalling between the MME and the HSS. A reject shall be returned to the UE with an appropriate cause, and the S1 connection shall be released. Upon return to the idle state, the UE shall act according to TS23.122 [10].

The new MME shall determine the maximum APN restriction based on the received APN restriction of each bearer context in the Context Response message and then store the new maximum APN restriction value.

The bearer contexts are prioritized by the new MME. If the new MME is unable to support the same number of active bearer contexts as received from old MME/SGSN, the prioritization is used to decide which bearer contexts to maintain active and which ones to delete. In any case, the new MME shall first update all contexts in one or more P-GWs and then deactivate the bearer context that it cannot maintain according to "MME Initiated Dedicated Bearer Deactivation Procedure". This shall not cause the MME to reject the TAU.

The new MME shall not deactivate emergency service related EPS bearers, i.e. EPS bearers with ARP value reserved for emergency services.

If the MS (UE) is in a PMM-CONNECTED state, the bearer contexts are sent already in a Forward Relocation Request message as described in "Serving relay nodes (RNS) relocation procedures" of TS23.060 [7].

If the TAU procedure fails a maximum allowable number of times, or if the MME returns a TAU Reject (cause) message, the UE enters an EMM DEREGISTERED state.

If the new MME identifies that the RAT type has changed, the MME checks the subscription information to identify for each APN whether to maintain the PDN connection, disconnect the PDN connection with a reactivation request, or disconnect the PDN connection without reactivation request. If the MME decides to deactivate a PDN connection, it performs MME-initiated PDN connection deactivation procedure after the TAU procedure is completed but before the S1/RRC interface connection is released. Existing ESM cause values as specified in TS24.301 [46] are used to cause predictable UE behaviour. If all the PDN connections are disconnected and the UE does not support "attach without PDN connectivity", the MME shall request the UE to detach and reattach.

Session and Service Continuity

The support for session and service continuity in 5G system architecture enables to address the various continuity requirements of different applications/services for the UE. The 5G system supports different session and service continuity (SSC) modes. The SSC mode associated with a PDU session anchor does not change during the lifetime of a PDU session.

1. SSC Mode 1

For a PDU session of SSC mode 1, the UPF acting as a PDU session anchor at the establishment of the PDU session is maintained regardless of an access technology (e.g., access type and cells) that a UE is successively using to access the network.

In case of a PDU session of IP type, IP continuity is supported regardless of UE mobility events.

For a multi-homed PDU session, the SSC mode 1 applies only to a first prefix of the PDU session. For such sessions, if the network decides (based on local policies) to allocate additional PDU session anchors/prefixes to a PDU session established in the SSC mode 1, SSC mode 3 applies to these additional prefixes.

When UL CL applies to a PDU session, the SSC mode 1 applies only to the prefix/address sent to the UE. If the network decides (based on local policies) to allocate additional PDU session anchors to such a PDU session, SSC mode 2 applies to these additional PDU session anchors.

The SSC mode 1 may apply to any PDU session Type and any access type.

2. SSC Mode 2

For a PDU session of SSC mode 2, the network may trigger the release of the PDU session and instruct the UE to immediately establish a new PDU session to the same data network. At establishment of the new PDU session, a new UPF acting as a PDU session anchor can be selected.

The SSC mode 2 may apply to any PDU session Type and any access type.

In case of multi-homed PDU sessions or in case that UL CL applies to a PDU session, the SSC mode 2 applies to all PDU session anchors of the PDU session.

In an UL CL mode, the existence of multiple PDU session anchors is not visible to the UE.

3. SSC Mode 3

For a PDU session of SSC mode 3, the network allows the establishment of UE connectivity via a new PDU session anchor to the same data network before connectivity between the UE and the previous PDU session anchor is released. When trigger conditions are applied, the network decides whether to select a PDU session anchor UPF suitable for new conditions of the UE (e.g., point of attachment to the network).

The SSC mode 3 may apply to any PDU session type and any access type.

In case of a PDU session of IP Type, during the procedure of change in the PDU session anchor, the new IP prefix anchored on the new PDU session anchor may be allocated within the same PDU session (relying on IPv6 multi-homing) (this may apply to the case of a PDU session set up in the SSC mode 3 or to additional PDU session anchors of a PDU session established in the SSC mode 1), or new IP address/prefix may be allocated within a new PDU session to which the UE is triggered to establish (this may apply to the case of a PDU session set up in the SSC mode 3).

After the new IP address/prefix has been allocated, the old IP address/prefix is maintained for a predetermined time indicated to the UE and then is released.

The SSC mode selection policy shall be used to determine a type of session and a service continuity mode associated with an application or a group of applications for the UE.

It shall be possible for an operator to provision the UE with SSC mode selection policy. This policy includes one or more SSC mode selection policy rules which can be used by the UE to determine a type of SSC mode associated with an application or a group of applications. The policy may include a default SSC mode selection policy rule that matches all applications of the UE.

When an application requests data transmission (e.g., opens a network socket) and the application itself does not specify a required SSC mode, the UE determines the SSC mode associated with this application by using the SSC mode selection policy, and:

a) If the UE has already an active PDU session that matches the SSC mode associated with the application, the UE routes data of the application within this PDU session unless other conditions in the UE do not permit the use of this PDU session. Otherwise, the UE requests the establishment of a new PDU session with an SSC mode that matches the SSC mode associated with the application.

b) The SSC mode associated with the application is either the SSC mode included in a non-default SSCMSP rule that matches the application or the SSC mode included in the default SSC mode selection policy rule (if present). If the SSCMSP does not include a default SSCMP rule and no other rule matches the application, the UE requests the PDU session without providing the SSC mode. In this case, the network determines the SSC mode of the PDU session.

The SSC mode selection policy rules provided to the UE can be updated by the operator.

The SMF receives, from the UDM, the list of supported SSC modes and the default SSC mode per DNN as part of the subscription information.

If the UE provide an SSC mode when requesting a new PDU session, the SMF selects the SSC mode by either accepting the requested SSC mode or modifying the requested SSC mode based on subscription and/or local configuration.

If the UE does not provide an SSC mode when requesting a new PDU session, the SMF selects the default SSC mode for the data network listed in the subscription or applies local configuration to select the SSC mode.

The SMF shall inform the UE of the selected SSC mode for a PDU session.

Registration Procedure

In 5GS, the existing Attach procedure and the TAU procedure were combined to define a registration procedure. However, the registration procedure may be divided into/called an initial registration procedure (Attach), a registration update procedure (TAU), a periodic registration update procedure (p-TAU), etc. according to its purpose.

Whether the session establishment can be currently performed during the registration procedure is currently under discussion. There may be a method of entering an SM procedure immediately after an RM procedure ends, and a method of piggybacking and sending an SM message in the same manner as the EPC technology.

Figure 19:
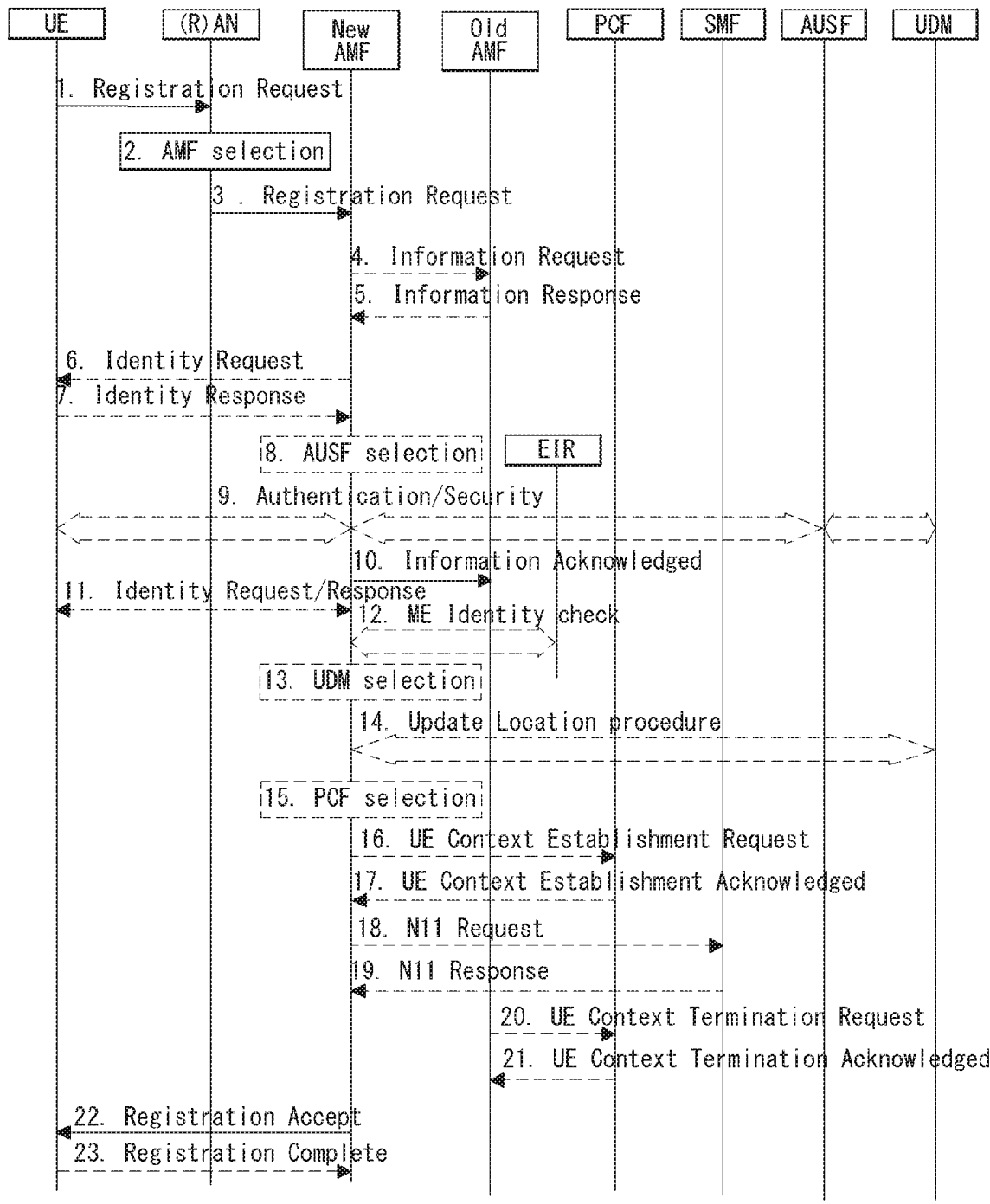
FIG. 19 is a flow chart illustrating a registration procedure applicable to the present invention.

The registration procedure currently reflected in TS23.502 v0.2.0 is as following FIG. 19.

FIG. 19 is a flow chart illustrating a registration procedure applicable to the present invention.

1. UE to (R)AN: AN message (AN parameters, registration request (registration type, subscriber permanent identifier (SUPI) or temporary user ID, security parameters, NSSAI, UE 5 GCN capability, PDU session status)).

In case of 5G-RAN, the AN parameters include, for example, SUPI, the temporary user ID, the selected network, and/or NSSAI.

The registration type may indicate whether the UE wants to perform an "initial registration" (i.e., the UE is in a non-registered state), a "mobility registration update" (i.e., the UE is in a registered state and initiates a registration procedure due to mobility), or a "periodic registration update" (i.e., the UE is in a registered state and initiates a registration procedure due to the periodic update timer expiry). If included, the temporary user ID may indicate the last serving AMF. If the UE is already registered via a non-3GPP access in a PLMN different from the PLMN of the 3GPP access, the UE shall not provide the UE temporary ID allocated by the AMF during the registration procedure over the non-3GPP access.

The security parameters are used for authentication and integrity protection. NSSAI indicates network slice selection assistance information. The PDU session status indicates the available (previously established) PDU sessions in the UE.

2. If a SUPI is included or the temporary user ID does not indicate a valid AMF and/or the (R)AN, an AMF is selected based on (R)AT and NSSAI. The (R)AN selects an AMF as described in TS23.501. If the (R)AN cannot select the AMF, it forwards the registration request to a default AMF. The default AMF is responsible for selecting an appropriate AMF for the UE. The relocation between the default AMF and the selected AMF is described in clause 4.2.2.2.3, where the initial AMF refers to the default AMF, and the target AMF refers to the selected AMF.

3. (R)AN to AMF: N2 message (N2 parameters, registration request (registration type, subscriber permanent identifier or temporary user ID, security parameters, NSSAI)).

When 5G-RAN is used, the N2 parameters include location information, cell identity, and the RAT type related to a cell in which the UE is camping.

If the registration type indicated by the UE is periodic registration update, steps 4 to 17 may be omitted.

4. [Conditional] new AMF to old AMF: Information Request (complete registration request).

If the UE's temporary user ID is included in the registration request and the serving AMF has changed since last registration, the new AMF may send information request to old AMF including the complete registration request IE to request the UE's SUPI and MM context.

5. [Conditional] old AMF to new AMF: Information Response (SUPI, MM context, SMF information). The old AMF responds with information response to a new AMF including the UE's SUPI and MM context. If the old AMF holds information about active PDU sessions, the old AMF includes SMF information including SMF IDs and PDU session IDs.

6. [Conditional] AMF to UE: Identity Request ( ).

If the SUPI is not provided by the UE nor retrieved from the old AMF, the identity request procedure is initiated by the AMF sending an Identity Request message to the UE.

7. [Conditional] UE to AMF: Identity Response ( ).

The UE responds with an Identity Response message including the SUPI.

8. The AMF may decide to invoke an AUSF. In this case, the AMF shall select an AUSF based on SUPI.

9. The AUSF shall initiate authentication of the UE and NAS security functions.

An AMF relocation procedure (e.g., due to network slicing) may happen after step 9.

10. [Conditional] new AMF to old AMF: Information acknowledged ( ).

If the AMF has changed, the new AMF acknowledges the transfer of UE MM context. If the authentication/security procedure fails, the registration is rejected, and the new AMF sends a reject indication to the old AMF. The old AMF continues the procedure as if the information request was never received.

11. [Conditional] AMF to UE: Identity Request ( ).

If the PEI was not provided by the UE nor retrieved from the old AMF, the Identity request procedure is initiated by AMF sending an Identity Request message to the UE to retrieve the PEI.

12. Optionally, the AMF initiates ME identity check. The PEI check is performed as described in clause 4.7.

13. If step 14 is to be performed, the AMF selects a UDM based on the SUPI.

The AMF selects an UDM as described in TS23.501.

14. If the AMF has changed since the last registration, or if there is no valid subscription context for the UE in the AMF, or if the UE provides a SUPI which does not refer to a valid context in the AMF, the AMF may initiate the update location procedure. This includes that UDM initiates cancel location to the old AMF, if any. The old AMF removes the MM context and notifies all possibly associated SMF(s), and the new AMF creates an MM context for the UE after getting the AMF related subscription data from the UDM. The update location procedure may be performed as described in TS23.501.

The PEI is provided to the UDM in the update location procedure.

15. Conditionally, the AMF selects a PCF based on the SUPI. The AMF selects a PCF as described in TS23.501 [2].

16. [Optional)] AMF to PCF: UE Context Establishment Request ( ).

The AMF requests the PCF to apply operator policies for the UE.

17. PCF to AMF: UE Context Establishment Acknowledged ( ).

The PCF acknowledges the UE Context Establishment Request message.

18. [Conditional] AMF to SMF: N11 Request ( ).

If the AMF is changed, the new AMF notifies each SMF of the new AMF serving the UE.

The AMF verifies PDU session status from the UE with the available SMF information. In case the AMF has changed, the available SMF information may be received from the old AMF. The AMF may request the SMF to release all network resources related to PDU sessions that are not active in the UE.

19. SMF to AMF: N11 Response ( ).

The SMF may decide to trigger, for example, the UPF relocation. If the registration type indicated by the UE is periodic registration update, steps 20 and 21 may be omitted.

20. [Conditional] AMF to PCF: UE Context Termination Request ( ).

If the old AMF previously requested UE context to be established in the PCF, the old AMF terminates the UE context in the PCF.

21. AMF to PCF: UE Context Termination Acknowledged ( ).

22. AMF to UE: Registration Accept (temporary user ID, registration area, mobility restrictions, PDU session status, NSSAI, periodic registration update timer)

The AMF sends a Registration Accept message to the UE indicating that the registration has been accepted. The temporary user ID is included if the AMF allocates a new temporary user ID. The mobility restrictions is included if mobility restrictions apply for the UE. The AMF indicates the PDU session status to the UE. The UE removes any internal resources related to PDU sessions that are not marked with active in the received PDU session status. If the PDU session status information is present in the registration request, the AMF shall indicate the PDU session status to the UE. The NSSAI includes the accepted S-NSSAIs.

23. [Conditional] UE to AMF: Registration Complete ( ).

The UE sends a Registration Complete message to the AMF to acknowledge whether a new temporary user ID was assigned.

UE Mobility Event Notification Service Procedure

Figure 20:
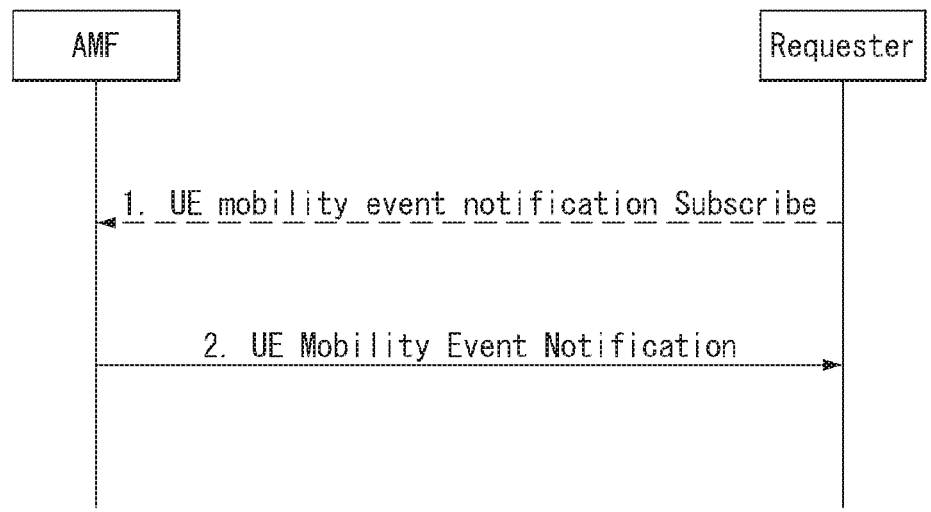
FIG. 20 illustrates a UE mobility event notification service procedure applicable to the present invention.

FIG. 20 illustrates a UE mobility event notification service procedure applicable to the present invention.

In regard to this procedure, 'service description' provides a UE mobility event to a requester (or referred to as consumer) NF which has subscribed to the UE mobility event before the UE mobility event. The mobility event includes the followings:

location change (serving cell change when the UE is in a CM-CONNECTED state, serving AMF change) and/or CM state change.

In this procedure, a UE ID and an event filter may be used as an input, and a requester is notified of the UE mobility event as an output.

The UE mobility event notification service procedure is described in detail below with reference to FIG. 20.

1. The requester NF subscribes to the UE mobility notification service by sending UE mobility event notification subscribe (UE ID and/or event filter) to the AMF. The UE ID identifies the UE, and a valid UE ID includes SUPI. The event filter identifies the events that the requester NF is interested in. If the UE mobility event notification subscription is authorized by the AMF, the AMF records the association of the event trigger and the requester identity. The subscription information may be implicit or explicit, if the subscription information is implicit, this step is skipped.

2. The AMF detects that the UE mobility event happened, and sends a UE Mobility Event Notification (mobility event container) message to the requester NF which has subscribed to the UE mobility event before. The mobility event container indicates a type of mobility event and related information (e.g., registration area update/new registration area).

Network-Triggered Service Request

This procedure includes aspects required to support network slicing and should include notification from an UPF upon MT UP data arrival.

This procedure is used when the network needs to signal (e.g., N1 signalling to UE, mobile-terminated SMS, PDU session user plane resource establishment to deliver mobile terminating user data) with a UE. If the UE is in a CM-IDLE state or a CM-CONNECTED state, the network initiates a network triggered service request procedure. If the UE is in the CM-IDLE state, and asynchronous communication is not activated, the network sends a paging request to the (R)AN/UE. The paging request triggers the service request procedure in the UE. If the asynchronous communication is activated, the network suspends the service request procedure with the (R)AN and the UE, and continues the service request procedure with the (R)AN and the UE (i.e., synchronizes the session context with the (R)AN and the UE) when the UE enters the CM-CONNECTED state.

Method of indicating maintenance of a connected mode of UE

In EPC, MME has managed both mobility and session of the UE, but in 5G, a network node managing mobility of the UE and a network node managing session of the UE have separated into an AMF and an SMF. That is, it can be seen that the MME of EPC has been separated into the AMF managing the mobility of the UE and the SMF managing the session of the UE in 5G. Thus, basically, the AMF behaves in a state of not knowing information on the session of the UE, and the SMF behaves in a state of not knowing a CM state (idle/connected state) or location information of the UE.

As described above, the SMF was defined to perform several behaviours according to a location of the UE even if the SMF does not know the state or the location information of the UE. For example, according to a SSC mode introduced in 5G, if the UE has a SSC mode 2 PDU session, there may be a case where the SMF shall disconnect the existing PDU session based on the location information of the UE and create a new PDU session. Further, even in SSC mode 3, there may be a case where the SMF shall create parallel/independent sessions according to the location information of the UE. Thus, a process in which the SMF separately obtains/receives the location information of the UE from the AMF is required.

To perform such a behaviour, each time location information of the UE changes (e.g., the UE deviates or enters a specific location), the AMF may be configured so that the AMF notifies/informs the SMF of location information of the UE. The behaviour may be performed through the service-based procedure of TS23.502 and/or the "UE mobility event notification" service procedure described above.

The AMF may grasp a location of the UE on a per-base station basis if the UE is in a connected state, and may grasp a location of the UE on a per-TA list basis allocated to the UE if the UE is in an idle state. If the UE is out of the TA list (more specifically, TA included in the TA list) in the idle state, the UE performs the registration procedure (e.g., TAU of EPC), and the AMF knows a location of the UE in the process.

If the UE performs the TAU, the MME immediately releases S1 connection of the UE if an active flag is not set, and makes the UE in the idle state. If there is no data that the UE transmits and receives, the UE immediately enters the idle state by setting the active flag, and thus battery consumption can be reduced.

In the same manner as this, even in 5G, after the UE performs the registration, the AMF may perform N2 release and immediately make the UE in the idle state/mode. However, in 5G in which the AMF and the SMF are separated into each other, this may cause a frequent transition between the idle state/mode and the connected state/mode of the UE.

For example, if the UE has the SSC mode 2 PDU session, the AMF may be configured so that the AMF informs the SMF when the UE is out of a specific area. If the UE is out of a set specific area in the idle state/mode, the UE performs the registration procedure. In this case, the AMF can perform/complete the registration procedure of the UE and immediately make the UE in the idle state/mode as in the related art. Afterwards, the AMF can inform the SMF of a location of the UE. That is, the AMF notifies the SMF of the location of the UE after the AMF transitions the UE to the idle state/mode. The SMF receiving the location of the UE may release the existing PDU session, generate SM NAS signalling to create a new PDU session, and send an NAS message to the AMF in a state in which there is no information on the idle/connected state/mode of the UE. The AMF performs paging (i.e., paging message sending) for transitioning the UE from the idle state to the connected state in order to send the message received from the SMF. The UE becomes in the connected state/mode through a service request after receiving the paging. Afterwards, an SM NAS message is sent to the UE, and the UE goes through a process of releasing the existing PDU session and creating the new PDU session.

That is, in summary, in such a scenario, the UE is transitioned to the idle state/mode immediately after the UE is transitioned to the connected state/mode for the registration procedure, and then is re-transitioned again to the connected state/mode as the UE subsequently receives the paging. Therefore, there occurs a situation in which there is no benefit of reduced battery consumption of the UE and paging resources are wasted unnecessarily.

Accordingly, various embodiments for solving the above-described problems are proposed below. In particular, a method is proposed to reduce the frequency of transition of the idle/connected state/mode of the UE in the case where the SMF sends the signalling based on location information of the UE.

<Method 1—Method of Indicating Maintenance of Connected State/Mode while Subscribing Mobility Event>

In the procedure above, an event filter may be configured variously by a requester. For example, if the UE is out of a specific cell or a TA or enters the specific cell or the TA, the event filter may be configured so that the AMF informs the requester of it. And/or, the event filter may be configured so that the AMF periodically reports a location of the UE to the requester in a specific unit (e.g., on a per-cell basis, on a per-TA basis). And/or, if the UE deviates or enters a mobility restricted/allowed area allocated by the network, such as a forbidden area, an allowed area, and a non-allowed area of the UE, the event filter may be configured so that the AMF informs the requester of it. And/or, if an access type is changed (e.g., if the UE moves between 3GPP RAT and non-3GPP RAT, if the UE moves between evolved E-UTRA and new RAT, etc.), the event filter may be configured so that the AMF informs the requester of it. And/or, if a registration state of the UE is changed, the event filter may be configured so that the AMF informs the requester of it.

If an event configured/indicated by the event filter is filtered/generated, the AMF may inform/report the requester that the event happened.

In the above procedure, the requester (e.g., may be various network nodes such as SMF, PCF, etc., and is hereinafter assumed as the SMF for convenience of explanation) may send, to the AMF, an indication indicating the maintenance of the connected state/mode of the UE (or to forbid transition to the idle state/mode) while the requester subscribes/configures a mobility event notification to the AMF. More specifically, the indication may correspond to an indication indicating so that the UE does not transition to the idle state/mode (or so that the connected state/mode is maintained for a predetermined time) before the AMF informs the SMF about a location of the UE if the AMF knows the location of the UE through the registration procedure.

Figure 21:
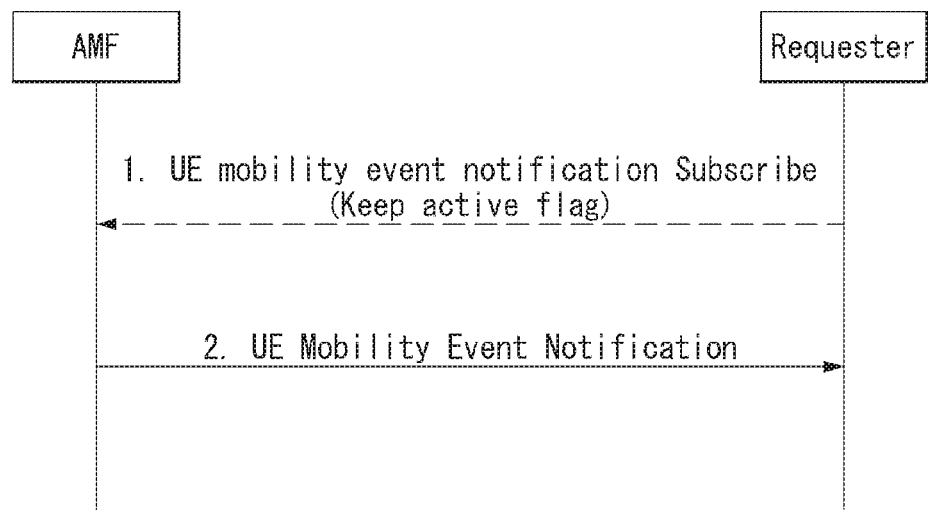
FIG. 21 is a flow chart illustrating a method of maintaining a connected state/mode of a UE using a mobility event notification service procedure according to an embodiment of the present invention.

FIG. 21 is a flow chart illustrating a method of maintaining a connected state/mode of a UE using a mobility event notification service procedure according to an embodiment of the present invention.

Referring to FIG. 21, as described above, the requester may send, to the AMF, an indication indicating the maintenance of the connected state/mode of the UE for a predetermined time (or the forbiddance of transition to the idle state/mode for a predetermined time) while the requester subscribes/configures a UE mobility event notification to the AMF. For example, the requester includes a specific indicator, such as 'Keep Active Flag', indicating the maintenance of the connected state/mode of the UE (or the forbiddance of transition to the idle state/mode) in a UE mobility event notification subscribe message, and may send the message including the specific indicator to the AMF. Here, the active flag, as described above with reference to FIG. 18, means an active flag used to determine whether to release the NAS signalling with the UE.

In this case, before the AMF performs/completes the registration procedure according to the UE mobility event notification subscribe and then notifies the SMF of the mobility event, the UE does not immediately transition to the idle state/mode and may maintain the connected state/mode for a predetermined time. That is, the AMF does not perform the N2 release procedure (immediately after performing/completing the registration procedure).

To this end, the AMF starts a timer while sending a Registration Accept message to the UE, and can maintain the connected mode/state of the UE until the corresponding timer expires. If the corresponding timer expires, the AMF may perform the N2 release procedure and transition the UE to the idle state/mode. A value of the timer may be previously configured to the AMF as a specific value, or may be provided to the AMF in the process of subscribing the subscription information or the UE mobility event notification by the SMF.

In the present embodiment, the AMF basically transitions the UE to the idle state/mode when the registration procedure is performed/completed, and can maintain the connected state/mode of the UE only if a separate indication (e.g., an indication 'Keep Active Flag') is received. However, the present invention is not limited thereto. For example, the AMF basically maintains the connected state/mode of the UE even if the registration procedure is performed/completed, and can transition the UE to the idle state/mode only if the AMF receives a separate indication (e.g., an indication 'Release Flag').

<Method 2—Method of Indicating, by UE, Maintenance of Connected State/Mode in Registration Procedure Process>

Referring to the step 18 of the above-described registration procedure with reference to FIG. 19, only if the AMF is changed, separate signalling for informing of it may be transmitted from the AMF to the SMF. In the present embodiment, a method is proposed to forward, by the AMF, location information of the UE to the SMF using the separate signalling transmitted from the AMF to the SMF within the registration procedure. Thus, in the present specification, even if the AMF is not changed, the steps 18 and 19 in the registration procedure process, i.e., the signalling transmission from the AMF to the SMF may be performed.

To this end, the requester (e.g., the SMF) may transmit, to the AMF, an indication indicating that the AMF sends location information of the UE to the SMF (within the registration procedure) while the requester subscribes/configures a UE mobility event notification to the AMF.

Figure 22:
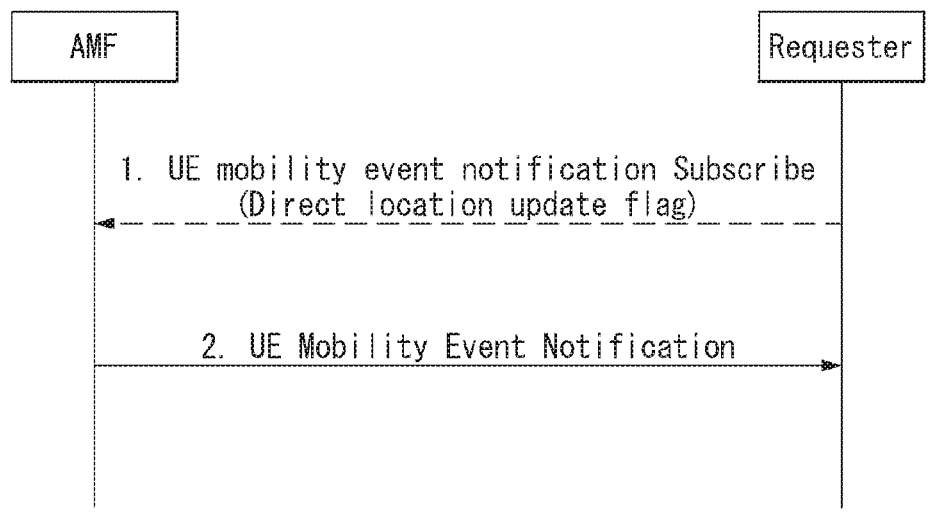
FIG. 22 is a flow chart illustrating a method of transmitting location information of a UE using a mobility event notification service procedure according to an embodiment of the present invention.

FIG. 22 is a flow chart illustrating a method of transmitting location information of a UE using a mobility event notification service procedure according to an embodiment of the present invention.

Referring to FIG. 22, the requester (e.g., the SMF) includes a specific indicator, such as 'Direct Location Update Flag', indicating to transmit location information of the UE to the SMF during the registration procedure in a UE mobility event notification subscribe message, and may send the message including the specific indicator to the AMF.

If the AMF receives such a specific indication, the AMF can perform the step 18 and/or the step 19 (i.e., the step of sending and receiving the N11 Request/Response message with the SMF) in the registration procedure (in order to transmit location information of the UE) even if there is no AMF change in the SMF sending 'Direct Location Update Flag'. In this instance, the AMF includes the location information of the UE in the N11 Request message and can send the message to the corresponding SMF.

If the SMF decides that a subsequent SM NAS operation (e.g., an operation of releasing the existing PDU session and creating a new PDU session) is required for the UE based on the N11 Request message (particularly, location information of the UE), the SMF includes 'Keep Active Flag' in the N11 Response message and can send the message to the AMF. If the AMF receives 'Keep Active Flag' from the SMF, the AMF does not perform the N2 release not to immediately transition the UE to the idle state/mode and maintains the UE in the connected state/mode.

To this end, the AMF may not perform the N2 release until a timer runs and expires as in <Method 1>. In this instance, a time at which the timer starts may be a time at which the AMF sends the Registration Accept message to the UE as in <Method 1>. If the timer expires, the AMF may perform the N2 release and transition the UE to the idle state/mode.

In this embodiment, only if the AMF basically receives a separate indication, the AMF may transmit location information of the UE through the N11 message within the registration procedure. However, the present invention is not limited thereto. For example, the AMF basically transmits location information of the UE through the N11 message within the registration procedure and may not transmit location information of the UE through the N11 message within the registration procedure only if the AMF receives a separate indication (e.g., 'Indirect Location Update Flag').

The above <Method 1/2> was described focusing on the case that the requester explicitly subscribes the UE mobility event, but is not limited thereto. For example, it can be equally/similarly applied to the case that the notifications according to specific UE mobility events are implicitly sent to the requesters without an explicit request of the requester. For example, if the UE is in the idle state/mode, the AMF may inform the SMF that the UE has transitioned to the idle state/mode even if the SMF does not separately request a UE mobility event to the AMF. In this case, the SMF performs a procedure of releasing a N3 tunnel. Similar to this, if the AMF reports an implicit mobility event, the AMF may not perform the N2 release by operator policies or local configuration without a separate request of the requester, and may perform the N2 release after the timer expires to transition the UE to the idle state/mode. And/or, even if the AMF reports an explicit mobility event, the AMF may not perform the N2 release by operator policies or local configuration without the requester's request, and may perform the N2 release after the timer expires to transition the UE to the idle state/mode.

In the present specification, the requester may be a PCF in addition to the SMF. In this case, for example, the PCF may inform the UE of local data network information depending on a location of the UE. A local data network is a data network that can only be accessed in a specific area, and can send the local data network information only if there is information about the area where the UE is located. To this end, the PCF may indicate/subscribe/configure the AMF to transmit location information of the UE, and may give information of the local data network to the UE if the PCF receives an event related notification from the AMF as the UE enters a specific area.

Figure 23:
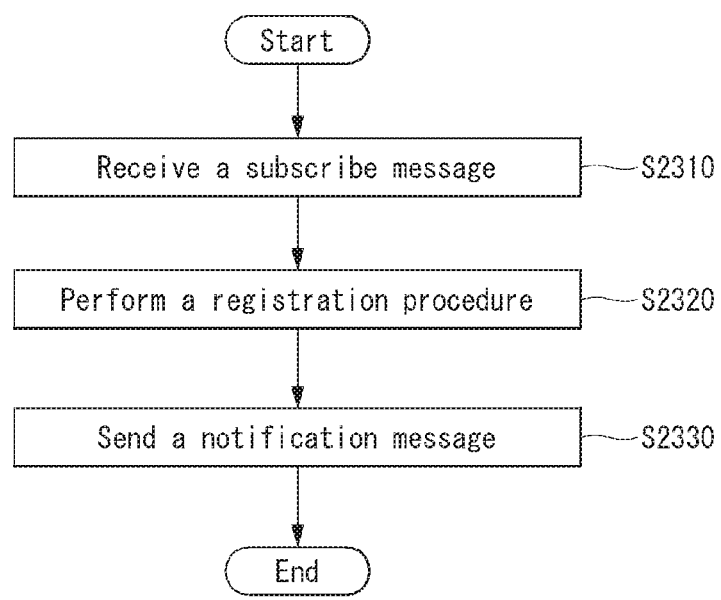
FIG. 23 is a flow chart illustrating a method of notifying a mobility event of an AMF according to an embodiment of the present invention.

FIG. 23 is a flow chart illustrating a method of notifying a mobility event of an AMF according to an embodiment of the present invention. All the embodiments/descriptions described above can be equally/similarly applied to this flow chart, and duplicate descriptions are omitted.

First, an AMF may receive, from a requester, a subscribe message (e.g., UE mobility event notification subscribe message) for a notification subscribe to a mobility event of the UE in S2310. In this instance, the subscribe message may include an identifier (ID) of the UE and an event filter for filtering the mobility event, and the UE ID may include a subscriber permanent identifier (SUPI) of the UE. The requester may be a SMF or network nodes (e.g., PCF) other than the SMF. The mobility event may correspond to at least one of a serving cell change of the UE, a serving AMF change, a TA change, a connected state change, an access type change, a registration state change, and entrance or deviation to a specific area.

Next, the AMF may perform a registration procedure for the UE in S2320. In this instance, detailed description of the registration procedure for the UE is the same as the description with reference to FIG. 19.

Next, when the mobility event filtered by the event filter happens in the registration procedure, the AMF may complete a registration procedure of a notification message for the mobility event and then send the notification message to the SMF in S2330. Here, a registration procedure complete time may be defined as a time at which the AMF sends a registration accept message in the registration procedure, or a time at which the UE sends a registration complete message as a response to the corresponding registration accept message. The notification message may include type information of the mobility event and information related to the mobility event, and the information related to the mobility event may include information on registration area update and/or new registration area of the UE. The SMF may be a network node that releases the existing PDU session, which has been established for the UE for a predetermined time, and establishes a new PDU session.

If the subscribe message includes an indicator indicating a maintenance of a connected mode of the UE, the connected mode of the UE may be maintained for a predetermined time after the registration procedure is completed. To this end, the AMF may delay the connected mode of the UE for the predetermined time after a registration procedure of an N2 release procedure is completed. On the contrary, if the subscribe message does not include the indicator indicating the maintenance of the connected mode of the UE, the UE may transition to an idle mode within the predetermined time after the registration procedure is completed. To this end, the AMF may perform the N2 release procedure within the predetermined time after the registration procedure is completed. The predetermined time may be determined based on an expiration time of a timer that is started upon sending the registration accept message that the AMF sends in the registration procedure.

Although not shown in this flow chart, if the AMF authorizes the mobility event notification subscribe, the AMF may store association between the mobility event and an ID of the requester.

In this flow chart, the UE may be a UE to which SSC mode 2 or SSC mode 3 is configured. The SSC mode 2 may be a SSC mode in which a network node triggers the release of the existing PDU session to the UE and indicates the establishment of a new PDU session for the same data network. Further, the SSC mode 3 may be a SSC mode in which a network node allows the establishment of UE connectivity via a new PDU session anchor to the same data network before connectivity between the UE and the previous anchor is released. That is, the UE to which this flow chart can be applied may be a UE to which the SSC mode 2 and the SSC mode 3 capable of establishing the new PDU session depending on the location of the UE are configured.

Overview of Device to which the Present Invention is Applicable

Figure 24:
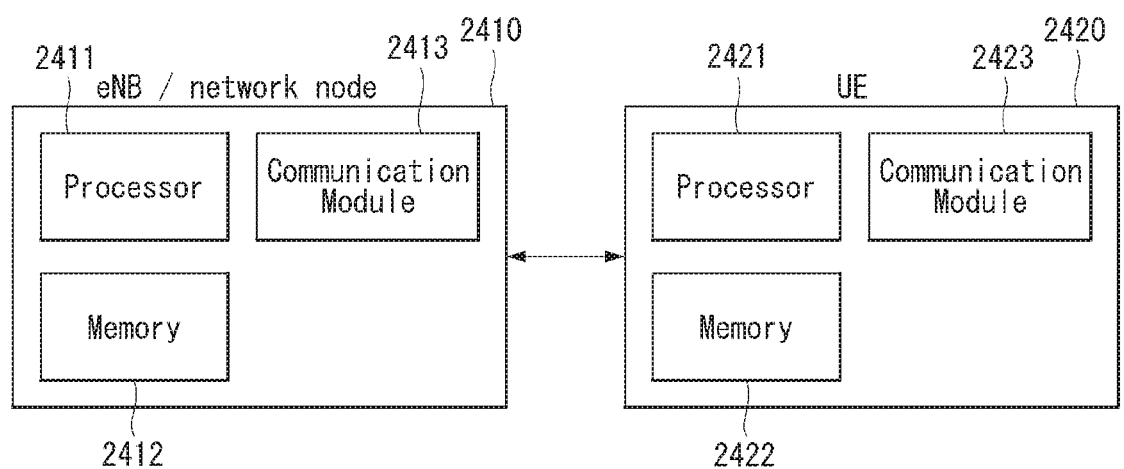
FIG. 24 illustrates a block configuration diagram of a communication device according to an embodiment of the present invention.

FIG. 24 illustrates a block configuration diagram of a communication device according to an embodiment of the present invention.

Referring to FIG. 24, a wireless communication system includes a network node 2410 and a plurality of UEs 2420.

The network node 2410 includes a processor 2411, a memory 2412, and a communication module 2413. The processor 2411 implements functions, processes, and/or methods proposed above. Layers of wired/wireless interface protocol may be implemented by the processor 2411. The memory 2412 is connected to the processor 2411 and stores various types of information for driving the processor 2411. The communication module 2413 is connected to the processor 2411 and transmits and/or receives wired/wireless signals. An example of the network node 2410 may correspond to a base station, MME, HSS, SGW, PGW, an application server, or the like. In particular, if the network node 2410 is the base station, the communication module 2413 may include a radio frequency (RF) unit for transmitting/receiving a radio signal.

The UE 2420 includes a processor 2421, a memory 2422, and a communication module (or RF unit) 2423. The processor 2421 implements functions, processes, and/or methods proposed above. Layers of a radio interface protocol may be implemented by the processor 2421. The memory 2422 is connected to the processor 2421 and stores various types of information for driving the processor 2421. The communication module 2423 is connected to the processor 2421 and transmits and/or receives a radio signal.

The memories 2412 and 2422 may be inside or outside the processors 2411 and 2421 and may be connected to the processors 2411 and 2421 through various well-known means. Further, the network node 2410 (in case of the base station) and/or the UE 2420 may have a single antenna or multiple antennas.

Figure 25:
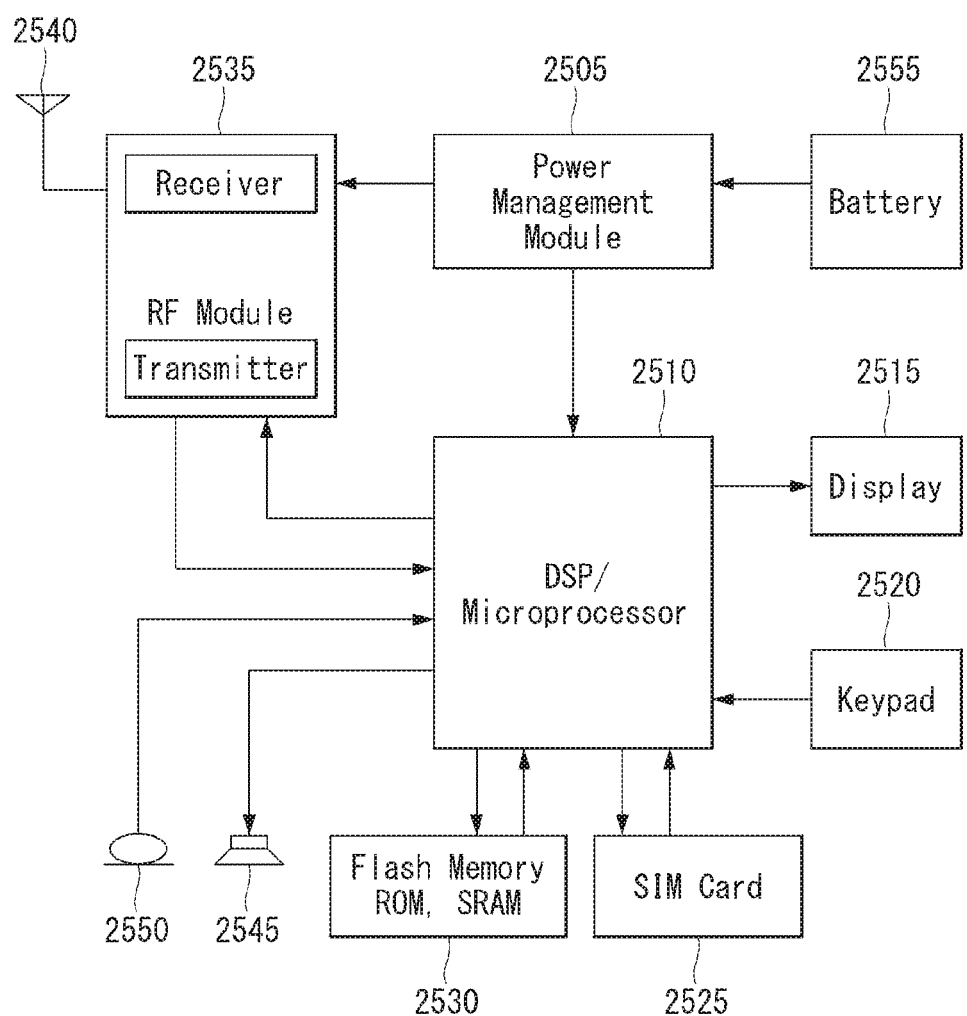
FIG. 25 illustrates a block configuration diagram of a communication device according to an embodiment of the present invention.

FIG. 25 illustrates a block configuration diagram of a communication device according to an embodiment of the present invention.

In particular, FIG. 25 illustrates in more detail the UE illustrated in FIG. 24.

Referring to FIG. 25, the UE may include a processor (or digital signal processor (DSP)) 2510, an RF module (or RF unit) 2535, a power management module 2505, an antenna 2540, a battery 2555, a display 2515, a keypad 2520, a memory 2530, a subscriber identification module (SIM) card 2525 (which is optional), a speaker 2545, and a microphone 2550. The UE may also include a single antenna or multiple antennas.

The processor 2510 implements functions, processes, and/or methods proposed above. Layers of a radio interface protocol may be implemented by the processor 2510.

The memory 2530 is connected to the processor 2510 and stores information related to operations of the processor 2510. The memory 2530 may be inside or outside the processor 2510 and may be connected to the processors 2510 through various well-known means.

A user inputs instructional information, such as a telephone number, for example, by pushing (or touching) buttons of the keypad 2520 or by voice activation using the microphone 2550. The processor 2510 receives and processes the instructional information to perform an appropriate function, such as to dial the telephone number. Operational data may be extracted from the SIM card 2525 or the memory 2530. Further, the processor 2510 may display instructional information or operational information on the display 2515 for the user's reference and convenience.

The RF module 2535 is connected to the processor 2510 and transmits and/or receives an RF signal. The processor 2510 forwards instructional information to the RF module 2535 in order to initiate communication, for example, transmit a radio signal configuring voice communication data. The RF module 2535 includes a receiver and a transmitter to receive and transmit the radio signal. The antenna 2540 functions to transmit and receive the radio signal. Upon reception of the radio signal, the RF module 2535 may transfer a signal to be processed by the processor 2510 and convert the signal into a baseband. The processed signal may be converted into audible or readable information output via the speaker 2545.

The embodiments described above are implemented by combinations of components and features of the present invention in predetermined forms. Each component or feature should be considered selectively unless specified separately. Each component or feature may be carried out without being combined with another component or feature. Moreover, some components and/or features are combined with each other and can implement embodiments of the present invention. The order of operations described in embodiments of the present invention may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present invention can be implemented by various means, for example, hardware, firmware, software, or combinations thereof. When embodiments are implemented by hardware, one embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present invention can be implemented by modules, procedures, functions, etc. performing functions or operations described above. Software code can be stored in a memory and can be driven by a processor. The memory is provided inside or outside the processor and can exchange data with the processor by various well-known means.

In the present specification, 'A and/or B' may mean at least one of A and/or B.

It is apparent to those skilled in the art that the present invention can be embodied in other specific forms without departing from essential features of the present invention. Accordingly, the aforementioned detailed description should not be construed as limiting in all aspects and should be considered as illustrative. The scope of the present invention should be determined by rational construing of the appended claims, and all modifications within an equivalent scope of the present invention are included in the scope of the present invention.

INDUSTRIAL APPLICABILITY

Although the present invention has been described focusing on examples applying to the 3GPP LTE/LTE-A/NR (5G) system, it can be applied to various wireless communication systems other than the 3GPP LTE/LTE-A/NR (5G) system.

What is claimed is:

1. An event notification method of an access and mobility management function (AMF) in a wireless communication system, the event notification method comprising:
receiving, from a requester, a subscribe message for a notification subscribe to a mobility event of a user equipment (UE),
wherein the subscribe message includes an identifier (ID) of the UE and an event filter for filtering the mobility event;
performing a registration procedure for the UE; and
based on the mobility event filtered by the event filter occurring in the registration procedure, completing the registration procedure of a notification message for the mobility event and then sending the notification message to a session management function (SMF),
wherein based on the subscribe message including an indicator indicating a maintenance of a connected mode of the UE, the connected mode of the UE is maintained for a predetermined time after the registration procedure is completed,
wherein based on the subscribe message not including the indicator indicating the maintenance of the connected mode of the UE, the UE transitions to an idle mode within the predetermined time after the registration procedure is completed,
wherein the UE is a UE to which session and service continuity (SSC) mode 2 or SSC mode 3 is configured,
wherein the SSC mode 2 is a SSC mode in which a network node triggers a release of an existing packet data unit (PDU) session to the UE and indicates an establishment of a new PDU session for the same data network, and
wherein the SSC mode 3 is a SSC mode in which a network node allows an establishment of UE connectivity via a new PDU session anchor for the same data network before connectivity between the UE and a previous anchor is released.

2. The event notification method of claim 1, wherein the predetermined time is determined based on an expiration time of a timer that is started upon sending a registration accept message that the AMF sends in the registration procedure.

3. The event notification method of claim 1, wherein the SMF is a network node that releases the existing PDU session, which has been established for the UE for the predetermined time, and establishes the new PDU session.

4. The event notification method of claim 1, wherein the mobility event corresponds to at least one of a serving cell change of the UE, a serving AMF change, a tracking area (TA) change, a connected state change, an access type change, a registration state change, and an entrance or a deviation to a specific area.

5. The event notification method of claim 4, further comprising:
storing an association between the mobility event and an ID of the requester based on the mobility event notification subscribe being authorized.

6. The event notification method of claim 5, wherein the notification message includes type information of the mobility event and information related to the mobility event.

7. The event notification method of claim 6, wherein the information related to the mobility event is information on a registration area update and/or a new registration area of the UE.

8. The event notification method of claim 1, wherein the UE ID includes a subscriber permanent identifier (SUFI) of the UE.

9. The event notification method of claim 1, wherein the requester is the SMF or network nodes other than the SMF.

10. An access and mobility management function (AMF) for performing an event notification in a wireless communication system, the AMF comprising:
a communication module configured to transmit and receive a signal; and
a processor configured to control the communication module,
wherein the processor is configured to:
receive, from a requester, a subscribe message for a notification subscribe to a mobility event of a user equipment (UE),
wherein the subscribe message includes an identifier (ID) of the UE and an event filter for filtering the mobility event;

perform a registration procedure for the UE; and
based on the mobility event filtered by the event filter occurring in the registration procedure, complete the registration procedure of a notification message for the mobility event and then send the notification message to a session management function (SMF),
wherein based on the subscribe message including an indicator indicating a maintenance of a connected mode of the UE, the connected mode of the UE is maintained for a predetermined time after the registration procedure is completed,
wherein based on the subscribe message not including the indicator indicating the maintenance of the connected mode of the UE, the UE transitions to an idle mode within the predetermined time after the registration procedure is completed,
wherein the UE is a UE to which session and service continuity (SSC) mode 2 or SSC mode 3 is configured,
wherein the SSC mode 2 is a SSC mode in which a network node triggers a release of an existing packet data unit (PDU) session to the UE and indicates an establishment of a new PDU session for the same data network, and
wherein the SSC mode 3 is a SSC mode in which a network node allows an establishment of UE connectivity via a new PDU session anchor for the same data network before connectivity between the UE and a previous anchor is released.

11. The AMF of claim 10, wherein the mobility event corresponds to at least one of a serving cell change of the UE, a serving AMF change, a tracking area (TA) change, a connected state change, an access type change, a registration state change, and an entrance or a deviation to a specific area.

12. The AMF of claim 10, wherein the SSC mode 3 is a SSC mode in which a network node allows an establishment of UE connectivity via the new PDU session anchor for the same data network before connectivity between the UE and a previous anchor is released.

13. The AMF of claim 10, wherein the predetermined time is determined based on an expiration time of a timer that is started upon sending a registration accept message that the AMF sends in the registration procedure.

* * * * *